US011225539B2

(12) United States Patent
Harlan et al.

(10) Patent No.: US 11,225,539 B2
(45) Date of Patent: *Jan. 18, 2022

(54) SUPPORTED TRANSITION METAL BIS(PHENOLATE) COMPLEXES AND THEIR USE AS CATALYSTS FOR OLEFIN POLYMERIZATION

(71) Applicant: ExxonMobil Chemical Patents Inc., Baytown, TX (US)

(72) Inventors: Charles J. Harlan, Houston, TX (US); Nikola S. Lambic, Houston, TX (US); John R. Hagadorn, Houston, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 96 days.

This patent is subject to a terminal disclaimer.

(21) Appl. No.: 16/787,837

(22) Filed: Feb. 11, 2020

(65) Prior Publication Data

US 2020/0255561 A1 Aug. 13, 2020

Related U.S. Application Data

(63) Continuation of application No. 62/804,372, filed on Feb. 12, 2019.

(51) Int. Cl.
| | | |
|---|---|---|
| *C07F 7/00* | (2006.01) | |
| *C08F 210/16* | (2006.01) | |
| *C08F 4/64* | (2006.01) | |
| *C08F 10/02* | (2006.01) | |
| *C08F 10/06* | (2006.01) | |
| *B01J 31/22* | (2006.01) | |

(52) U.S. Cl.
CPC ......... *C08F 210/16* (2013.01); *B01J 31/2295* (2013.01); *C07F 7/00* (2013.01); *C08F 4/64158* (2013.01); *C08F 10/02* (2013.01); *C08F 10/06* (2013.01); *B01J 2531/0225* (2013.01); *B01J 2531/0244* (2013.01); *B01J 2531/48* (2013.01); *B01J 2531/49* (2013.01)

(58) Field of Classification Search
CPC ...... C07F 7/00; C08F 4/64158; C08F 210/16; C08F 10/02; C08F 10/06; C08F 110/06; C08F 110/02
See application file for complete search history.

(56) References Cited

U.S. PATENT DOCUMENTS

| 6,624,220 B1 | 9/2003 | Waddell et al. ............. 524/265 |
| 6,624,235 B1 | 9/2003 | Waddell et al. ............. 524/505 |
| 6,825,296 B2 | 11/2004 | Chan et al. .................. 526/161 |
| 7,030,256 B2 | 4/2006 | Boussie et al. ............... 556/54 |
| 7,847,099 B2 | 12/2010 | Agapie et al. ................... 546/2 |
| 2004/0005984 A1 | 1/2004 | Boussie et al. ............... 502/150 |
| 2015/0166690 A1 | 6/2015 | Evans et al. ............... C08F 4/76 |
| 2015/0329652 A1 | 11/2015 | Hlavinka ............... C08F 110/02 |
| 2020/0254431 A1 | 8/2020 | Goryunov et al. ... B01J 31/2295 |
| 2020/0255553 A1 | 8/2020 | Goryunov et al. ..... C08F 10/02 |
| 2020/0255555 A1 | 8/2020 | Goryunov et al. ..... C08F 10/14 |
| 2020/0255555 A1 | 8/2020 | Goryunov et al. ..... C08F 10/14 |
| 2020/0255556 A1 | 8/2020 | Goryunov et al. ..... C08F 10/14 |

FOREIGN PATENT DOCUMENTS

| KR | 2018-022137 | 3/2018 | ............. B01J 23/00 |
| WO | WO2016/172110 | 10/2016 | ............. C07F 7/00 |
| WO | WO2019/027575 | 2/2019 | ............. C07F 7/00 |
| WO | PCT/US2020/045819 | 8/2020 | ............. 526/160 |
| WO | PCT/US2020/045820 | 8/2020 | ............. 526/127 |

(Continued)

OTHER PUBLICATIONS

U.S. Appl. No. 17/165,618, filed Feb. 2, 2021, Holtcamp, M. W. et al..
Baier, M. C. (2014) "Post-Metallocenes in the Industrial Production of Polyolefins, " *Agnew. Chem. Int. Ed.*, v.53, pp. 9722-9744.
Carpentier, J. et al. (2012) "Metal Phenolates as Polymerization Catalysts," Patai's Chem. Functional Groups, pp. 1-74.
Golisz, S. and Bercaw, J. E (2009) "Synthesis of Early Transition Metal Bisphenolate Complexes and Their use as Olefin Polymerization Catalysts," *Macromolecules*, v.42(22), pp. 8751-8762.
Tarafder, T. H. et al. (2010) "Synthesis and Reactivity of Some Peroxo Complexes of Zirconium(IV) Thorium(IV) and Uranium(VI) Ions Containing a Quadridentate, Quadrinegative Ligand and a Pentadentate Dinegative Schiff Base," *Pak. J. Sci. Ind. Res.*, v.53(2), pp. 63-67.

(Continued)

*Primary Examiner* — Catherine S Branch

(57) ABSTRACT

This invention relates to supported catalyst compositions of transition metal complexes of a dianionic, tridentate ligand that features a central neutral heterocyclic Lewis base and two phenolate donors, where the tridentate ligand coordinates to the metal center to form two eight-membered rings. Preferably the bis(phenolate) complexes are represented by Formula (I):

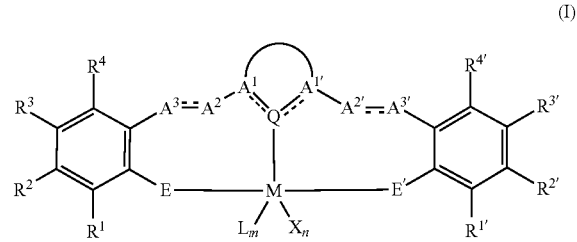

(I)

where M, L, X, m, n, E, E', Q, $R^1$, $R^2$, $R^3$, $R^4$, $R^{1'}$, $R^{2'}$, $R^{3'}$, $R^{4'}$, $A^1$, $A^{1'}$, $A^3$ ---- $A^2$, and $A^{2'}$ ---- $A^{3'}$ are as defined herein, where $A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge.

36 Claims, No Drawings

(56) References Cited

FOREIGN PATENT DOCUMENTS

WO PCT/US2020/045822 8/2020 .................... 526/134
WO PCT/US2020/045823 8/2020 .................... 526/161

OTHER PUBLICATIONS

Zeng, C. et al. (2015) "Highly Enantioselective Epoxidation of α,β-Unsaturated Ketones Catalyzed by Rare-Earth Amides [(Me$_3$Si)$_2$N]$_3$RE(α-Cl)Li(THF)$_3$ with Phenoxy-Functionalized Chiral Prolinols," *Organic Letters*, v. 17(9), pp. 2242-2245.

SUPPORTED TRANSITION METAL BIS(PHENOLATE) COMPLEXES AND THEIR USE AS CATALYSTS FOR OLEFIN POLYMERIZATION

PRIORITY

This invention claims the benefit of and priority to U.S. Ser. No. 62/804,372 filed Feb. 12, 2019, the disclosure of which is incorporated in its entirety.

CROSS REFERENCE TO RELATED APPLICATIONS

This invention is related to:
1) concurrently filed U.S. Ser. No. 16/788,022, filed Feb. 11, 2020 entitled "Lewis Base Catalysts and Methods Thereof", which claims priority to 62/804,353, filed Feb. 12, 2019;
2) concurrently filed U.S. Ser. No. 16/788,088, filed Feb. 11, 2020 entitled "Bis(Aryl Phenolate) Lewis Base Catalysts and Methods Thereof", which claims priority to 62/804,372, filed Feb. 12, 2019;
3) concurrently filed U.S. Ser. No. 16/788,124, filed Feb. 11, 2020 entitled "Lewis Base Catalysts and Methods Thereof", which claims priority to 62/804,389, filed Feb. 12, 2019;
4) concurrently filed U.S. Ser. No. 16/787,909, filed Feb. 11, 2020 entitled "Transition Metal Bis(Phenolate) Complexes and Their Use as Catalysts for Olefin Polymerization", which claims priority to 62/804,372 filed Feb. 12, 2019;
5) concurrently filed PCT Application No. PCT/US2020/045819, filed Aug. 11, 2020 entitled "Propylene Copolymers Obtained Using Transition Metal Bis(Phenolate) Catalyst Complexes and Homogeneous Process for Production Thereof", which claims priority to 62/972,962 filed Feb. 11, 2020;
6) concurrently filed PCT Application No. PCT/US2020/045820, filed Aug. 11, 2020 entitled "Propylene Polymers Obtained Using Transition Metal Bis(Phenolate) Catalyst Complexes and Homogeneous Process for Production Thereof" which claims priority to 62/972,953 filed Feb. 11, 2020;
7) concurrently filed PCT Application No. PCT/US2020/045822, filed Aug. 11, 2020 entitled "Ethylene-Alpha-Olefin-Diene Monomer Copolymers Obtained Using Transition Metal Bis(Phenolate) Catalyst Complexes and Homogeneous Process for Production Thereof" which claims priority to 62/972,943 filed Feb. 11, 2020; and
8) concurrently filed PCT Application No. PCT/US2020/045823, filed Aug. 11, 2020 entitled "Polyethylene Compositions Obtained Using Transition Metal Bis(Phenolate) Catalyst Complexes and Homogeneous Process for Production Thereof" which claims priority to 62/972,936 filed Feb. 11, 2020.

FIELD OF THE INVENTION

This invention relates to novel supported catalyst compounds comprising group 4 bis(phenolate) complexes, catalyst systems comprising such, and uses thereof.

BACKGROUND OF THE INVENTION

Olefin polymerization catalysts are of great use in industry. Hence there is interest in finding new catalyst systems that increase the commercial usefulness of the catalyst and allow the production of polymers having improved properties.

Catalysts for olefin polymerization can be based on bis(phenolate) complexes as catalyst precursors, which are activated typically by an alumoxane or an activator containing a non-coordinating anion.

KR 2018022137 (LG Chem.) describes transition metal complexes of bis(methylphenyl phenolate)pyridine.

U.S. Pat. No. 7,030,256 B2 (Symyx Technologies, Inc.) describes bridged bi-aromatic ligands, catalysts, processes for polymerizing and polymers therefrom.

U.S. Pat. No. 6,825,296 (University of Hong Kong) describes transition metal complexes of bis(phenolate) ligands that coordinate to metal with two 6-membered rings.

U.S. Pat. No. 7,847,099 (California Institute of Technology) describes transition metal complexes of bis(phenolate) ligands that coordinate to metal with two 6-membered rings.

WO 2016/172110—(Univation Technologies) describes complexes of tridentate bis(phenolate) ligands that feature a non-cyclic ether or thioether donor.

Other references of interest include: Baier, M. C. (2014) "Post-Metallocenes in the Industrial Production of Polyolefins," Angew. Chem. Int. Ed. 2014, v.53, pp. 9722-9744; and Golisz, S. et al. (2009) "Synthesis of Early Transition Metal Bisphenolate Complexes and Their Use as Olefin Polymerization Catalysts," Macromolecules, v.42(22), pp. 8751-8762.

New supported catalysts capable of polymerizing olefins to yield high molecular weight and/or high tacticity polymers in gas-phase and/or slurry polymerization processes are desirable for the industrial production of polyolefins. There is still a need in the art for new and improved supported catalyst systems for the polymerization of olefins, in order to achieve specific polymer properties, such as high molecular weight and/or high tacticity polymers, preferably using gas-phase and/or slurry processes.

It is therefore an object of the present invention to provide novel supported catalyst compounds, catalysts systems comprising such compounds, and processes for the polymerization of olefins using such compounds and systems.

SUMMARY OF THE INVENTION

This invention relates to supported transition metal complexes of a dianionic, tridentate ligand that features a central neutral heterocyclic Lewis base and two phenolate donors, where the tridentate ligand coordinates to the metal center to form two eight-membered rings.

This invention relates to bis(phenolate) complexes represented by Formula (I):

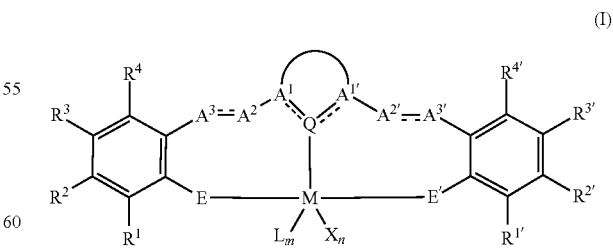

wherein:
M is a group 3-6 transition metal or Lanthanide;
E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3$=$A^2$ is a divalent group containing 2 to 40 non-hydrogen atoms that links $A^1$ to the E-bonded aryl group via a 2-atom bridge;

$A^{2'}$=$A^{3'}$ is a divalent group containing 2 to 40 non-hydrogen atoms that links $A^{1'}$ to the E'-bonded aryl group via a 2-atom bridge;

L is a neutral Lewis base;

X is an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

This invention also relates to a method to polymerize olefins comprising contacting a catalyst system comprising a catalyst compound as described herein, an activator and a support, with one or more monomers. This invention further relates to polymer compositions produced by the methods described herein.

Definitions

For the purposes of this invention and the claims thereto, the following definitions shall be used:

The new numbering scheme for the Periodic Table Groups is used as described in *Chemical and Engineering News*, v.63(5), pg. 27 (1985). Therefore, a "group 4 metal" is an element from group 4 of the Periodic Table, e.g. Hf, Ti, or Zr.

"Catalyst productivity" is a measure of the mass of polymer produced using a known quantity of supported polymerization catalyst per unit time. Typically, "catalyst productivity" is expressed in units of (g of polymer)/(g of supported catalyst)/hour. If units are not specified then the "catalyst productivity" is in units of (g of polymer)/(grams of supported catalyst)/hour.

"Conversion" is the percentage of a monomer that is converted to polymer product in a polymerization, and is reported as % and is calculated based on the polymer yield, the polymer composition, and the amount of monomer fed into the reactor.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

Ethylene shall be considered an α-olefin.

Unless otherwise specified, the term "$C_n$" means hydrocarbon(s) having n carbon atom(s) per molecule, wherein n is a positive integer.

The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

The terms "group," "radical," and "substituent" may be used interchangeably.

The terms "hydrocarbyl radical," "hydrocarbyl group," or "hydrocarbyl" may be used interchangeably and are defined to mean a group consisting of hydrogen and carbon atoms only. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, aryl groups, such as phenyl, benzyl naphthalenyl, and the like.

Unless otherwise indicated, (e.g., the definition of "substituted hydrocarbyl", etc.), the term "substituted" means that at least one hydrogen atom has been replaced with at least one non-hydrogen group, such as a hydrocarbyl group, a heteroatom or heteroatom-containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)_q$—$SiR^*_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring (typically made of 6 carbon atoms) and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S. As used herein, the term "aromatic" also refers to pseudoaromatic heterocycles which are heterocyclic substituents that have similar properties and structures (nearly planar) to aromatic heterocyclic ligands, but are not by definition aromatic.

The term "substituted aromatic," means an aromatic group having 1 or more hydrogen groups replaced by a hydrocarbyl, substituted hydrocarbyl, heteroatom or heteroatom containing group.

A "substituted phenolate" is a phenolate group where at least one, two, three, four or five hydrogen atoms in the 2, 3, 4, 5, and/or 6 positions has been replaced with at least one non-hydrogen group, such as a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), where the 1 position is the phenolate group (Ph-O—, Ph-S—, and Ph-N(R^)— groups, where R^ is hydrogen, C$_1$-C$_{40}$ hydrocarbyl, C$_1$-C$_{40}$ substituted hydrocarbyl, a heteroatom or a heteroatom-containing group). Preferably, a "substituted phenolate" group in the catalyst compounds described herein is represented by the formula:

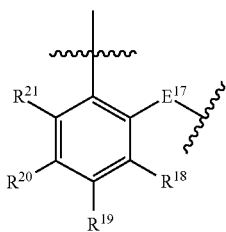

where R$^{18}$ is hydrogen, C$_1$-C$_{40}$ hydrocarbyl (such as C$_1$-C$_{40}$ alkyl) or C$_1$-C$_{40}$ substituted hydrocarbyl, a heteroatom or a heteroatom-containing group, E$^{17}$ is oxygen, sulfur, or NR$^{17}$, and each of R$^{17}$, R$^{19}$, R$^{20}$, and R$^{21}$ is independently selected from hydrogen, C$_1$-C$_{40}$ hydrocarbyl (such as C$_1$-C$_{40}$ alkyl) or C$_1$-C$_{40}$ substituted hydrocarbyl, a heteroatom or a heteroatom-containing group, or two or more of R$^{18}$, R$^{19}$, R$^{20}$, and R$^{21}$ are joined together to form a C$_4$-C$_{62}$ cyclic or polycyclic ring structure, or a combination thereof, and the wavy lines show where the substituted phenolate group forms bonds to the rest of the catalyst compound.

An "alkyl substituted phenolate" is a phenolate group where at least one, two, three, four or five hydrogen atoms in the 2, 3, 4, 5, and/or 6 positions has been replaced with at least one alkyl group, such as a C$_1$ to C$_{40}$, alternately C$_2$ to C$_{20}$, alternately C$_3$ to C$_{12}$ alkyl, such as methyl, ethyl, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, adamantanyl and the like including their substituted analogues.

An "aryl substituted phenolate" is a phenolate group where at least one, two, three, four or five hydrogen atoms in the 2, 3, 4, 5, and/or 6 positions has been replaced with at least one aryl group, such as a C$_1$ to C$_{40}$, alternately C$_2$ to C$_{20}$, alternately C$_3$ to C$_{12}$ aryl group, such as phenyl, 4-fluorophenyl, 2-methylphenyl, 2-propylphenyl, 2,6-dimethylphenyl, mesityl, 2-ethylphenyl, naphthalenyl and the like including their substituted analogues.

The term "ring atom" means an atom that is part of a cyclic ring structure. By this definition, a benzyl group has six ring atoms and tetrahydrofuran has 5 ring atoms.

A heterocyclic ring, also referred to as a heterocyclic, is a ring having a heteroatom in the ring structure as opposed to a "heteroatom-substituted ring" where a hydrogen on a ring atom is replaced with a heteroatom. For example, tetrahydrofuran is a heterocyclic ring and 4-N,N-dimethylamino-phenyl is a heteroatom substituted ring. A substituted heterocyclic ring means a heterocyclic ring having 1 or more hydrogen groups replaced by a hydrocarbyl, substituted hydrocarbyl, heteroatom or heteroatom containing group.

A substituted hydrocarbyl ring means a ring comprised of carbon and hydrogen atoms having 1 or more hydrogen groups replaced by a hydrocarbyl, substituted hydrocarbyl, heteroatom or heteroatom containing group.

For purposes of the present disclosure, in relation to catalyst compounds (e.g., substituted bis(phenolate) catalyst compounds), the term "substituted" means that a hydrogen group has been replaced with a hydrocarbyl group, a heteroatom or heteroatom-containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)$_q$—SiR*$_3$, and the like, where q is 1 to 10 and each R* is independently hydrogen, a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

A tertiary hydrocarbyl group possesses a carbon atom bonded to three other carbon atoms. When the hydrocarbyl group is an alkyl group, tertiary hydrocarbyl groups are also referred to as tertiary alkyl groups. Examples of tertiary hydrocarbyl groups include tert-butyl, 2-methylbutan-2-yl, 2-methylhexan-2-yl, 2-phenylpropan-2-yl, 2-cyclohexylpropan-2-yl, 1-methylcyclohexyl, 1-adamantyl, bicyclo[2.2.1]heptan-1-yl and the like. Tertiary hydrocarbyl groups can be illustrated by formula A:

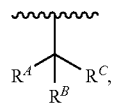

wherein $R^A$, $R^B$ and $R^C$ are hydrocarbyl groups or substituted hydrocarbyl groups that may optionally be bonded to one another, and the wavy line shows where the tertiary hydrocarbyl group forms bonds to other groups.

A cyclic tertiary hydrocarbyl group is defined as a tertiary hydrocarbyl group that forms at least one alicyclic (non-aromatic) ring. Cyclic tertiary hydrocarbyl groups are also referred to as alicyclic tertiary hydrocarbyl groups. When the hydrocarbyl group is an alkyl group, cyclic tertiary hydrocarbyl groups are also referred to as cyclic tertiary alkyl groups or alicyclic tertiary alkyl groups. Examples of cyclic tertiary hydrocarbyl groups include 1-adamantanyl, 1-methylcyclohexyl, 1-methylcyclopentyl, 1-methylcyclooctyl, 1-methylcyclodecyl, 1-methylcyclododecyl, bicyclo[3.3.1]nonan-1-yl, bicyclo[2.2.1]heptan-1-yl, bicyclo[2.3.3]hexan-1-yl, bicycle[1.1.1]pentan-1-yl, bicycle[2.2.2]octan-1-yl, and the like. Cyclic tertiary hydrocarbyl groups can be illustrated by formula B:

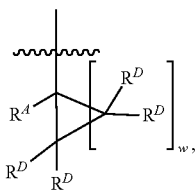

wherein $R^A$ is a hydrocarbyl group or substituted hydrocarbyl group, each $R^D$ is independently hydrogen or a hydrocarbyl group or substituted hydrocarbyl group, w is an integer from 1 to about 30, and $R^A$, and one or more $R^D$, and or two or more $R^D$ may optionally be bonded to one another to form additional rings.

When a cyclic tertiary hydrocarbyl group contains more than one alicyclic ring, it can be referred to as polycyclic tertiary hydrocarbyl group or if the hydrocarbyl group is an alkyl group, it may be referred to as a polycyclic tertiary alkyl group.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom or heteroatom-containing group, such as halogen (such as Br, Cl, F or I) or at least one functional group such as —$NR^*_2$, —$OR^*$, —$SeR^*$, —$TeR^*$, —$PR^*_2$, —$AsR^*_2$, —$SbR^*_2$, —$SR^*$, —$BR^*_2$, —$SiR^*_3$, —$GeR^*_3$, —$SnR^*_3$, —$PbR^*_3$, —$(CH_2)q$-$SiR^*_3$, and the like, where q is 1 to 10 and each $R^*$ is independently hydrogen, a hydrocarbyl or halocarbyl radical, and two or more $R^*$ may join together to form a substituted or unsubstituted completely saturated, partially unsaturated, or aromatic cyclic or polycyclic ring structure), or where at least one heteroatom has been inserted within a hydrocarbyl ring.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tertbutyl).

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

The following abbreviations may be used herein: Me is methyl, Et is ethyl, Pr is propyl, cPr is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, MAO is methylalumoxane, dme is 1,2-dimethoxyethane, p-tBu is para-tertiary butyl, TMS is trimethylsilyl, TIBAL is triisobutylaluminum, TNOA and TNOAL are tri(n-octyl)aluminum, p-Me is para-methyl, Bn is benzyl (i.e., $CH_2Ph$), THF (also referred to as thf) is tetrahydrofuran, RT is room temperature (and is 23° C. unless otherwise indicated), tol is toluene, EtOAc is ethyl acetate, Cbz is Carbazole, and Cy is cyclohexyl.

A "catalyst system" is a combination of at least one catalyst compound, at least one activator, and an optional support material. When "catalyst system" is used to describe such a pair before activation, it means the unactivated catalyst complex (precatalyst) together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. The term "anionic donor" is used interchangeably with "anionic ligand". Examples of anionic donors in the context of the present invention include, but are not limited to, methyl, chloride, fluoride, alkoxide, aryloxide, alkyl, alkenyl, thiolate, carboxylate, amido, methyl, benzyl, hydrido, amidinate, amidate, and phenyl. Two anionic donors may be joined to form a dianionic group.

A "neutral Lewis base or "neutral donor group" is an uncharged (i.e. neutral) group which donates one or more pairs of electrons to a metal ion. Non-limiting examples of neutral Lewis bases include ethers, thioethers, amines, phosphines, ethyl ether, tetrahydrofuran, dimethylsulfide, triethylamine, pyridine, alkenes, alkynes, alenes, and carbenes. Lewis bases may be joined together to form bidentate or tridentate Lewis bases.

For purposes of this invention and the claims thereto, phenolate donors include Ph-O—, Ph-S—, and Ph-N(R^)— groups, where R^ is hydrogen, $C_1$-$C_{40}$ hydrocarbyl, $C_1$-$C_{40}$ substituted hydrocarbyl, a heteroatom or a heteroatom-containing group, and Ph is optionally substituted phenyl.

DETAILED DESCRIPTION

This invention relates to a new catalyst family comprising transition metal complexes of a dianionic, tridentate ligand that features a central neutral donor group and two phenolate donors, where the tridentate ligands coordinate to the metal center to form two eight-membered rings. In complexes of this type it is advantageous for the central neutral donor to be a heterocyclic group. It is particularly advantageous for the heterocyclic group to lack hydrogens in the position alpha to the heteroatom. In complexes of this type it is also advantageous for the phenolates to be substituted with one or more cyclic tertiary alkyl substituents. The use of cyclic tertiary alkyl substituted phenolates is demonstrated to improve the ability of these catalysts to produce high molecular weight polymer.

Complexes of substituted bis(phenolate) ligands (such as adamantanyl-substituted bis(phenolate) ligands) have been prepared and characterized herein. These complexes form active olefin polymerization catalysts when combined with activators, such as non-coordinating anion or alumoxane activators. Useful bis(aryl phenolate)pyridine complexes comprise a tridentate bis(aryl phenolate)pyridine ligand that is coordinated to a group 4 transition metal with the formation of two eight-membered rings.

This invention also relates to a metal complex comprising: a metal selected from groups 3-6 or Lanthanide metals, and a tridentate, dianionic ligand containing two anionic donor groups and a neutral Lewis base donor, wherein the neutral Lewis base donor is covalently bonded between the two anionic donors, and wherein the metal-ligand complex features a pair of 8-membered metallocycle rings.

This invention relates to catalyst systems comprising activator, optional support and one or more catalyst compounds as described herein.

This invention also relates to process to polymerize olefins using the catalyst compounds described herein comprising contacting one or more olefins with a catalyst system comprising an activator, optional support, and a catalyst compound described herein.

The present disclosure also relates to a catalyst system comprising a transition metal compound and an activator compound as described herein, to the use of such activator compounds for activating a transition metal compound in a catalyst system for polymerizing olefins, and to processes for polymerizing olefins, the process comprising contacting under polymerization conditions one or more olefins with a catalyst system comprising a transition metal compound and activator compounds, where aromatic solvents, such as toluene, are absent (e.g. present at zero mol % relative to the moles of activator, alternately present at less than 1 mol %, preferably the catalyst system, the polymerization reaction and/or the polymer produced are free of "detectable aromatic hydrocarbon solvent," such as toluene). For purposes of the present disclosure, "detectable aromatic hydrocarbon solvent" means 0.1 mg/m$^2$ or more as determined by gas phase chromatography. For purposes of the present disclosure, "detectable toluene" means 0.1 mg/m$^2$ or more as determined by gas phase chromatography.

The polyalpha-olefins produced herein preferably contain 0 ppm (alternately less than 1 ppm) of aromatic hydrocarbon. Preferably, the polyalpha-olefins produced herein contain 0 ppm (alternately less than 1 ppm) of toluene.

The catalyst systems used herein preferably contain 0 ppm (alternately less than 1 ppm) of aromatic hydrocarbon. Preferably, the catalyst systems used herein contain 0 ppm (alternately less than 1 ppm) of toluene.

Catalyst Compounds

The terms "catalyst", "compound", "catalyst compound", and "complex" may be used interchangeably to describe a transition metal or Lanthanide metal complex that forms an olefin polymerization catalyst when combined with a suitable activator.

The catalyst complexes of the present invention comprise a metal selected from groups 3, 4, 5 or 6 or Lanthanide metals of the Periodic Table of the Elements, a tridentate dianionic ligand containing two anionic donor groups and a neutral heterocyclic Lewis base donor, wherein the heterocyclic donor is covalently bonded between the two anionic donors. Preferably the dianionic, tridentate ligand features a central heterocyclic donor group and two phenolate donors and the tridentate ligand coordinates to the metal center to form two eight-membered rings.

The metal is preferably selected from group 3, 4, 5, or 6 elements. Preferably the metal, M, is a group 4 metal. Most preferably the metal, M, is zirconium or hafnium.

Preferably the heterocyclic Lewis base donor features a nitrogen or oxygen donor atom. Preferred heterocyclic groups include derivatives of pyridine, pyrazine, pyrimidine, triazine, thiazole, imidazole, thiophene, oxazole, thiazole, furan, and substituted variants of thereof. Preferably the heterocyclic Lewis base lacks hydrogen(s) in the position alpha to the donor atom. Particularly preferred heterocyclic Lewis base donors include pyridine, 3-substituted pyridines, and 4-substituted pyridines.

The anionic donors of the tridentate dianionic ligand may be arylthiolates, phenolates, or anilides. Preferred anionic donors are phenolates. It is preferred that the tridentate dianionic ligand coordinates to the metal center to form a complex that lacks a mirror plane of symmetry. It is preferred that the tridentate dianionic ligand coordinates to the metal center to form a complex that has a two-fold rotation axis of symmetry; when determining the symmetry of the bis(phenolate) complexes only the metal and dianionic tridentate ligand are considered (i.e. ignore remaining ligands).

The bis(phenolate) ligands useful in the present invention are preferably tridentate dianionic ligands that coordinate to the metal M in such a fashion that a pair of 8-membered metallocycle rings are formed. The bis(phenolate) ligands wrap around the metal to form a complex with a 2-fold rotation axis, thus giving the complexes $C_2$ symmetry. The $C_2$ geometry and the 8-membered metallocycle rings are features of these complexes that make them effective catalyst components for the production of polyolefins, particularly isotactic poly(alpha olefins). If the ligands were coordinated to the metal in such a manner that the complex had mirror-plane ($C_s$) symmetry, then the catalyst would be expected to produce only atactic poly(alpha olefins); these symmetry-reactivity rules are summarized by Bercaw, J. E. (2009) in *Macromolecules*, v.42, pp. 8751-8762. The pair of 8-membered metallocycle rings of the inventive complexes is also a notable feature that is advantageous for catalyst activity, temperature stability, and isoselectivity of monomer enchainment. Related group 4 complexes featuring smaller 6-membered metallocycle rings are known (*Macromolecules* 2009, 42, 8751-8762) to form mixtures of $C_2$ and $C_s$ symmetric complexes when used in olefin polymerizations and are thus not well suited to the production of highly isotactic poly(alpha olefins).

Bis(phenolate) ligands that contain oxygen donor groups (i.e. E=E'=oxygen in Formula (I)) in the present invention are preferably substituted with alkyl, substituted alkyl, aryl, or other groups. It is advantageous that each phenolate group be substituted in the ring position that is adjacent to the oxygen donor atom. It is preferred that substitution at the position adjacent to the oxygen donor atom be an alkyl group containing 1-20 carbon atoms. It is preferred that substitution at the position next to the oxygen donor atom be a non-aromatic cyclic alkyl group with one or more five- or six-membered rings. It is preferred that substitution at the position next to the oxygen donor atom be a cyclic tertiary alkyl group. It is highly preferred that substitution at the position next to the oxygen donor atom be adamantan-1-yl or substituted adamantan-1-yl.

The neutral heterocyclic Lewis base donor is covalently bonded between the two anionic donors via "linker groups" that join the heterocyclic Lewis base to the phenolate groups. The "linker groups" are indicated by $(A^3A^2)$ and $(A^{2'}A^{3'})$ in Formula (I). The choice of each linker group may affect the catalyst performance, such as the tacticity of the poly(alpha olefin) produced. Each linker group is typically a $C_2$-$C_{40}$ divalent group that is two-atoms in length. One or both linker groups may independently be phenylene, substituted phenylene, heteroaryl, vinylene, or a non-cyclic two-carbon long linker group. When one or both linker groups are phenylene, the alkyl substituents on the phenylene group may be chosen to optimize catalyst performance. Typically, one or both phenylenes may be unsubstituted or may be independently substituted with $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as isopropyl, etc.

This invention further relates to catalyst compounds, and catalyst systems comprising such compounds, represented by the Formula (I):

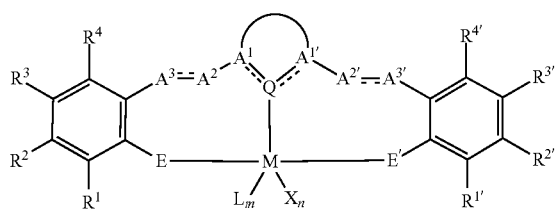

(I)

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

Q is group 14, 15, or 16 atom that forms a dative bond to metal M, preferably Q is C, O, S or N, more preferably Q is C, N or O, most preferably Q is N;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge ($A^1QA^{1'}$ combined with the curved line joining $A^1$ and $A^{1'}$ represents the heterocyclic Lewis base), $A^1$ and $A^{1'}$ are independently C, N, or $C(R^{22})$, where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are C;

$A^3 \text{===} A^2$ is a divalent group containing 2 to 40 non-hydrogen atoms that links $A^1$ to the E-bonded aryl group via a 2-atom bridge, such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC=CH-$), or substituted 1,2-vinylene, preferably $A^3 \text{===} A^2$ is a divalent hydrocarbyl group;

$A^{2'} \text{===} A^{3'}$ is a divalent group containing 2 to 40 non-hydrogen atoms that links $A^{1'}$ to the E'-bonded aryl group via a 2-atom bridge such as ortho-phenylene, substituted ortho-phenylene, ortho-arene, indolene, substituted indolene, benzothiophene, substituted benzothiophene, pyrrolene, substituted pyrrolene, thiophene, substituted thiophene, 1,2-ethylene ($-CH_2CH_2-$), substituted 1,2-ethylene, 1,2-vinylene ($-HC=CH-$), or substituted 1,2-vinylene, preferably $A^{2'} \text{===} A^{3'}$ is a divalent hydrocarbyl group;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group (preferably $R^{1'}$ and $R^1$ are independently a cyclic group, such as a cyclic tertiary alkyl group), or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

This invention is further related to catalyst compounds, and catalyst systems comprising such compounds, represented by the Formula (II):

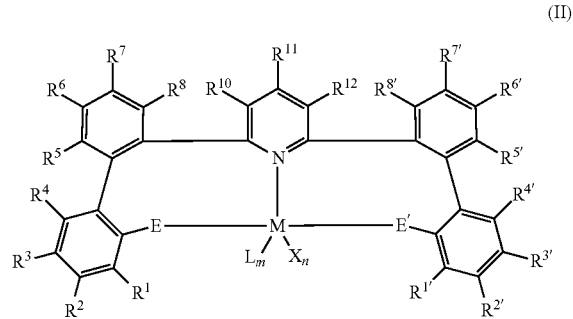

(II)

wherein:

M is a group 3, 4, 5, or 6 transition metal or a Lanthanide (such as Hf, Zr or Ti);

E and E' are each independently O, S, or $NR^9$, where $R^9$ is independently hydrogen, $C_1$-$C_{40}$ hydrocarbyl, $C_1$-$C_{40}$ substituted hydrocarbyl, or a heteroatom-containing group, preferably O, preferably both E and E' are O;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group;

each of $R^5$, $R^6$, $R^7$, $R^8$, $R^{5'}$, $R^{6'}$, $R^{7'}$; $R^{8'}$, $R^{10}$, $R^{11}$, and $R^{12}$ is independently hydrogen, $C_1$-$C_{40}$ hydrocarbyl, $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

The metal, M, is preferably selected from group 3, 4, 5, or 6 elements, more preferably group 4. Most preferably the metal, M, is zirconium or hafnium.

The donor atom Q of the neutral heterocyclic Lewis base (in Formula (I)) is preferably nitrogen, carbon, or oxygen. Preferred Q is nitrogen.

Non-limiting examples of neutral heterocyclic Lewis base groups include derivatives of pyridine, pyrazine, pyrimidine, triazine, thiazole, imidazole, thiophene, oxazole, thiazole, furan, and substituted variants of thereof. Preferred heterocyclic Lewis base groups include derivatives of pyridine, pyrazine, thiazole, and imidazole.

Each $A^1$ and $A^{1'}$ of the heterocyclic Lewis base (in formula I) are independently C, N, or C($R^{22}$), where $R^{22}$ is selected from hydrogen, $C_1$-$C_{20}$ hydrocarbyl, and $C_1$-$C_{20}$ substituted hydrocarbyl. Preferably $A^1$ and $A^{1'}$ are carbon. When Q is carbon, it is preferred that $A^1$ and $A^{1'}$ be selected from nitrogen and C($R^{22}$). When Q is nitrogen, it is preferred that $A^1$ and $A^{1'}$ be carbon. It is preferred that Q=nitrogen, and $A^1$=$A^{1'}$=carbon. When Q is nitrogen or oxygen, is preferred that the heterocyclic Lewis base in Formula (I) not have any hydrogen atoms bound to the $A^1$ or $A^{1'}$ atoms. This is preferred because it is thought that hydrogens in those positions may undergo unwanted decomposition reactions that reduce the stability of the catalytically active species.

The heterocyclic Lewis base (of Formula (I)) represented by $A^1QA^{1'}$ combined with the curved line joining $A^1$ and $A^{1'}$ is preferably selected from the following, with each $R^{23}$ group selected from hydrogen, heteroatoms, $C_1$-$C_{20}$ alkyls, $C_1$-$C_{20}$ alkoxides, $C_1$-$C_{20}$ amides, and $C_1$-$C_{20}$ substituted alkyls.

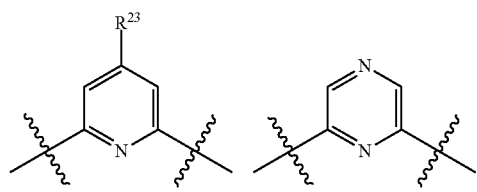

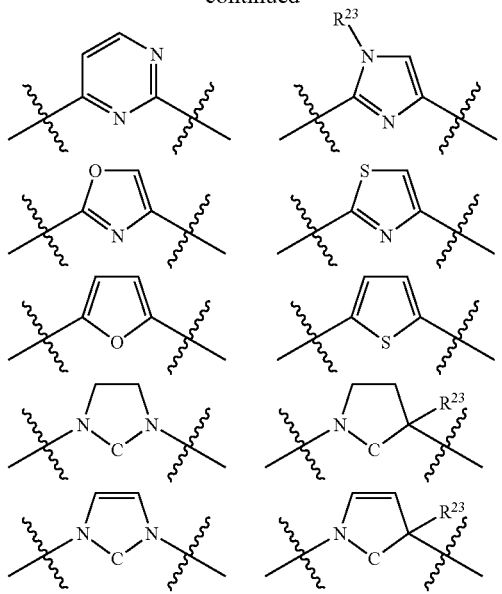

Preferably, the heterocyclic Lewis base (of Formula (I)) represented by $A^1QA^{1'}$ combined with the curved line joining $A^1$ and $A^{1'}$ is a six membered ring containing zero or one ring heteroatoms or a five membered ring containing zero, one two or three ring heteroatoms. Alternately, the heterocyclic Lewis base (of Formula (I)) represented by $A^1QA^{1'}$ combined with the curved line joining $A^1$ and $A^{1'}$ is not a six membered ring containing two or more ring heteroatoms.

In Formula (I) or (II), E and E' are each selected from oxygen or $NR^9$, where $R^9$ is independently hydrogen, $C_1$-$C_{40}$ hydrocarbyl, $C_1$-$C_{40}$ substituted hydrocarbyl, or a heteroatom-containing group. It is preferred that E and E' are oxygen. When E and/or E' are $NR^9$ it is preferred that $R^9$ be selected from $C_1$ to $C_{20}$ hydrocarbyls, alkyls, or aryls. In one embodiment E and E' are each selected from O, S, or N(alkyl) or N(aryl), where the alkyl is preferably a $C_1$ to $C_{20}$ alkyl, such as methyl, ethyl, propyl, butyl, pentyl, hexyl, octyl, nonyl, decyl, undecyl, dodecyl and the like, and aryl is a $C_6$ to $C_{40}$ aryl group, such as phenyl, naphthalenyl, benzyl, methylphenyl, and the like.

In embodiments, $A^3$===$A^2$ and $A^{2'}$===$A^{3'}$ are independently a divalent hydrocarbyl group, such as $C_1$ to $C_{12}$ hydrocarbyl group.

In complexes of Formula (I) or (II), when E and E' are oxygen it is advantageous that each phenolate group be substituted in the position that is next to the oxygen atom (i.e. $R^1$ and $R^{1'}$ in Formula (I) and (II)). Thus, when E and E' are oxygen it is preferred that each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, more preferably, each of $R^1$ and $R^{1'}$ is independently a non-aromatic cyclic alkyl group with one or more five- or six-membered rings (such as cyclohexyl, cyclooctyl, adamantanyl, or 1-methylcyclohexyl, or substituted adamantanyl), most preferably a non-aromatic cyclic tertiary alkyl group (such as 1-methylcyclohexyl, adamantanyl, or substituted adamantanyl).

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

In some embodiments of the invention of Formula (I) or (II), each of $R^1$ and $R^{1'}$ is independently a tertiary hydrocarbyl group. In other embodiments of the invention of Formula (I) or (II), each of $R^1$ and $R^{1'}$ is independently a cyclic tertiary hydrocarbyl group. In other embodiments of the invention of Formula (I) or (II), each of $R^1$ and $R^{1'}$ is independently a polycyclic tertiary hydrocarbyl group.

The linker groups (i.e. $A^3\text{---}A^2$ and $A^{2'}\text{---}A^{3'}$ in Formula (I)) are each preferably part of an ortho-phenylene group, preferably a substituted ortho-phenylene group. It is preferred for the $R^7$ and $R^{7'}$ positions of Formula (II) to be hydrogen, or $C_1$ to $C_{20}$ alkyl, such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, or an isomer thereof, such as iospropyl, etc. For applications targeting polymers with high tacticity it is preferred for the $R^7$ and $R^{7'}$ positions of Formula (II) to be a $C_1$ to $C_{20}$ alkyl, most preferred for both $R^7$ and $R^{7'}$ to be a $C_1$ to $C_3$ alkyl.

In embodiments of Formula (I) herein, Q is C, N or O, preferably Q is N.

In embodiments of Formula (I) herein, $A^1$ and $A^{1'}$ are independently carbon, nitrogen, or $C(R^{22})$, with $R^{22}$ selected from hydrogen, $C_1$-$C_{20}$ hydrocarbyl, $C_1$-$C_{20}$ substituted hydrocarbyl. Preferably $A^1$ and $A^{1'}$ are carbon.

In embodiments of Formula (I) herein, $A^1QA^{1'}$ in Formula (I) is part of a heterocyclic Lewis base, such as a pyridine, pyrazine, pyrimidine, triazine, thiazole, imidazole, thiophene, oxazole, thiazole, furan, or a substituted variant of thereof.

In embodiments of Formula (I) herein, $A^1QA^{1'}$ are part of a heterocyclic Lewis base containing 2 to 20 non-hydrogen atoms that links $A^2$ to $A^{2'}$ via a 3-atom bridge with Q being the central atom of the 3-atom bridge. Preferably each $A^1$ and $A^{1'}$ is a carbon atom and the $A^1QA^{1'}$ fragment forms part of a pyridine, pyrazine, pyrimidine, triazine, thiazole, imidazole, thiophene, oxazole, thiazole, furan, or a substituted variant of thereof group, or a substituted variant thereof.

In one embodiment of Formula (I) herein, Q is carbon, and each $A^1$ and $A^{1'}$ is N or $C(R^{22})$, where $R^{22}$ is selected from hydrogen, $C_1$-$C_{20}$ hydrocarbyl, $C_1$-$C_{20}$ substituted hydrocarbyl, a heteroatom or a heteroatom-containing group. In this embodiment, the $A^1QA^{1'}$ fragment forms part of a cyclic carbene, N-heterocyclic carbene, cyclic amino alkyl carbene, or a substituted variant of thereof group, or a substituted variant thereof.

In embodiments of Formula (I) herein, $A^3\text{---}A^2$ is a divalent group containing 2 to 20 non-hydrogen atoms that links $A^1$ to the E-bonded aryl group via a 2-atom bridge, where the $A^3\text{---}A^2$ is a linear alkyl or forms part of a cyclic group (such as an optionally substituted ortho-phenylene group, or ortho-arylene group) or a substituted variant thereof.

$A^{2'}\text{---}A^{3'}$ is a divalent group containing 2 to 20 non-hydrogen atoms that links $A^{1'}$ to the E'-bonded aryl group via a 2-atom bridge, where the $A^{2'}\text{---}A^{3'}$ is a linear alkyl or forms part of a cyclic group (such as an optionally substituted ortho-phenylene group, or ortho-arylene group or, or a substituted variant thereof.

In embodiments of the invention herein, in Formula (I) and (II), M is a group 4 metal, such as Hf or Zr.

In embodiments of the invention herein, in Formula (I) and (II), E and E' are O.

In embodiments of the invention herein, in Formula (I) and (II), $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, preferably hydrogen, methyl, ethyl, propyl, butyl, pentyl, hexyl, or an isomer thereof.

In embodiments of the invention herein, in Formula (I) and (II), $R^1$, $R^2$, $R^3$, $R^4$, $R^{1'}$, $R^{2'}$, $R^{3'}$, $R^{4'}$, and $R^9$ are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (I) and (II), $R^4$ and $R^{4'}$ is independently hydrogen or a $C_1$ to $C_3$ hydrocarbyl, such as methyl, ethyl or propyl.

In embodiments of the invention herein, in Formula (I) and (II), $R^9$ is hydrogen, $C_1$-$C_{40}$ hydrocarbyl, $C_1$-$C_{40}$ substituted hydrocarbyl, or a heteroatom-containing group, preferably hydrogen, methyl, ethyl, propyl, butyl, pentyl, hexyl, or an isomer thereof. Preferably $R^9$ is methyl, ethyl, propyl, butyl, $C_1$ to $C_6$ alkyl, phenyl, 2-methylphenyl, 2,6-dimethylphenyl, or 2,4,6-trimethylphenyl.

In embodiments of the invention herein, in Formula (I) and (II), each X is, independently, selected from the group consisting of hydrocarbyl radicals having from 1 to 20 carbon atoms (such as alkyls or aryls), hydrides, amides, alkoxides, sulfides, phosphides, halides, alkyl sulfonates, and a combination thereof, (two or more X's may form a part of a fused ring or a ring system), preferably each X is independently selected from halides, aryls, and $C_1$ to $C_5$ alkyl groups, preferably each X is independently a hydrido, dimethylamido, diethylamido, methyltrimethylsilyl, neopentyl, phenyl, benzyl, methyl, ethyl, propyl, butyl, pentyl, fluoro, iodo, bromo, or chloro group.

Alternatively, each X may be, independently, a halide, a hydride, an alkyl group, an alkenyl group or an arylalkyl group.

In embodiments of the invention herein, in Formula (I) and (II), each L is a Lewis base, independently, selected from the group consisting of ethers, thio-ethers, amines, nitriles, imines, pyridines, halocarbons, and phosphines, preferably ethers and thioethers, and a combination thereof, optionally two or more L's may form a part of a fused ring or a ring system, preferably each L is independently selected from ether and thioether groups, preferably each L is a ethyl ether, tetrahydrofuran, dibutyl ether, or dimethylsulfide group.

In embodiments of the invention herein, in Formula (I) and (II), R1 and R1' are independently cyclic tertiary alkyl groups.

In embodiments of the invention herein, in Formula (I) and (II), n is 1, 2 or 3, typically 2.

In embodiments of the invention herein, in Formula (I) and (II), m is 0, 1 or 2, typically 0.

In embodiments of the invention herein, in Formula (I) and (II), $R^1$ and $R^{1'}$ are not hydrogen.

In embodiments of the invention herein, in Formula (I) and (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^2$, $R^3$, $R^4$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; each X is, independently, selected from the group consisting of hydrocarbyl radicals having from 1 to 20 carbon atoms (such as alkyls or aryls), hydrides, amides, alkoxides, sulfides, phosphides, halides, and a combination thereof, (two or more X's may form a part of a fused ring or a ring system); each L is, independently, selected from the group consisting of ethers, thioethers, and halo carbons (two or more L's may form a part of a fused ring or a ring system).

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{40}$ hydrocarbyl, $C_1$-$C_{40}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, methyl, ethyl, propyl, butyl, pentyl, hexyl, or an isomer thereof.

In embodiments of the invention herein, in Formula (II), each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthalenyl, cyclohexyl, cyclohexenyl, methylcyclohexyl, and isomers thereof.

In embodiments of the invention herein, in Formula (II), M is Hf or Zr, E and E' are O; each of $R^1$ and $R^{1'}$ is independently a $C_1$-$C_{40}$ hydrocarbyl, a $C_1$-$C_{40}$ substituted hydrocarbyl, a heteroatom or a heteroatom-containing group, each $R^1$, $R^2$, $R^3$, $R^4$, $R^{1'}$, $R^{2'}$, $R^{3'}$, and $R^{4'}$ is independently hydrogen, $C_1$-$C_{20}$ hydrocarbyl, $C_1$-$C_{20}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; $R^9$ is hydrogen, $C_1$-$C_{20}$ hydrocarbyl, $C_1$-$C_{20}$ substituted hydrocarbyl, or a heteroatom-containing group, such as hydrogen, methyl, ethyl, propyl, butyl, pentyl, hexyl, or an isomer thereof;

each X is, independently, selected from the group consisting of hydrocarbyl radicals having from 1 to 20 carbon atoms (such as alkyls or aryls), hydrides, amides, alkoxides, sulfides, phosphides, halides, dienes, amines, phosphines, ethers, and a combination thereof, (two or more X's may form a part of a fused ring or a ring system); n is 2; m is 0; and each of $R^5$, $R^6$, $R^7$, $R^8$, $R^{5'}$, $R^{6'}$, $R^{7'}$, $R^{8'}$, $R^{10}$, $R^{11}$ and $R^{12}$ is independently hydrogen, $C_1$-$C_{20}$ hydrocarbyl, $C_1$-$C_{20}$ substituted hydrocarbyl, a heteroatom or a heteroatom-containing group, or one or more adjacent R groups may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings, such as each of $R^5$, $R^6$, $R^7$, $R^8$, $R^{5'}$, $R^{6'}$, $R^{7'}$, $R^{8'}$, $R^{10}$, $R^{11}$ and $R^{12}$ is are independently selected from methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, phenyl, substituted phenyl (such as methylphenyl and dimethylphenyl), benzyl, substituted benzyl (such as methylbenzyl), naphthyl, cyclohexyl, cyclohexenyl, methylcyclohexyl, and isomers thereof.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

Preferred embodiment of Formula (I) is M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

Preferred embodiment of Formula (I) is M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

Preferred embodiment of Formula (II) is M is Zr or Hf, both E and E' are oxygen, and both $R^1$ and $R^{1'}$ are $C_4$-$C_{20}$ cyclic tertiary alkyls.

Preferred embodiment of Formula (II) is M is Zr or Hf, both E and E' are oxygen, and both $R^1$ and $R^{1'}$ are adamantan-1-yl or substituted adamantan-1-yl.

Preferred embodiment of Formula (II) is M is Zr or Hf, both E and E' are oxygen, and each of $R^1$, $R^{1'}$, $R^3$ and $R^{3'}$ are adamantan-1-yl or substituted adamantan-1-yl.

Preferred embodiment of Formula (II) is M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

Catalyst compounds that are particularly useful in this invention include one or more of: dimethylzirconium[2',2'''-(pyridine-2,6-diyl)bis(3-adamantan-1-yl)-5-(tert-butyl)-[1,1'-biphenyl]-2-olate)], dimethylhafnium[2',2'''-(pyridine-2,6-diyl)bis(3-adamantan-1-yl)-5-(tert-butyl)-[1,1'-biphenyl]-2-olate)], dimethylzirconium[6,6'-(pyridine-2,6-diylbis(benzo[b]thiophene-3,2-diyl))bis(2-adamantan-1-yl)-4-methylphenolate)], dimethylhafnium[6,6'-(pyridine-2,6-diylbis(benzo[b]thiophene-3,2-diyl))bis(2-adamantan-1-yl)-4-methylphenolate)], dimethylzirconium[2',2'''-(pyridine-2,6-diyl)bis(3-((3r,5r,7r)-adamantan-1-yl)-5-methyl-[1,1'-biphenyl]-2-olate)], dimethylhafiium[2',2'''-(pyridine-2,6-diyl)bis(3-((3r,5r,7r)-adamantan-1-yl)-5-methyl-[1,1'-biphenyl]-2-olate)], dimethylzirconium[2',2'''-(pyridine-2,6-diyl)bis(3-((3r,5r,7r)-adamantan-1-yl)-4',5-dimethyl-[1,1'-biphenyl]-2-olate)], dimethylhafnium[2',2'''-(pyridine-2,6-diyl)bis(3-((3r,5r,7r)-adamantan-1-yl)-4',5-dimethyl-[1,1'-biphenyl]-2-olate)].

Catalyst compounds that are particularly useful in this invention include those represented by one or more of the formulas:

Complex 1
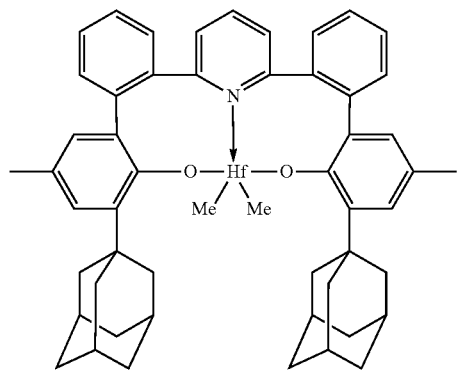
Complex 2
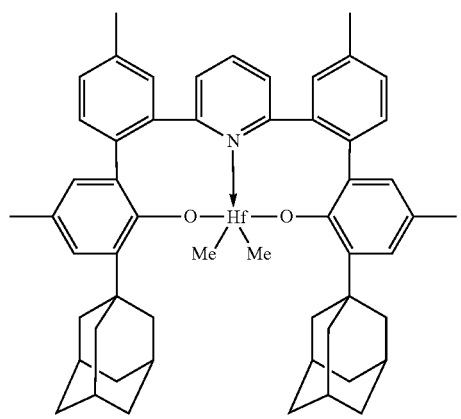
Complex 3
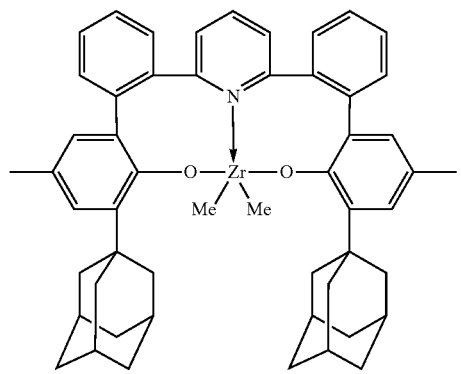
Complex 4
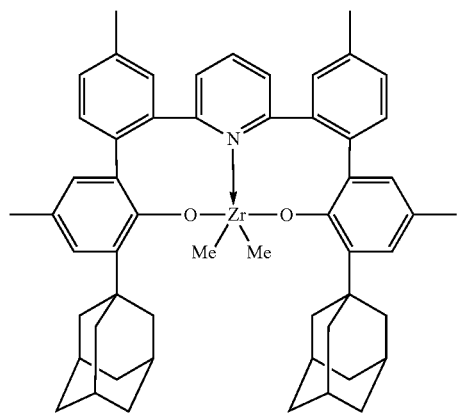
-continued
Complex 5
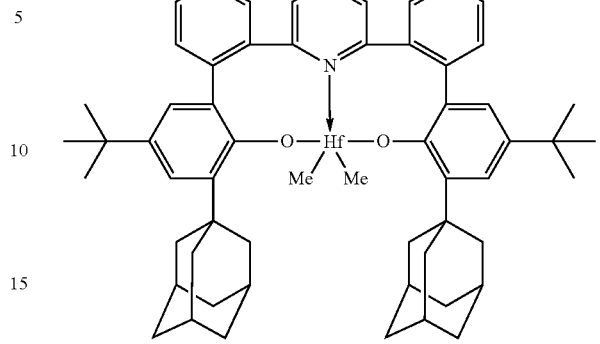
Complex 6
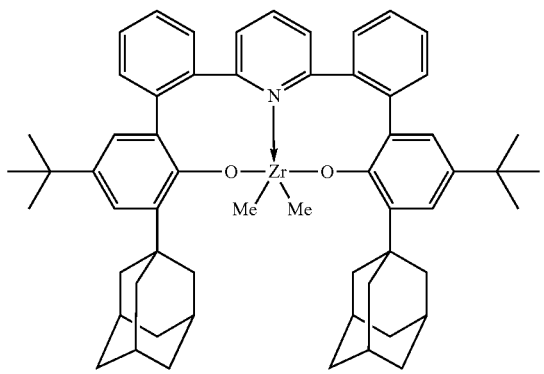
Complex 7
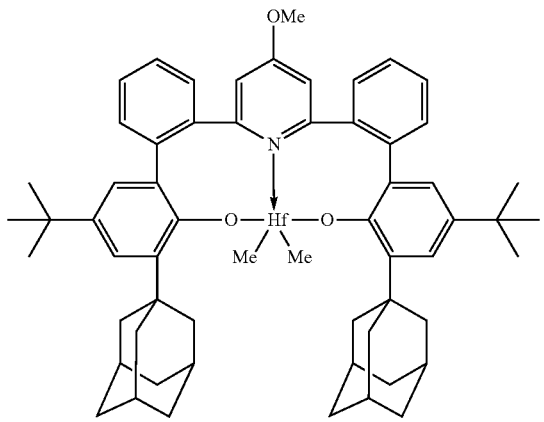

Complex 8
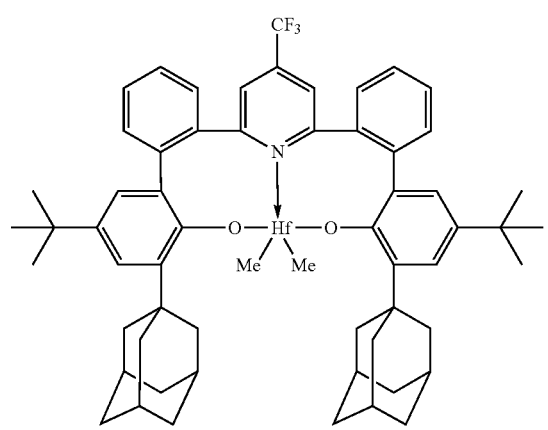
Complex 9
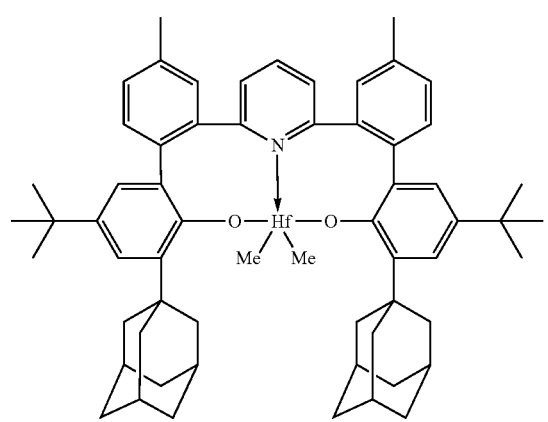
Complex 10
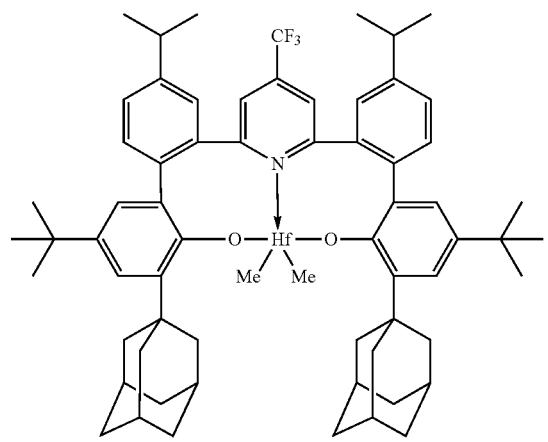
Complex 11
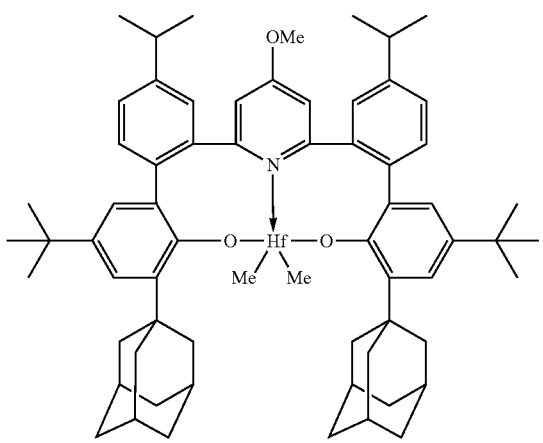
Complex 12
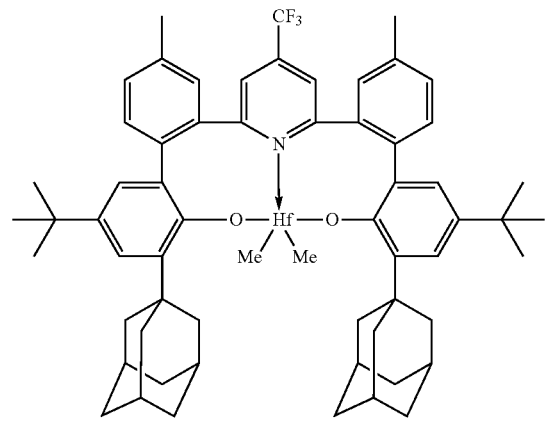
Complex 13
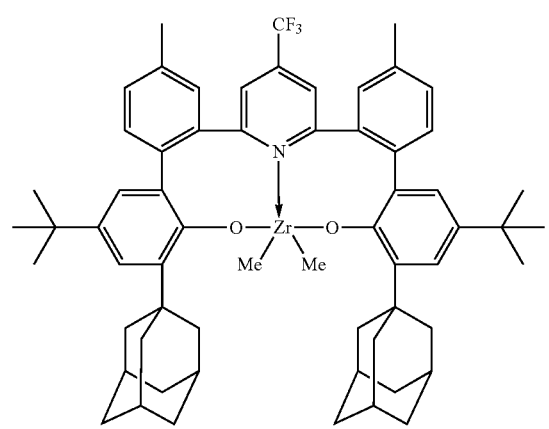

Complex 14
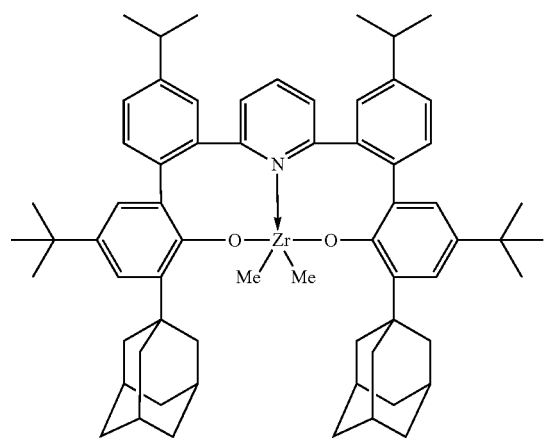
Complex 15
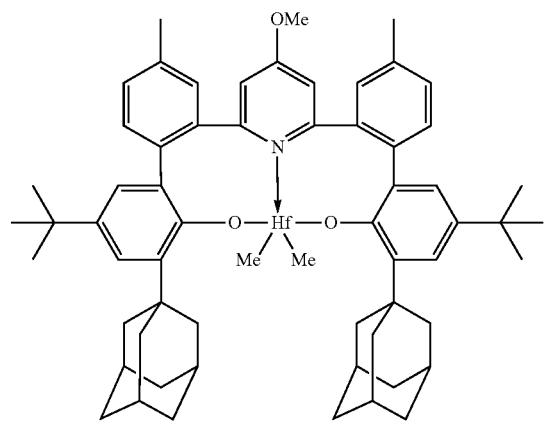
Complex 16
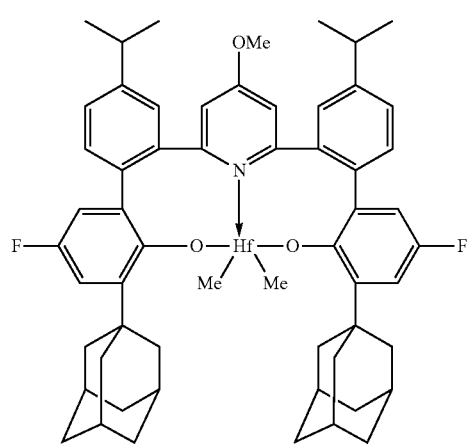
Complex 17
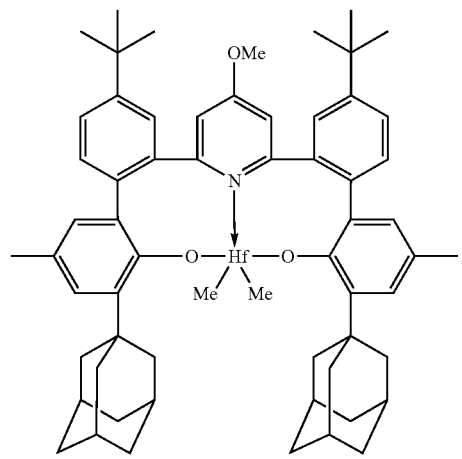
Complex 18
Complex 19
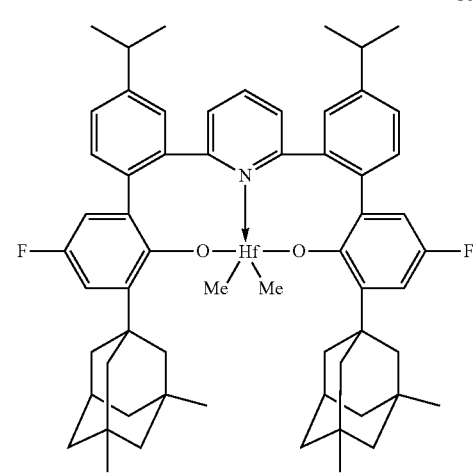

Complex 20
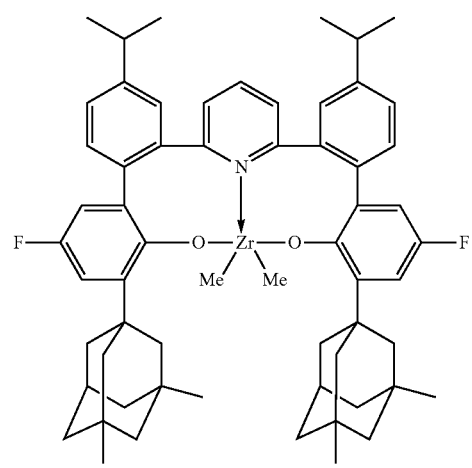
Complex 21
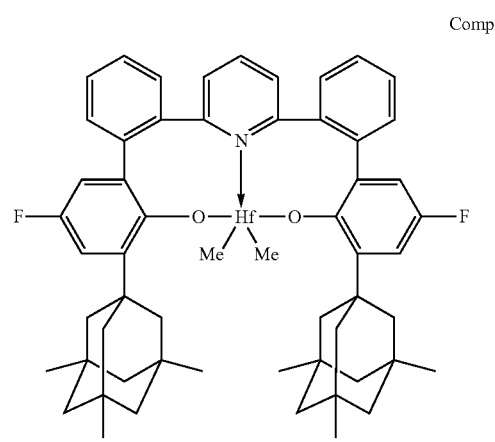
Complex 22
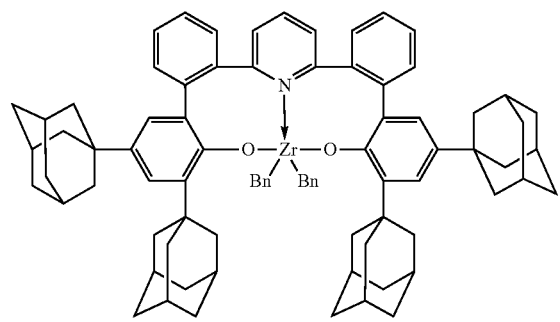
Complex 23
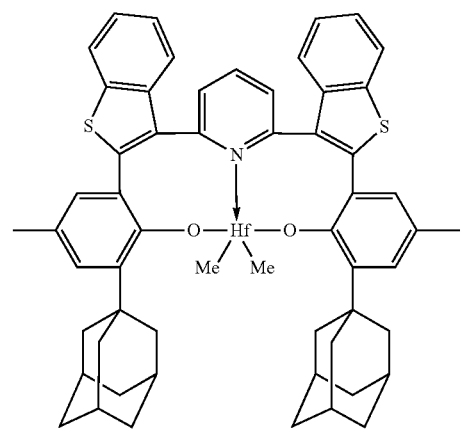
Complex 24
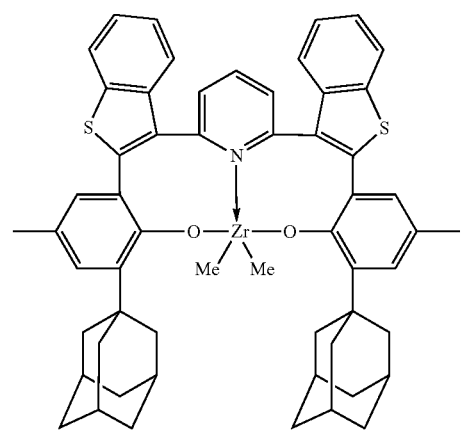
Complex 25
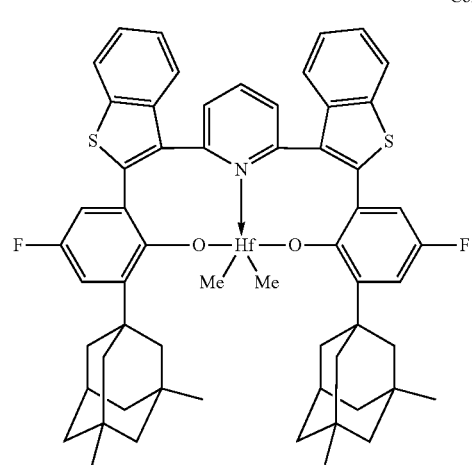

Complex 26

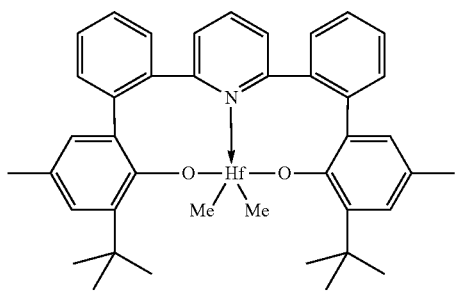

Complex 27

Complex 29

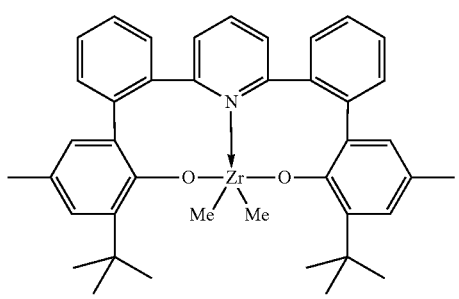

Complex 30

Complex 31

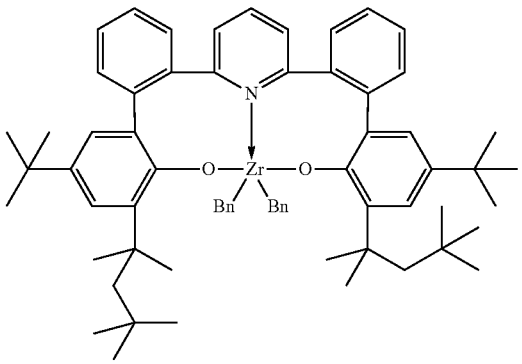

Complex 32

In some embodiments, two or more different catalyst compounds are present in the catalyst system used herein. In some embodiments, two or more different catalyst compounds are present in the reaction zone where the process(es) described herein occur. It is preferable to use the same activator for the transition metal compounds, however, two different activators, such as a non-coordinating anion activator and an alumoxane, can be used in combination. If one or more transition metal compounds contain an X group which is not a hydride, hydrocarbyl, or substituted hydrocarbyl, then the alumoxane can be contacted with the transition metal compounds prior to addition of the non-coordinating anion activator.

The two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, useful mole percents, based upon the molecular weight of the pre-catalysts, are 10 to 99.9% A to 0.1 to 90% B, alternatively 25 to 99% A to 0.5 to 50% B, alternatively 50 to 99% A to 1 to 25% B, and alternatively 75 to 99% A to 1 to 10% B.

Methods to Prepare the Catalyst Compounds.
Ligand Synthesis

The bis(phenol) ligands may be prepared using the general methods shown in Scheme 1. The formation of the bis(phenol) ligand by the coupling of compound A with compound B (method 1) may be accomplished by known Pd- and Ni-catalyzed couplings, such as Negishi, Suzuki, or Kumada couplings. The formation of the bis(phenol) ligand by the coupling of compound C with compound D (method 2) may also be accomplished by known Pd- and Ni-catalyzed couplings, such as Negishi, Suzuki, or Kumada couplings. Compound D may be prepared from compound E by reaction of compound E with either an organolithium reagent or magnesium metal, followed by optional reaction with a main-group metal halide (e.g. $ZnCl_2$) or boron-based reagent (e.g. $B(O^iPr)_3$, $^iPrOB(pin)$). Compound E may be prepared in a non-catalyzed reaction from by the reaction of an aryllithium or aryl Grignard reagent (compound F) with a dihalogenated arene (compound G), such as 1-bromo-2-chlorobenzene. Compound E may also be prepared in a Pd- or Ni-catalyzed reaction by reaction of an arylzinc or aryl-boron reagent (compound F) with a dihalogenated arene (compound G).

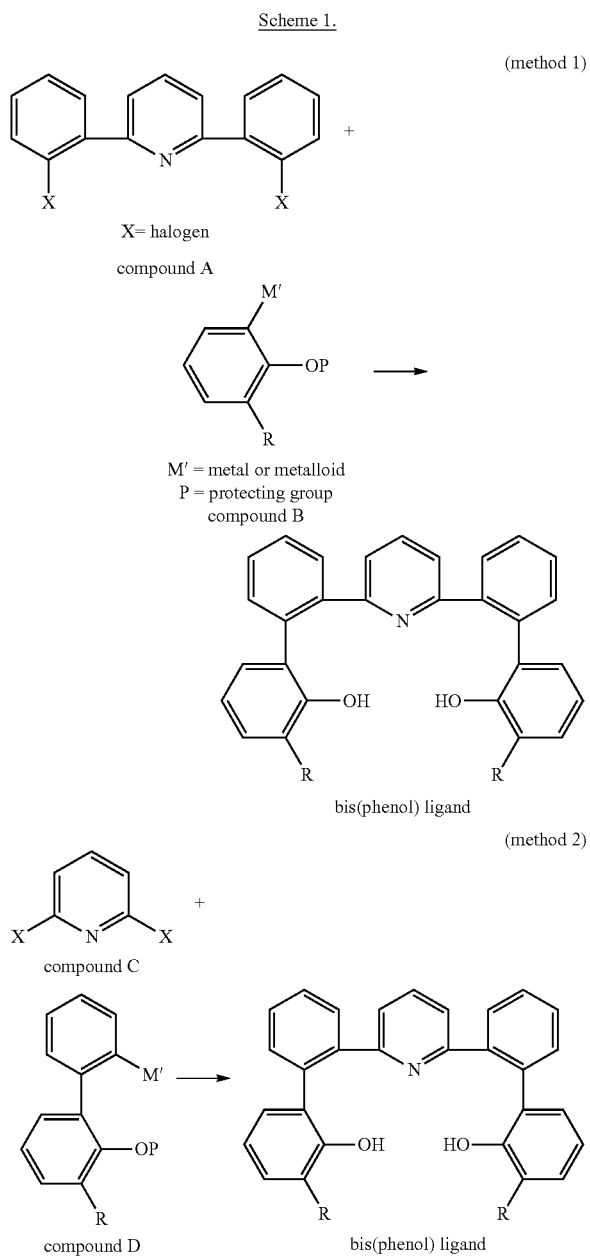

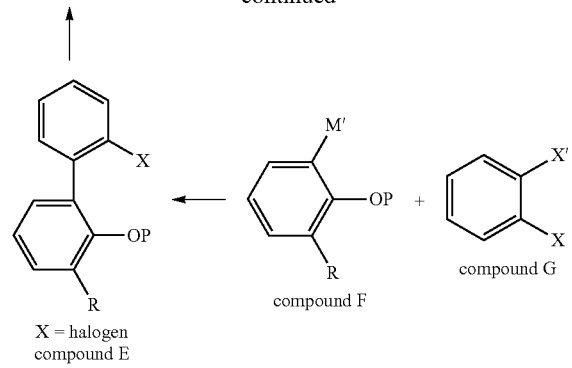

where M' is a group 1, 2, 12, or 13 element or substituted element such as Li, MgCl, MgBr, ZnCl, $B(OH)_2$, B(pinacolate), P is a protective group such as methoxymethyl (MOM), tetrahydropyranyl (THP), t-butyl, allyl, ethoxymethyl, trialkylsilyl, t-butyldimethylsilyl, or benzyl, R is a $C_1$-$C_{40}$ alkyl, substituted alkyl, aryl, tertiary alkyl, cyclic tertiary alkyl, adamantanyl, or substituted adamantanyl and each X' and X is halogen, such as Cl, Br, F or I.

It is preferred that the bis(phenol) ligand and intermediates used for the preparation of the bis(phenol) ligand are prepared and purified without the use of column chromatography. This may be accomplished by a variety of methods that include distillation, precipitation and washing, formation of insoluble salts (such as by reaction of a pyridine derivative with an organic acid), and liquid-liquid extraction. Preferred methods include those described in Practical Process Research and Development—A Guide for Organic Chemists by Neal C. Anderson (ISBN: 1493300125X).

Synthesis of Carbene Bis(Phenol) Ligands

The general synthetic method to produce carbene bis(phenol) ligands is shown in Scheme 2. A substituted phenol can be ortho-brominated then protected by a known phenol protecting group, such as MOM, THP, t-butyldimethylsilyl (TBDMS), benzyl (Bn), etc. The bromide is then converted to a boronic ester (compound I) or boronic acid which can be used in a Suzuki coupling with bromoaniline. The biphenylaniline (compound J) can be bridged by reaction with dibromoethane or condensation with oxalaldehyde, then deprotected (compound K). Reaction with triethyl orthoformate forms an iminium salt that is deprotonated to a carbene.

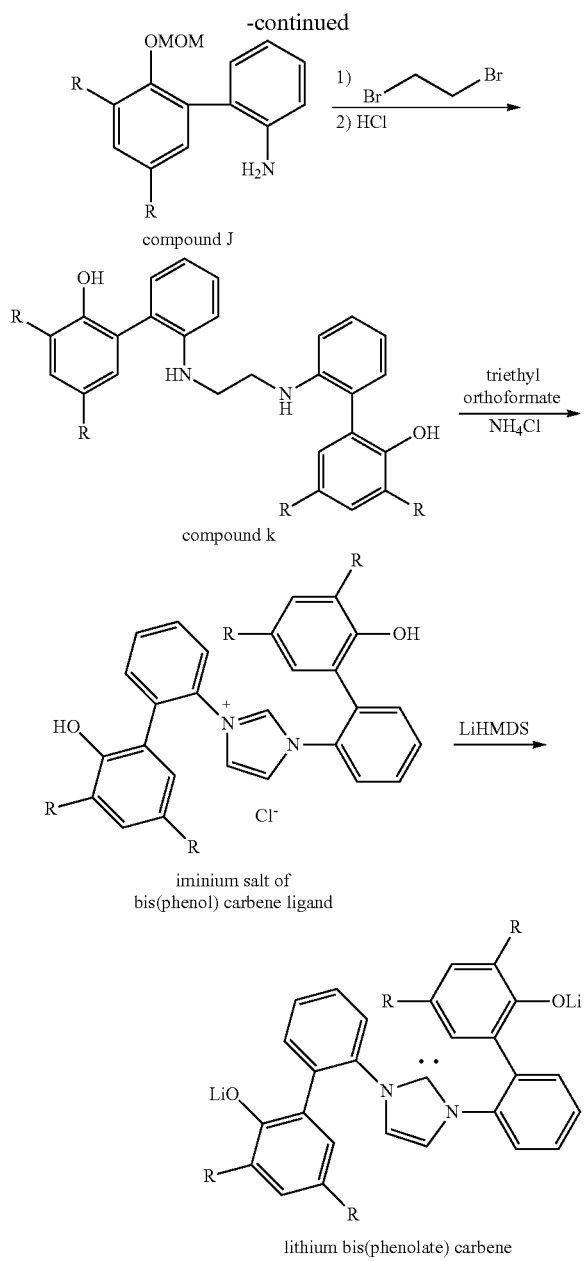

compound J compound k iminium salt of bis(phenol) carbene ligand lithium bis(phenolate) carbene The substituted phenol (compound H) dissolved in methylene chloride, is added an equivalent of N-bromosuccinimide and 0.1 equivalent of diisopropylamine. After stirring at ambient temperature until completion, the reaction is quenched with a 10% solution of HCl. The organic portion is washed with brine, dried over magnesium sulfate, filtered, and concentrated under reduced pressure to give a bromophenol, typically as a solid. The substituted bromophenol, methoxymethylchloride, and potassium carbonate are dissolved in dry acetone and stirred at ambient temperature until completion of the reaction. The solution is filtered and the filtrate concentrated to give protected phenol (compound I). Alternatively, the substituted bromophenol and an equivalent of dihydropyran is dissolved in methylene chloride and cooled to 0° C. A catalytic amount of para-toluenesulfonic acid is added and the reaction stirred for 10 minutes, then quenched with trimethylamine. The mixture is washed with water and brine, then dried over magnesium sulfate, filtered, and concentrated under reduced pressure to give a tetrahydropyran-protected phenol.

Aryl bromide (compound I) is dissolved in THF and cooled to −78° C. n-Butyllithium is added slowly, followed by trimethoxy borate. The reaction is allowed to stir at ambient temperature until completion. The solvent is removed and the solid boronic ester washed with pentane. A boronic acid can be made from the boronic ester by treatment with HCl. The boronic ester or acid is dissolved in toluene with an equivalent of ortho-bromoaniline and a catalytic amount of palladium tetrakistriphenylphosphine. An aqueous solution of sodium carbonated is added and the reaction heated at reflux overnight. Upon cooling, the layers are separated and the aqueous layer extracted with ethyl acetate. The combined organic portions are washed with brine, dried (MgSO4), filtered, and concentrated under reduced pressure. Column chromatography is typically used to purify the coupled product (compound J).

The aniline (compound J) and dibromoethane (0.5 equiv.) are dissolved in acetonitrile and heated at 60° C. overnight. The reaction is filtered and concentrated to give an ethylene bridged dianiline. The protected phenol is deprotected by reaction with HCl to give a bridged bisamino(biphenyl)ol (compound K).

The diamine (compound K) is dissolved in triethylorthoformate. Ammonium chloride is added and the reaction heated at reflux overnight. A precipitate is formed which is collected by filtration and washed with ether to give the iminium salt. The iminium chloride is suspended in THF and treated with lithium or sodium hexamethyldisilylamide. Upon completion, the reaction is filtered and the filtrate concentrated to give the carbene ligand.

Preparation of Bis(Phenolate) Complexes

Transition metal or Lanthanide metal bis(phenolate) complexes are used as catalyst components for olefin polymerization in the present invention. The terms "catalyst" and "catalyst complex" are used interchangeably. The preparation of transition metal or Lanthanide metal bis(phenolate) complexes may be accomplished by reaction of the bis(phenol) ligand with a metal reactant containing anionic basic leaving groups. Typical anionic basic leaving groups include dialkylamido, benzyl, phenyl, hydrido, and methyl. In this reaction, the role of the basic leaving group is to deprotonate the bis(phenol) ligand. Suitable metal reactants for this type of reaction include, but are not limited to, $HfBn_4$ ($Bn=CH_2Ph$), $ZrBn_4$, $TiBn_4$, $ZrBn_2Cl_2(OEt_2)$, $HfBn_2Cl_2(OEt_2)_2$, $Zr(NMe_2)_2Cl_2(dimethoxyethane)$, $Hf(NMe_2)_2Cl_2(dimethoxyethane)$, $Hf(NMe_2)_4$, $Zr(NMe_2)_4$, and $Hf(NEt_2)_4$. Suitable metal reagents also include $ZrMe_4$, $HfMe_4$, and other group 4 alkyls that may be formed in situ and used without isolation.

A second method for the preparation of transition metal or Lanthanide bis(phenolate) complexes is by reaction of the bis(phenol) ligand with an alkali metal or alkaline earth metal base (e.g., Na, BuLi, $^iPrMgBr$) to generate deprotonated ligand, followed by reaction with a metal halide (e.g., $HfCl_4$, $ZrCl_4$) to form a bis(phenolate) complex. Bis(phenoate) metal complexes that contain metal-halide, alkoxide, or amido leaving groups may be alkylated by reaction with organolithium, Grignard, and organoaluminum reagents. In the alkylation reaction the alkyl groups are transferred to the bis(phenolate) metal center and the leaving groups are removed. Reagents typically used for the alkylation reaction include, but are not limited to, MeLi, MeMgBr, $AlMe_3$, $Al(^iBu)_3$, $AlOct_3$, and $PhCH_2MgCl$. Typically 2 to 20 molar equivalents of the alkylating reagent are added to the bis (phenolate) complex. The alkylations are generally performed in etherial or hydrocarbon solvents or solvent mixtures at temperatures typically ranging from −80° C. to 120° C.

Activators

The terms "cocatalyst" and "activator" are used herein interchangeably.

The catalyst systems described herein typically comprises a catalyst complex, such as the transition metal or Lanthanide bis(phenolate) complexes described above, and an activator such as alumoxane (the term alumoxane is synonymous with aluminoxane) or a non-coordinating anion. These catalyst systems may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, ionizing activators, which may be neutral or ionic, and conventional-type cocatalysts. Preferred activators typically include alumoxane compounds, modified alumoxane compounds, and ionizing anion precursor compounds that abstract a reactive metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), typically the maximum amount of activator is at up to a 5,000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl) boron, that can react with a catalyst to form an activated species by abstraction of an anionic group. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of this invention to use an ionizing activator, neutral or ionic. It is also within the scope of this invention to use neutral or ionic activators alone or in combination with alumoxane or modified alumoxane activators.

In embodiments of the invention, the activator is represented by the Formula (III):

$$(Z)_d^+ (A^{d-}) \quad\quad\quad (III)$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3 (such as 1, 2 or 3), preferably Z is ($Ar_3C+$), where Ar is aryl or aryl substituted with a heteroatom, a $C_1$ to $C_{40}$ hydrocarbyl, or a substituted $C_1$ to $C_{40}$ hydrocarbyl. The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 40 carbon atoms (optionally with the proviso that in not more than 1 occurrence is Q a halide). Preferably, each Q is a fluorinated hydrocarbyl group having 1 to 40 (such as 1 to 20) carbon atoms, more preferably each Q is a fluorinated aryl group, such as a perfluorinated aryl group and most preferably each Q is a pentafluoryl aryl group or perfluoronaphthalenyl group. Examples of suitable $A^{d-}$ also include diboron compounds as disclosed in U.S. Pat. No. 5,447,895, which is fully incorporated herein by reference.

When Z is the activating cation (L-H), it can be a Bronsted acid, capable of donating a proton to the transition metal catalytic precursor resulting in a transition metal cation, including ammoniums, oxoniums, phosphoniums, sulfoniums, and mixtures thereof, such as ammoniums of methylamine, aniline, dimethylamine, diethylamine, N-methylaniline, N-methyl-4-nonadecyl-N-octadecylaniline, N-methyl-4-octadecyl-N-octadecylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether, diethyl ether, tetrahydrofuran and dioxane, sulfoniums from thioethers, such as diethyl thioethers, tetrahydrothiophene, and mixtures thereof.

In particularly useful embodiments of the invention, the activator is soluble in non-aromatic-hydrocarbon solvents, such as aliphatic solvents.

In one or more embodiments, a 20 wt % mixture of the activator compound in n-hexane, isohexane, cyclohexane, methylcyclohexane, or a combination thereof, forms a clear homogeneous solution at 25° C., preferably a 30 wt % mixture of the activator compound in n-hexane, isohexane, cyclohexane, methylcyclohexane, or a combination thereof, forms a clear homogeneous solution at 25° C.

In embodiments of the invention, the activators described herein have a solubility of more than 10 mM (or more than 20 mM, or more than 50 mM) at 25° C. (stirred 2 hours) in methylcyclohexane.

In embodiments of the invention, the activators described herein have a solubility of more than 1 mM (or more than 10 mM, or more than 20 mM) at 25° C. (stirred 2 hours) in isohexane.

In embodiments of the invention, the activators described herein have a solubility of more than 10 mM (or more than 20 mM, or more than 50 mM) at 25° C. (stirred 2 hours) in methylcyclohexane and a solubility of more than 1 mM (or more than 10 mM, or more than 20 mM) at 25° C. (stirred 2 hours) in isohexane.

In a preferred embodiment, the activator is a non-aromatic-hydrocarbon soluble activator compound.

Non-aromatic-hydrocarbon soluble activator compounds useful herein include those represented by the Formula (V):

wherein:
E is nitrogen or phosphorous;
d is, 2 or 3; k is, 2, or 3; n is, 2, 3, 4, 5, or 6; n–k=d (preferably d is 1, 2 or 3; k is 3; n is 4, 5, or 6);
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups, wherein $R^{1'}$, $R^{2'}$, and $R^{3'}$ together comprise 15 or more carbon atoms;
Mt is an element selected from group 13 of the Periodic Table of the Elements, such as B or Al; and
each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VI):

wherein: E is nitrogen or phosphorous; $R^{1'}$ is a methyl group; $R^{2'}$ and $R^{3'}$ are independently is $C_4$-$C_{50}$ hydrocarbyl group optionally substituted with one or more alkoxy groups, silyl groups, a halogen atoms, or halogen containing groups wherein $R^{2'}$ and $R^{3'}$ together comprise 14 or more carbon atoms; B is boron; and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Non-aromatic-hydrocarbon soluble activator compounds useful herein include those represented by the Formula (VII) or Formula (VIII):

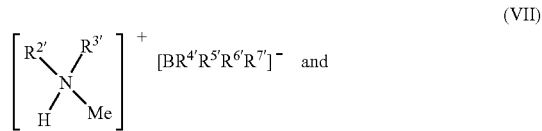

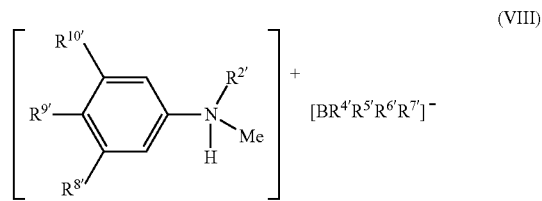

wherein:
N is nitrogen;
$R^{2'}$ and $R^{3'}$ are independently is $C_6$-$C_{40}$ hydrocarbyl group optionally substituted with one or more alkoxy groups, silyl groups, a halogen atoms, or halogen containing groups wherein $R^{2'}$ and $R^{3'}$ (if present) together comprise 14 or more carbon atoms;
$R^{8'}$, $R^{9'}$, and $R^{10'}$ are independently a $C_4$-$C_{30}$ hydrocarbyl or substituted $C_4$-$C_{30}$ hydrocarbyl group;
B is boron;
and $R^{4'}$, $R^{5'}$, $R^{6'}$, and $R^{7'}$ are independently hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Optionally, in any of Formulas (V), (VI), (VII), or (VIII) herein, $R^{4'}$, $R^{5'}$, $R^{6'}$, and $R^{7'}$ are pentafluorophenyl.

Optionally, in any of Formulas (V), (VI), (VII), or (VIII) herein, $R^{4'}$, $R^{5'}$, $R^{6'}$, and $R^{7'}$ are pentafluoronaphthalenyl.

Optionally, in any embodiment of Formula (VIII) herein, $R^8$ and $R^{10'}$ are hydrogen atoms and $R^{9'}$ is a $C_4$-$C_{30}$ hydrocarbyl group which is optionally substituted with one or more alkoxy groups, silyl groups, a halogen atoms, or halogen containing groups.

Optionally, in any embodiment of Formula (VIII) herein, $R^{9'}$ is a $C_8$-$C_{22}$ hydrocarbyl group which is optionally substituted with one or more alkoxy groups, silyl groups, a halogen atoms, or halogen containing groups.

Optionally, in any embodiment of Formula (VII) or (VIII) herein, $R^{2'}$ and $R^{3'}$ are independently a $C_{12}$-$C_{22}$ hydrocarbyl group.

Optionally, $R^{1'}$, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{2'}$ and $R^{3'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, $R^{8'}$, $R^{9'}$, and $R^{10'}$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 38 or more carbon atoms, such as 40 or more carbon atoms, such as 15 to 100 carbon atoms, such as 25 to 75 carbon atoms).

Optionally, when Q is a fluorophenyl group, then $R^{2'}$ is not a $C_1$-$C_{40}$ linear alkyl group (alternately $R^{2'}$ is not an optionally substituted $C_1$-$C_{40}$ linear alkyl group).

Optionally, each of $R^{4'}$, $R^{5'}$, $R^{6'}$, and $R^{7'}$ is an aryl group (such as phenyl or naphthalenyl), wherein at least one of $R^{4'}$, $R^{5'}$, $R^{6'}$, and $R^{7'}$ is substituted with at least one fluorine atom, preferably each of $R^{4'}$, $R^{5'}$, $R^{6'}$, and $R^{7'}$ is a perfluoroaryl group (such as perfluorophenyl or perfluoronaphthalenyl).

Optionally, each Q is an aryl group (such as phenyl or naphthalenyl), wherein at least one Q is substituted with at least one fluorine atom, preferably each Q is a perfluoroaryl group (such as perfluorophenyl or perfluoronaphthalenyl).

Optionally, $R^{1'}$ is a methyl group; $R^{2'}$ is $C_6$-$C_{50}$ aryl group; and $R^{3'}$ is independently $C_1$-$C_{40}$ linear alkyl or $C_5$-$C_{50}$-aryl group.

Optionally, each of $R^{2'}$ and $R^{3'}$ is independently unsubstituted or substituted with at least one of halide, $C_1$-$C_{35}$ alkyl, $C_5$-$C_{15}$ aryl, $C_6$-$C_{35}$ arylalkyl, $C_6$-$C_{35}$ alkylaryl, wherein $R^2$, and $R^3$ together comprise 20 or more carbon atoms.

Optionally, each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, provided that when Q is a fluorophenyl group, then $R^{2'}$ is not a $C_1$-$C_{40}$ linear alkyl group, preferably $R^{2'}$ is not an optionally substituted $C_1$-$C_{40}$ linear alkyl group (alternately when Q is a substituted phenyl group, then $R^{2'}$ is not a $C_1$-$C_{40}$ linear alkyl group, preferably $R^{2'}$ is not an optionally substituted $C_1$-$C_{40}$ linear alkyl group). Optionally, when Q is a fluorophenyl group (alternately when Q is a substituted phenyl group), then $R^{2'}$ is a meta- and/or para-substituted phenyl group, where the meta and para substituents are, independently, an optionally substituted $C_1$ to $C_{40}$ hydrocarbyl group (such as a $C_6$ to $C_{40}$ aryl group or linear alkyl group, a $C_{12}$ to $C_{30}$ aryl group or linear alkyl group, or a $C_{10}$ to $C_{20}$ aryl group or linear alkyl group), an optionally substituted alkoxy group, or an optionally substituted silyl group. Optionally, each Q is a fluorinated hydrocarbyl group having 1 to 30 carbon atoms, more preferably each Q is a fluorinated aryl (such as phenyl or naphthalenyl) group, and most preferably each Q is a perflourinated aryl (such as phenyl or naphthalenyl) group. Examples of suitable $[Mt^{k+}Q_n]^{d-}$ also include diboron compounds as disclosed in U.S. Pat. No. 5,447,895, which is fully incorporated herein by reference. Optionally, at least one Q is not substituted phenyl. Optionally all Q are not substituted phenyl. Optionally at least one Q is not perfluorophenyl. Optionally all Q are not perfluorophenyl.

In some embodiments of the invention, $R^{1'}$ is not methyl, $R^{2'}$ is not $C_{18}$ alkyl and $R^{3'}$ is not $C_{18}$ alkyl, alternately $R^{1'}$ is not methyl, $R^{2'}$ is not $C_{18}$ alkyl and $R^{3'}$ is not $C_{18}$ alkyl and at least one Q is not substituted phenyl, optionally all Q are not substituted phenyl.

Useful cation components in Formulas (III) and (V) to (VIII) include those represented by the formula:

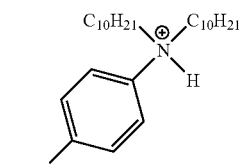

10

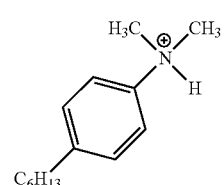

11

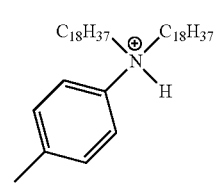

12

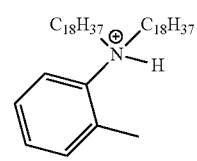

13

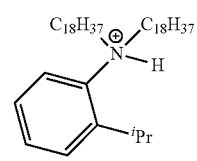

14

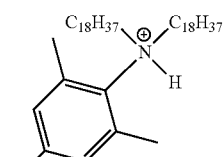

15

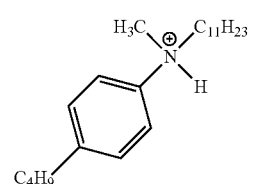

16

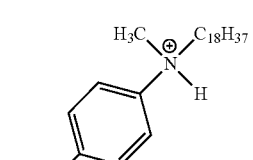

17

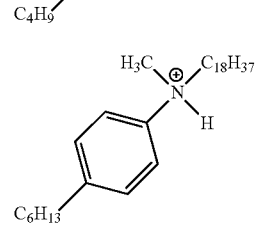

18

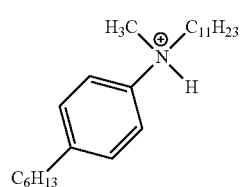
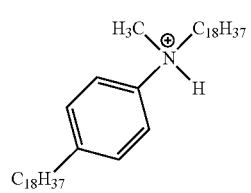
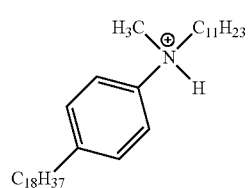
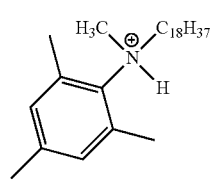
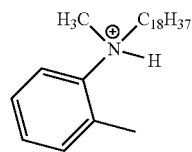
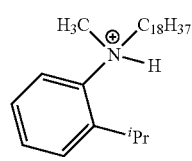
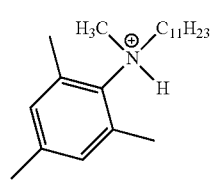
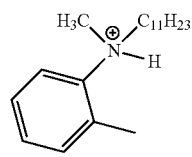
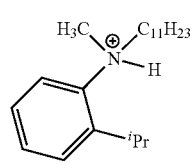
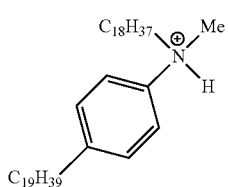
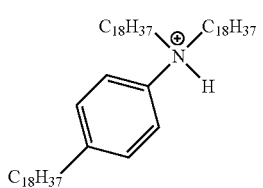
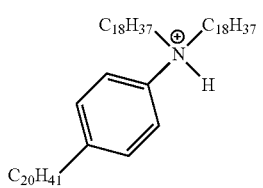
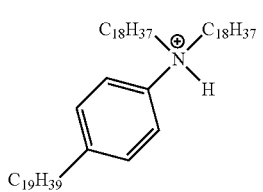
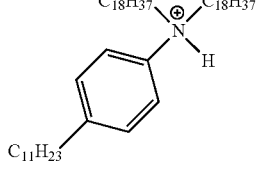
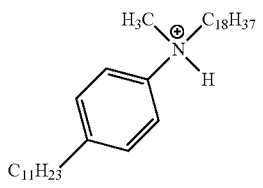
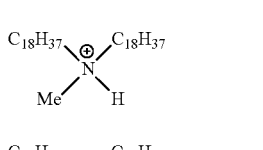
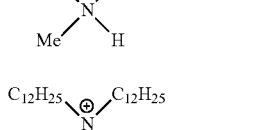
Useful cation components in Formulas (III) and (V) to (VIII) include those represented by the formulas:

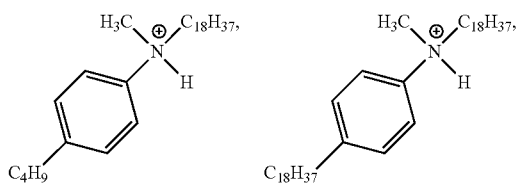

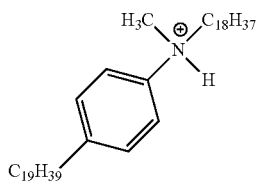

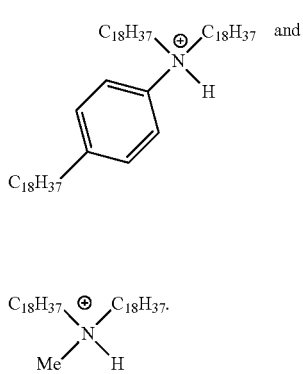

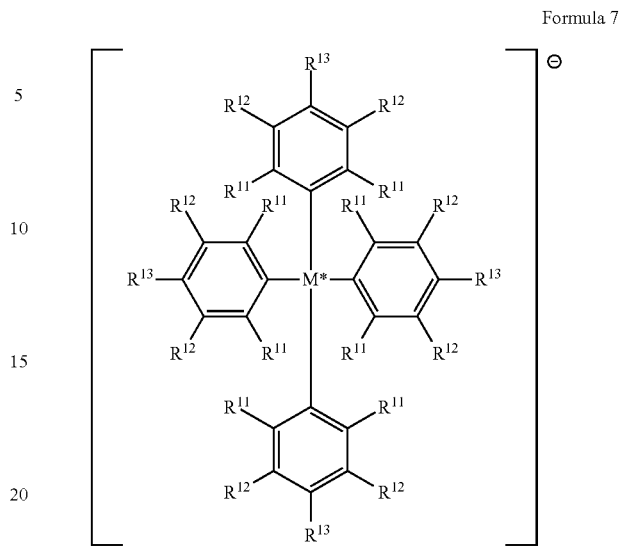

Formula 7 wherein:
M* is a group 13 atom, preferably B or Al, preferably B;
each $R^{11}$ is, independently, a halide, preferably a fluoride;
each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;
each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;
wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

The anion component of the activators described herein includes those represented by the formula $[Mt^{k+}Q_n]^-$ wherein k is 1, 2, or 3; n is 1, 2, 3, 4, 5, or 6 (preferably 1, 2, 3, or 4), (preferably k is 3; n is 4, 5, or 6, preferably when M is B, n is 4); Mt is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group, optionally having 1 to 20 carbon atoms, more preferably each Q is a fluorinated aryl group, and most preferably each Q is a perfluorinated aryl group. Preferably at least one Q is not substituted phenyl, such as perfluorophenyl, preferably all Q are not substituted phenyl, such as perfluorophenyl.

In one embodiment, the borate activator comprises tetrakis(heptafluoronaphth-2-yl)borate.

In one embodiment, the borate activator comprises tetrakis(pentafluorophenyl)borate.

Anions for use in the non-coordinating anion activators described herein also include those represented by Formula 7, below:

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: $MV=8.3V_S$, where $V_S$ is the scaled volume. $V_S$ is the sum of the relative volumes of the constituent atoms, and is calculated from the molecular formula of the substituent using Table A below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE A

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

Exemplary anions useful herein and their respective scaled volumes and molecular volumes are shown in Table B below. The dashed bonds indicate bonding to boron.

TABLE B

| Ion | Structure of Boron Substituents | Molecular Formula of Each Substituent | $V_S$ | MV Per subst. (Å³) | Calculated Total MV (Å³) |
|---|---|---|---|---|---|
| tetrakis(perfluorophenyl)borate | [structure] | $C_6F_5$ | 22 | 183 | 732 |
| tris(perfluorophenyl)-(perfluoronaphthalenyl)borate | [structure] | $C_6F_5$<br>$C_{10}F_7$ | 22<br>34 | 183<br>261 | 810 |
| (perfluorophenyl)tris-(perfluoronaphthalenyl)borate | [structure] | $C_6F_5$<br>$C_{10}F_7$ | 22<br>34 | 183<br>261 | 966 |
| tetrakis(perfluoronaphthalenyl)borate | [structure] | $C_{10}F_7$ | 34 | 261 | 1044 |
| tetrakis(perfluorobiphenyl)borate | [structure] | $C_{12}F_9$ | 42 | 349 | 1396 |

| Ion | Structure of Boron Substituents | Molecular Formula of Each Substituent | $V_S$ | MV Per subst. (Å³) | Calculated Total MV (Å³) |
|---|---|---|---|---|---|
| [(C₆F₃(C₆F₅)₂)₄B] | 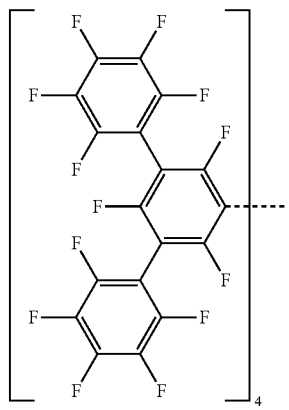 | $C_{18}F_{13}$ | 62 | 515 | 2060 |

The activators may be added to a polymerization in the form of an ion pair using, for example, [M2HTH]+[NCA]− in which the di(hydrogenated tallow)methylamine ("M2HTH") cation reacts with a basic leaving group on the transition metal complex to form a transition metal complex cation and [NCA]−. Alternatively, the transition metal complex may be reacted with a neutral NCA precursor, such as B(C₆F₅)₃, which abstracts an anionic group from the complex to form an activated species. Useful activators include di(hydrogenated tallow)methylammonium[tetrakis(pentafluorophenyl)borate] (i.e., [M2HTH]B(C₆F₅)₄) and di(octadecyl)tolylammonium [tetrakis(pentafluorophenyl)borate] (i.e., [DOdTH]B(C₆F₅)₄).

Activator compounds that are particularly useful in this invention include one or more of:

N,N-di(hydrogenated tallow)methylammonium [tetrakis(perfluorophenyl) borate],
N-methyl-4-nonadecyl-N-octadecylanilinium [tetrakis(perfluorophenyl)borate],
N-methyl-4-hexadecyl-N-octadecylanilinium [tetrakis(perfluorophenyl)borate],
N-methyl-4-tetradecyl-N-octadecylanilinium [tetrakis(perfluorophenyl)borate],
N-methyl-4-dodecyl-N-octadecylanilinium [tetrakis(perfluorophenyl)borate],
N-methyl-4-decyl-N-octadecylanilinium [tetrakis(perfluorophenyl)borate],
N-methyl-4-octyl-N-octadecylanilinium [tetrakis(perfluorophenyl)borate],
N-methyl-4-hexyl-N-octadecylanilinium [tetrakis(perfluorophenyl)borate],
N-methyl-4-butyl-N-octadecylanilinium [tetrakis(perfluorophenyl)borate],
N-methyl-4-octadecyl-N-decylanilinium [tetrakis(perfluorophenyl)borate],
N-methyl-4-nonadecyl-N-dodecylanilinium [tetrakis(perfluorophenyl)borate],
N-methyl-4-nonadecyl-N-tetradecylanilinium [tetrakis(perfluorophenyl)borate],
N-methyl-4-nonadecyl-N-hexadecylanilinium [tetrakis(perfluorophenyl)borate],
N-ethyl-4-nonadecyl-N-octadecylanilinium [tetrakis(perfluorophenyl)borate],
N-methyl-N,N-dioctadecylammonium [tetrakis(perfluorophenyl)borate],
N-methyl-N,N-dihexadecylammonium [tetrakis(perfluorophenyl)borate],
N-methyl-N,N-ditetradecylammonium [tetrakis(perfluorophenyl)borate],
N-methyl-N,N-didodecylammonium [tetrakis(perfluorophenyl)borate],
N-methyl-N,N-didecylammonium [tetrakis(perfluorophenyl)borate],
N-methyl-N,N-dioctylammonium [tetrakis(perfluorophenyl)borate],
N-ethyl-N,N-dioctadecylammonium [tetrakis(perfluorophenyl)borate],
N,N-di(octadecyl)tolylammonium [tetrakis(perfluorophenyl)borate],
N,N-di(hexadecyl)tolylammonium [tetrakis(perfluorophenyl)borate],
N,N-di(tetradecyl)tolylammonium [tetrakis(perfluorophenyl)borate],
N,N-di(dodecyl)tolylammonium [tetrakis(perfluorophenyl) borate],
N-octadecyl-N-hexadecyl-tolylammonium [tetrakis(perfluorophenyl)borate],
N-octadecyl-N-hexadecyl-tolylammonium [tetrakis(perfluorophenyl)borate],
N-octadecyl-N-tetradecyl-tolylammonium [tetrakis(perfluorophenyl)borate],
N-octadecyl-N-dodecyl-tolylammonium [tetrakis(perfluorophenyl)borate],
N-octadecyl-N-decyl-tolylammonium [tetrakis(perfluorophenyl)borate],
N-hexadecyl-N-tetradecyl-tolylammonium [tetrakis(perfluorophenyl)borate],
N-hexadecyl-N-dodecyl-tolylammonium [tetrakis(perfluorophenyl)borate],
N-hexadecyl-N-decyl-tolylammonium [tetrakis(perfluorophenyl)borate],
N-tetradecyl-N-dodecyl-tolylammonium [tetrakis(perfluorophenyl)borate],
N-tetradecyl-N-decyl-tolylammonium [tetrakis(perfluorophenyl)borate], N-dodecyl-N-decyl-tolylammonium [tetrakis(perfluorophenyl)borate],
N-methyl-N-octadecylanilinium [tetrakis(perfluorophenyl)borate],
N-methyl-N-hexadecylanilinium [tetrakis(perfluorophenyl)borate],
N-methyl-N-tetradecylanilinium [tetrakis(perfluorophenyl)borate],
N-methyl-N-dodecylanilinium [tetrakis(perfluorophenyl)borate],
N-methyl-N-decylanilinium [tetrakis(perfluorophenyl)borate], and
N-methyl-N-octylanilinium [tetrakis(perfluorophenyl)borate].

Additional useful activators, including non-aromatic-hydrocarbon soluble activators, are described in U.S. Ser. No. 16/394,166 filed Apr. 25, 2019, U.S. Ser. No. 16/394,186, filed Apr. 25, 2019, and U.S. Ser. No. 16/394,197, filed Apr. 25, 2019, which are incorporated by reference herein.

Likewise, particularly useful activators also include dimethylaniliniumtetrakis (pentafluorophenyl) borate and dimethyl anilinium tetrakis(heptafluoro-2-naphthalenyl) borate. For a more detailed description of useful activators please see WO 2004/026921 page 72, paragraph [00119] to page 81 paragraph [00151]. A list of additionally particularly useful activators that can be used in the practice of this invention may be found at page 72, paragraph [00177] to page 74, paragraph [00178] of WO 2004/046214.

For descriptions of useful activators please see U.S. Pat. Nos. 8,658,556 and 6,211,105.

Preferred activators for use herein also include N-methyl-4-nonadecyl-N-octadecylbenzenaminium tetrakis(pentafluorophenyl)borate, N-methyl-4-nonadecyl-N-octadecylbenzenaminium tetrakis(perfluoronaphthalenyl)borate, N,N-dimethylanilinium tetrakis(perfluoronaphthalenyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthalenyl)borate, triphenylcarbenium tetrakis(perfluorobiphenyl)borate, triphenylcarbenium tetrakis(3,5-bis(trifluoromethyl)phenyl)borate, triphenylcarbenium tetrakis (perfluorophenyl)borate, [Me$_3$NH$^+$][B(C$_6$F$_5$)$_4$$^-$]; 1-(4-(tris (pentafluorophenyl)borate)-2,3,5,6-tetrafluorophenyl) pyrrolidinium; and tetrakis(pentafluorophenyl)borate, 4-(tris (pentafluorophenyl)borate)-2,3,5,6-tetrafluoropyridine.

In a preferred embodiment, the activator comprises a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthalenyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis (perfluoronaphthalenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthalenyl)borate, N,N-dialkylanilinium tetrakis(perfluoronaphthalenyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 (the disclosures of which are incorporated herein by reference in their entirety) which discuss the use of an alumoxane in combination with an ionizing activator).

Optional Scavengers, Co-Activators, Chain Transfer Agents

In addition to activator compounds, scavengers or co-activators may be used. A scavenger is a compound that is typically added to facilitate polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

Co-activators can include alumoxanes such as methylalumoxane, modified alumoxanes such as modified methylalumoxane, and aluminum alkyls such trimethylaluminum, tri-isobutylaluminum, triethylaluminum, and tri-isopropylaluminum, tri-n-hexylaluminum, tri-n-octylaluminum, tri-n-decylaluminum or tri-n-dodecylaluminum. Co-activators are typically used in combination with Lewis acid activators and ionic activators when the pre-catalyst is not a dihydrocarbyl or dihydride complex. Sometimes co-activators are also used as scavengers to deactivate impurities in feed or reactors.

Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and dialkyl zinc, such as diethyl zinc.

Chain transfer agents may be used in the compositions and or processes described herein. Useful chain transfer agents are typically hydrogen, alkylalumoxanes, a compound represented by the formula AlR$_3$, ZnR$_2$ (where each R is, independently, a C$_1$-C$_8$ aliphatic radical, preferably methyl, ethyl, propyl, butyl, penyl, hexyl octyl or an isomer thereof) or a combination thereof, such as diethyl zinc, trimethylaluminum, triisobutylaluminum, trioctylaluminum, or a combination thereof.

Support Materials

The catalyst system comprises an inert support material. Preferably the supported material is a porous support material, for example, talc, and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$. The support may also comprises a solid oxide optionally treated with an electron-withdrawing anion, wherein the solid oxide is selected from the group consisting of silica, alumina, silica-alumina, silica-zirconia, alumina-zirconia, aluminum phosphate, heteropolytungstates, titania, magnesia, boria, zinc oxide, mixed oxides thereof, and mixture(s) thereof; and the electron-withdrawing anion is selected from the group consisting of fluoride, chloride, bromide, phosphate, triflate, bisulfate, sulfate, and combination(s) thereof.

It is preferred that the support material, most preferably an inorganic oxide, has a surface area in the range of from about 10 to about 700 $m^2$/g, pore volume in the range of from about 0.1 to about 4.0 cc/g and average particle size in the range of from about 5 to about 500 µm. More preferably, the surface area of the support material is in the range of from about 50 to about 500 $m^2$/g, pore volume of from about 0.5 to about 3.5 cc/g and average particle size of from about 10 to about 200 µm. Most preferably the surface area of the support material is in the range is from about 100 to about 400 $m^2$/g, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2$/gm; pore volume of 1.65 $cm^3$/gm). Preferred silicas are available under the tradenames of DAVISON™ 952 or DAVISON™ 955 by the Davison Chemical Division of W. R. Grace and Company. In other embodiments DAVISON™ 948 is used. Other preferred silicas may be obtained from PQ Corporation, for example ES757, ES70, and ES70X.

The support material should be dry, that is, free of absorbed water. Drying of the support material can be effected by heating or calcining at about 100° C. to about 1,000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material may have at least some reactive hydroxyl (OH) groups to produce supported catalyst systems of this invention. The calcined support material is then contacted with at least one polymerization catalyst comprising at least one catalyst compound and an activator.

The support material is slurried in a non-polar solvent and the resulting slurry is contacted with a solution of a catalyst compound and an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the catalyst compound is then contacted with the isolated support/activator. In some embodiments, the supported catalyst system is generated in situ. In alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the catalyst compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as methylcyclohexane, aromatics, such as benzene, toluene, and ethylbenzene, may also be employed.

Polymerization Processes

For the polymerization processes described herein, the term "continuous" means a system that operates without interruption or cessation. For example a continuous process to produce a polymer would be one where the reactants are continually introduced into one or more reactors and polymer product is continually withdrawn.

A solution polymerization means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, et al. (2000) *Ind. Eng. Chem. Res.*, v.29, pg. 4627.

A bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

In embodiments herein, the invention relates to polymerization processes where monomer (such as propylene), and optionally comonomer, are contacted with a catalyst system comprising an activator, a support and at least one catalyst compound, as described above. The catalyst compound, support, and activator may be combined in any order, and are combined typically prior to contacting with the monomer.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof. In a preferred embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another preferred embodiment, the monomer comprises ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, cyclopentene, cycloheptene, cyclooctene, cyclododecene, substituted derivatives thereof, and isomers thereof, preferably hexene, heptene, octene, nonene, decene, dodecene, cyclooctene, 5-methylcyclopentene, cyclopentene, norbornene, 5-ethylidene-2-norbornene, and their respective homologs and derivatives.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Preferred diolefin monomers useful in this invention include any hydrocarbon structure, preferably $C_5$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from non-conjugated diene monomers. More preferably, the diolefin monomers are linear di-vinyl monomers, most preferably those containing from 5 to 30 carbon atoms. Examples of preferred dienes include pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, divinylbenzene, and low molecular weight polybutadienes (Mw less than 1000 g/mol). Preferred cyclic dienes include cyclopentadiene, vinylnorbornene, norbornadiene, and dicyclopentadiene.

Polymerization processes of this invention can be carried out in any manner known in the art. Any suspension, bulk, slurry, or gas phase polymerization process known in the art can be used. Particularly, any suspension, slurry, high pressure tubular or autoclave process, or gas phase polymerization process known in the art can be used under polymerizable conditions. Such processes can be run in a batch, semi-batch, or continuous mode. Gas phase polymerization processes and slurry processes are preferred. Preferably the process is not a homogeneous polymerization process, e.g., a process where preferably at least 90 wt % of the product is soluble in the reaction media. In some embodiments, no solvent or diluent is present or added in the reaction medium, (except for the small amounts used as the carrier for the catalyst system or other additives, or amounts typically found with the monomer; e.g., propane in propylene). In a preferred embodiment of the invention, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

In another embodiment of the invention, the polymerization is performed in the slurry phase. A slurry polymerization process generally operates between 1 to about 50 atmosphere pressure range (15 psi to 735 psi, 103 kPa to 5068 kPa) or even greater and temperatures as described above. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In a class of embodiments, the polymerization is performed in the gas phase, preferably, in a fluidized bed gas phase process. Generally, in a fluidized bed gas phase process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

Useful reactor types and/or processes for the production of polyolefin polymers include, but are not limited to, UNIPOL™ Gas Phase Reactors and processes (available from Univation Technologies); INEOS™ Gas Phase Reactors and Processes; Continuous Flow Stirred-Tank (CSTR) reactors (solution and slurry); Plug Flow Tubular reactors (solution and slurry); Slurry: (e.g., Slurry Loop (single or double loops)) (available from Chevron Phillips Chemical Company) and (Series Reactors) (available from Mitsui Chemicals)); BORSTAR™ Process and Reactors (slurry combined with gas phase); and Multi-Zone Circulating Reactors (MZCR) such as SPHERIZONE™ Reactors and Process available from Lyondell Basell.

Suitable diluents/solvents for polymerizations herein include non-coordinating, inert liquids. Examples include straight and branched-chain hydrocarbons, such as propane, isobutane, butane, pentane, isopentane, neopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In a preferred embodiment, the polymerization, preferably gas phase polymerization: 1) is conducted at temperatures of 0 to 300° C. (preferably 60 to 120° C., preferably 70 to 110° C., preferably 75 to 100° C., preferably 80 to 95° C.); 2) is conducted at a pressure of atmospheric pressure to 10 MPa (preferably 0.35 to 10 MPa, preferably from 0.45 to 6 MPa, preferably from 0.5 to 4 MPa); 3) the polymerization preferably occurs in one reaction zone; 4) the catalyst productivity is at least 1,000 g polymer/g supported catalyst/hr (preferably at least 2,000 g polymer/g supported catalyst/hr, preferably at least 5,000 g polymer/g supported catalyst/hr, preferably at least 8,000 g polymer/g supported catalyst/hr, preferably at least 10,000 g polymer/g supported catalyst/hr, preferably at least 15,000 g polymer/g supported catalyst/hr, preferably at least 20,000 g polymer/g supported catalyst/hr) and 5) optionally hydrogen is present in the polymerization reactor at a partial pressure of 0.001 to 50 psig (0.007 to 345 kPa) (preferably from 0.01 to 25 psig (0.07 to 172 kPa), more preferably 0.1 to 10 psig (0.7 to 70 kPa)). In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Other additives may also be used in the polymerization, as desired, such as one or more scavengers, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, preferably methyl, ethyl, propyl, butyl, penyl, hexyl octyl or an isomer thereof) or a combination thereof, such as diethyl zinc, methylalumoxane, trimethylaluminum, triisobutylaluminum, trioctylaluminum, or a combination thereof).

Polyolefin Products

This invention also relates to compositions of matter produced by the methods described herein. The processes described herein may be used to produce polymers of olefins or mixtures of olefins. Polymers that may be prepared include polyethylene, polypropylene, homopolymers of $C_4$-$C_{20}$ olefins, copolymers of $C_4$-$C_{20}$ olefins, copolymers of ethylene with $C_3$-$C_{20}$ olefins, copolymers of propylene with $C_4$-$C_{20}$ olefins, terpolymers of $C_4$-$C_{20}$ olefins, terpolymers of ethylene and propylene with $C_4$-$C_{20}$ olefins, and terpolymers of ethylene and propylene with 5-ethylidene-2-norbornene.

In a preferred embodiment, the process described herein produces propylene homopolymers or propylene copolymers, such as propylene-ethylene and/or propylene-alphaolefin (preferably $C_4$ to $C_{20}$) copolymers (such as propylene-hexene copolymers or propylene-octene copolymers) having a Mw/Mn of between 1 to 10 (preferably 2-5, preferably 2-4, preferably 2-3).

In a preferred embodiment, the polymers produced herein are copolymers of ethylene preferably having from 0 to 25 mole % (alternately from 0.1 to 10 mole %, alternately from 0.2 to 5 mole %, preferably from 1 to 3 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene), or are copolymers of propylene preferably having from 0 to 25 mole % (alternately from 0.1 to 10 mole %, alternately from 0.2 to 5 mole %, preferably from 1 to 3 mole %) of one or more of $C_2$ or $C_4$ to $C_{20}$ olefin comonomer (preferably ethylene or $C_4$ to $C_{12}$ alpha-olefin, preferably ethylene, butene, hexene, octene, decene, dodecene, preferably ethylene, butene, hexene, octene).

In a preferred embodiment, the monomer is ethylene and the comonomer is hexene, preferably from 0 to 8 mole % hexene, alternately 1 to 5 mole %.

Typically, the polymers produced herein have an Mw of 5,000 to 1,000,000 g/mol (preferably 25,000 to 750,000 g/mol, preferably 50,000 to 500,000 g/mol, preferably 60,000 to 200,000 g/mol), and/or an Mw/Mn of greater than 1 to 40 (alternately 2 to 20, alternately 2 to 10, alternately 2 to 5, 2 to 4, alternately 2 to 3).

In a preferred embodiment the polymer produced herein has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versus).

Blends

In another embodiment, the polymer (preferably the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In a preferred embodiment, the polymer (preferably the polyethylene or polypropylene) is present in the above blends, at from 10 to 99 wt %, based upon the weight of the polymers in the blend, preferably 20 to 95 wt %, even more preferably at least 30 to 90 wt %, even more preferably at least 40 to 90 wt %, even more preferably at least 50 to 90 wt %, even more preferably at least 60 to 90 wt %, even more preferably at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

Any of the foregoing polymers and compositions in combination with optional additives (see, for example, U.S. Patent Application Publication No. 2016/0060430, paragraphs [0082]-[0093]) may be used in a variety of end-use applications. Such end uses may be produced by methods known in the art. End uses include polymer products and products having specific end-uses. Exemplary end uses are films, film-based products, diaper backsheets, housewrap, wire and cable coating compositions, articles formed by molding techniques, e.g., injection or blow molding, extrusion coating, foaming, casting, and combinations thereof. End uses also include products made from films, e.g., bags, packaging, and personal care films, pouches, medical products, such as for example, medical films and intravenous (IV) bags.

Films

Specifically, any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15, preferably 7 to 9. However, in another embodiment the film is oriented to the same extent in both the MD and TD directions.

The films may vary in thickness depending on the intended application; however, films of a thickness from 1 to 50 μm are usually suitable. Films intended for packaging are usually from 10 to 50 μm thick. The thickness of the sealing layer is typically 0.2 to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In a preferred embodiment, one or both of the surface layers is modified by corona treatment.

In another embodiment, this invention relates to the following paragraphs:

1. A supported catalyst composition comprising a support (such as an inorganic oxide, such as silica) and a catalyst compound represented by the Formula (I):

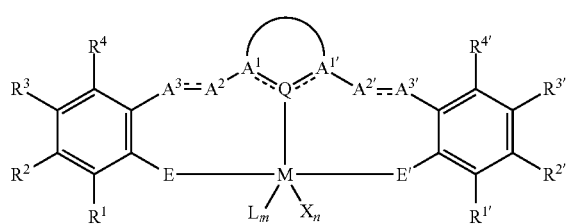

(I)

wherein:

M is a group 3, 4, 5, or 6 transition metal or a Lanthanide;

E and E' are each independently O, S, or $NR^9$ where $R^9$ is independently hydrogen, a $C_1$-$C_{40}$ hydrocarbyl, a $C_1$-$C_{40}$ substituted hydrocarbyl or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3$═$A^2$ is a divalent group containing 2 to 40 non-hydrogen atoms that links $A^1$ to the E-bonded aryl group via a 2-atom bridge;

$A^{2'}$═$A^{3'}$ is a divalent group containing 2 to 40 non-hydrogen atoms that links $A^{1'}$ to the E'-bonded aryl group via a 2-atom bridge;

L is a Lewis base;

X is an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group, and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;

any two L groups may be joined together to form a bidentate Lewis base;

an X group may be joined to an L group to form a monoanionic bidentate group;

any two X groups may be joined together to form a dianionic ligand group.

2. The composition of paragraph 1, where the catalyst compound is represented by the Formula (II):

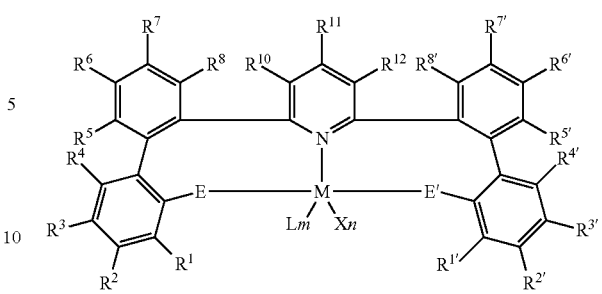

wherein:

M is a group 3, 4, 5, or 6 transition metal or a Lanthanide;

E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;

each L is independently a Lewis base;

each X is independently an anionic ligand;

n is 1, 2 or 3;

m is 0, 1, or 2;

n+m is not greater than 4;

each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; any two L groups may be joined together to form a bidentate Lewis base;

an X group may be joined to an L group to form a monoanionic bidentate group;

any two X groups may be joined together to form a dianionic ligand group;

each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^8$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The composition of paragraph 1 or 2 wherein the M is Hf, Zr or Ti.

4. The composition of paragraph 1, 2, or 3 wherein E and E' are each O.

5. The composition of paragraph 1, 2, 3, or 4 wherein $R^1$ and $R^{1'}$ is independently a $C_4$-$C_{40}$ tertiary hydrocarbyl group.

6. The composition of paragraph 1, 2, 3, 4, or 5 wherein $R^1$ and $R^{1'}$ is independently a $C_4$-$C_{40}$ cyclic tertiary hydrocarbyl group.

7. The supported catalyst compound of paragraph 1, 2, 3, 4, 5, or 6 wherein $R^1$ and $R^{1'}$ is independently a $C_4$-$C_{40}$ polycyclic tertiary hydrocarbyl group.

8. The composition any of paragraphs 1 to 7 wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, (two X's may form a part of a fused ring or a ring system).

9. The composition any of paragraphs 1 to 8 wherein each L is, independently, selected from the group consisting of: ethers, thioethers, amines, phosphines, ethyl ether, tetrahydrofuran, dimethylsulfide, triethylamine, pyridine, alkenes, alkynes, alenes, and carbenes and a combinations thereof, optionally two or more L's may form a part of a fused ring or a ring system).

10. The composition of paragraph 1, wherein M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

11. The composition of paragraph 1, wherein M is Zr or Hf, Q is nitrogen, both $A^1$ and $A^{1'}$ are carbon, both E and E' are oxygen, and both $R^1$ and $R^{1'}$ are adamantan-1-yl or substituted adamantan-1-yl.

12. The composition of paragraph 1, wherein M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

13. The composition of paragraph 1, wherein Q is nitrogen, $A^1$ and $A^{1'}$ are both carbon, both $R^1$ and $R^{1'}$ are hydrogen, both E and E' are $NR^9$, where $R^9$ is selected from a $C_1$-$C_{40}$ hydrocarbyl, a $C_1$-$C_{40}$ substituted hydrocarbyl, or a heteroatom-containing group.

14. The composition of paragraph 1, wherein Q is carbon, $A^1$ and $A^{1'}$ are both nitrogen, and both E and E' are oxygen.

15. The composition of paragraph 1, wherein Q is carbon, $A^1$ is nitrogen, $A^{1'}$ is $C(R^{22})$, and both E and E' are oxygen, where $R^{22}$ is selected from hydrogen, $C_1$-$C_{20}$ hydrocarbyl, $C_1$-$C_{20}$ substituted hydrocarbyl.

16. The composition of paragraph 1, wherein the heterocyclic Lewis base is selected from the groups represented by the following formulas:

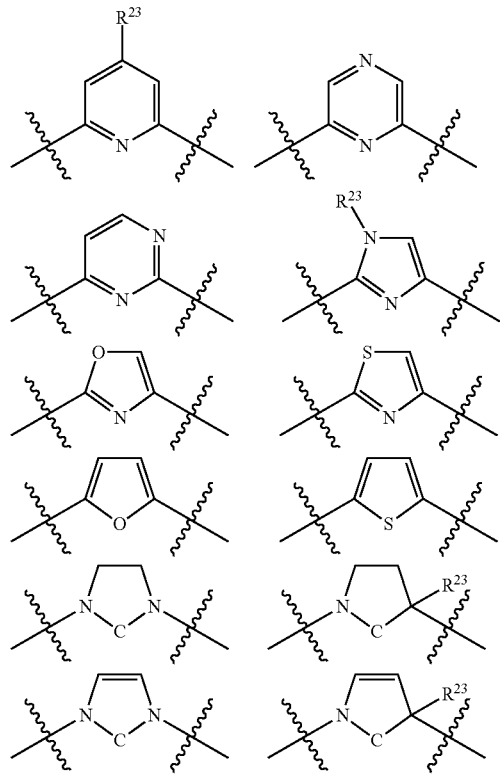

where each $R^{23}$ is independently selected from hydrogen, $C_1$-$C_{20}$ alkyls, and $C_1$-$C_{20}$ substituted alkyls.

17. The composition of paragraph 2, wherein M is Zr or Hf, both E and E' are oxygen, and both $R^1$ and $R^{1'}$ are $C_4$-$C_{20}$ cyclic tertiary alkyls.

18. The composition of paragraph 2, wherein M is Zr or Hf, both E and E' are oxygen, and both $R^1$ and $R^{1'}$ are adamantan-1-yl or substituted adamantan-1-yl.

19. The composition of paragraph 2, wherein M is Zr or Hf, both E and E' are oxygen, and each of $R^1$, $R^{1'}$, $R^3$ and $R^{3'}$ are adamantan-1-yl or substituted adamantan-1-yl.

20. The composition of paragraph 2, wherein M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

21. The composition of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_{20}$ alkyls.

22. The composition of paragraph 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_3$ alkyls.

23. The composition of paragraph 1 wherein the catalyst compound is represented by one or more of the following formulas:

Complex 1

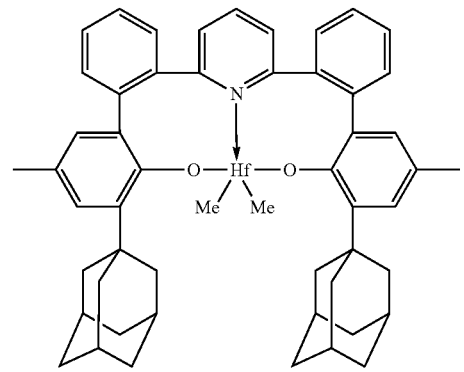

Complex 2

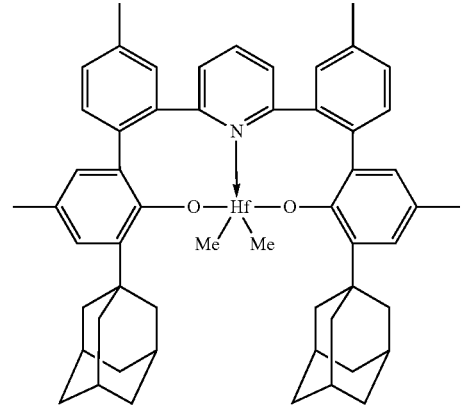

Complex 3
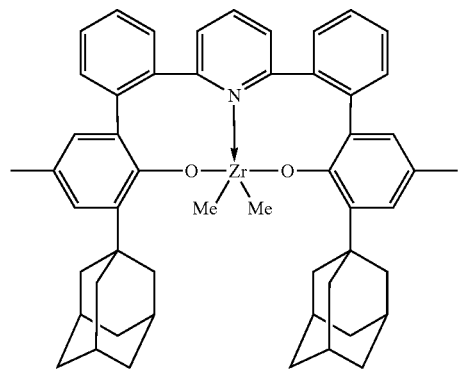
Complex 4
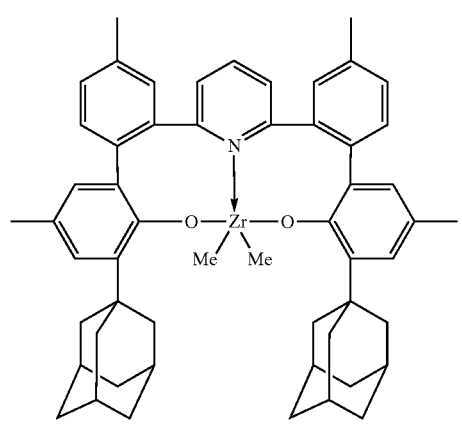
Complex 5
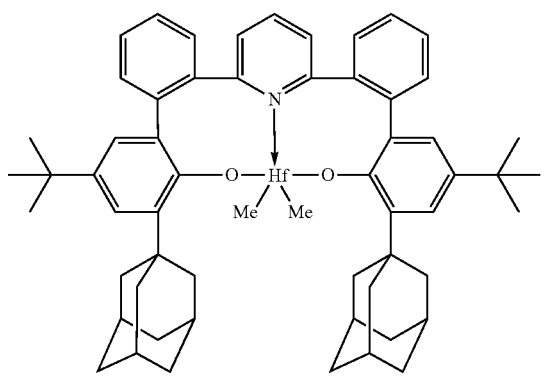
Complex 6
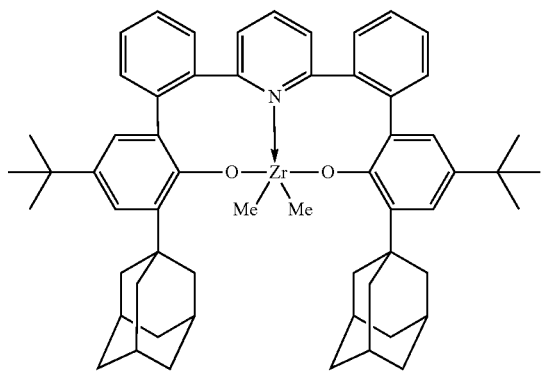
Complex 7
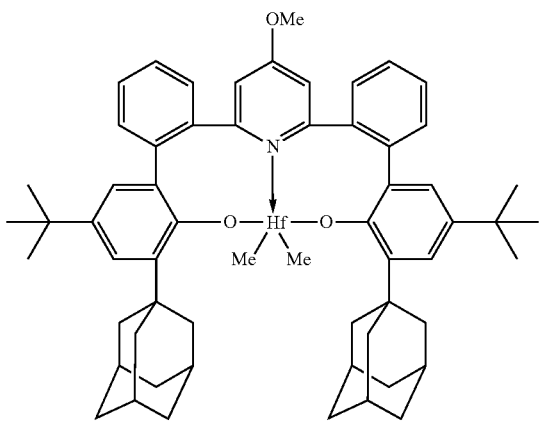
Complex 8
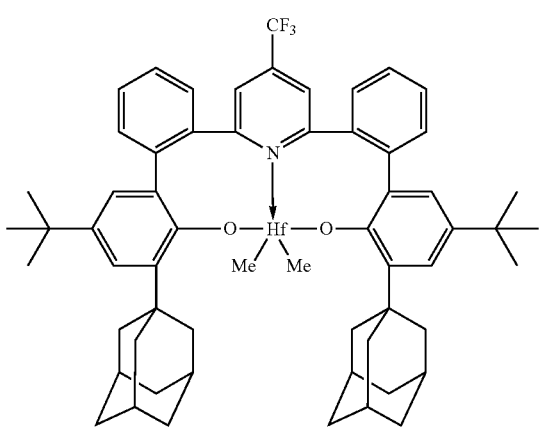
Complex 9
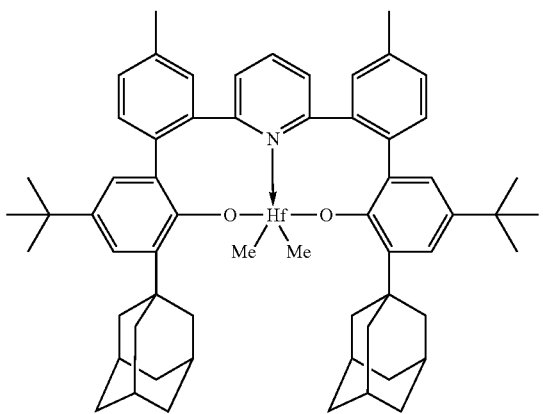

-continued
Complex 10
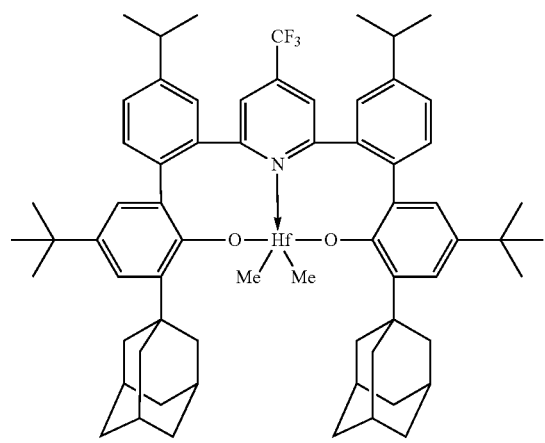
Complex 11
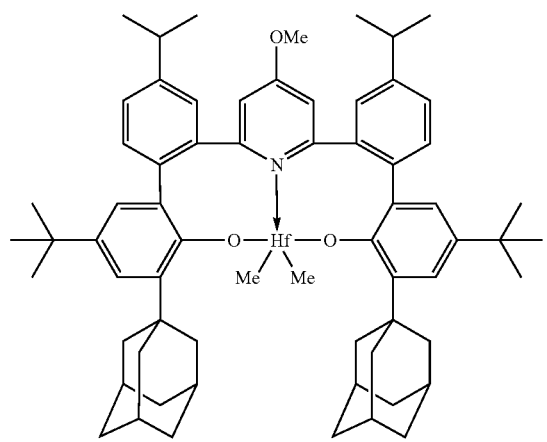
Complex 12
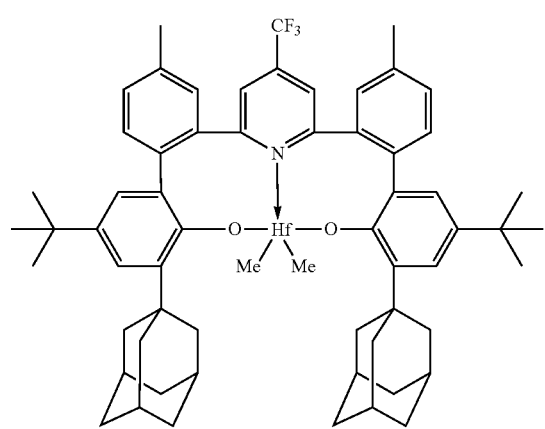
-continued
Complex 13
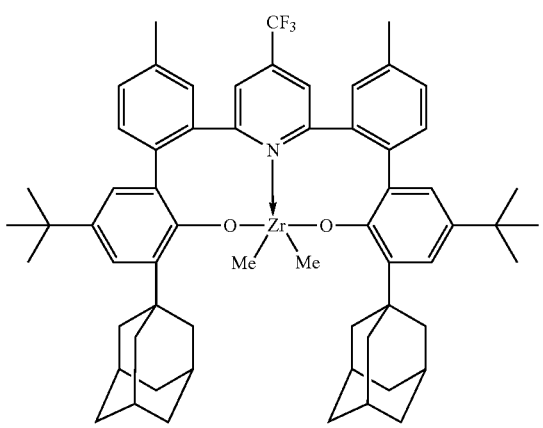
Complex 14
Complex 15
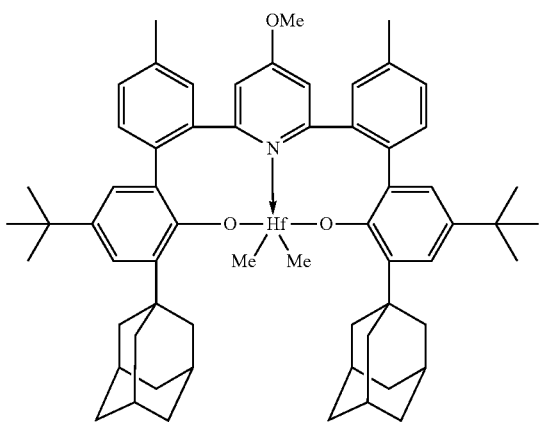

Complex 16
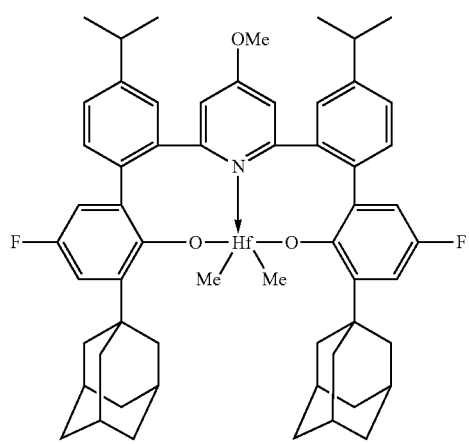
Complex 17
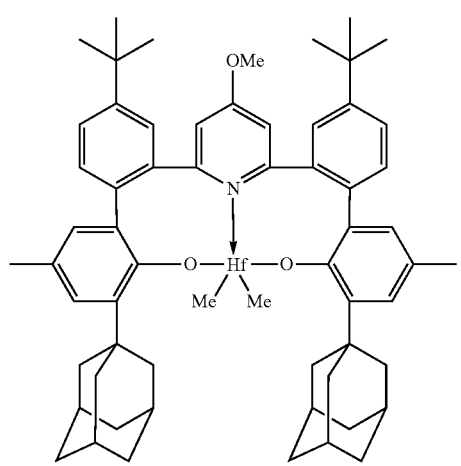
Complex 18
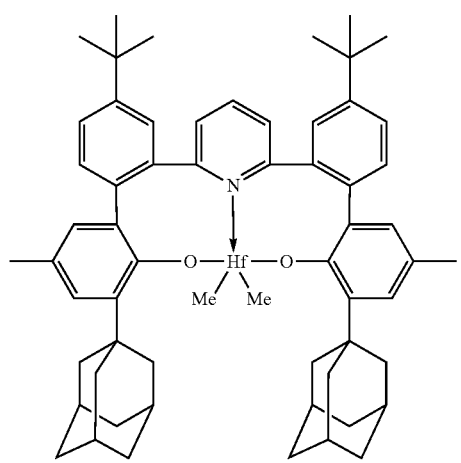
Complex 19
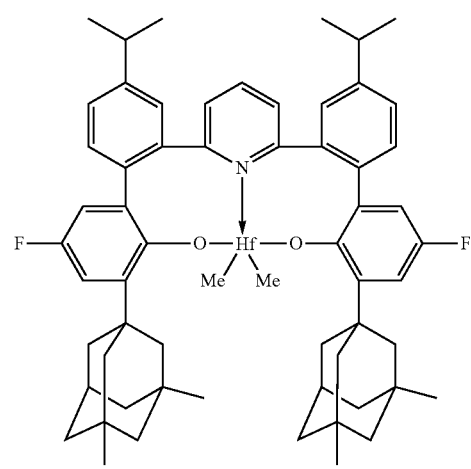
Complex 20
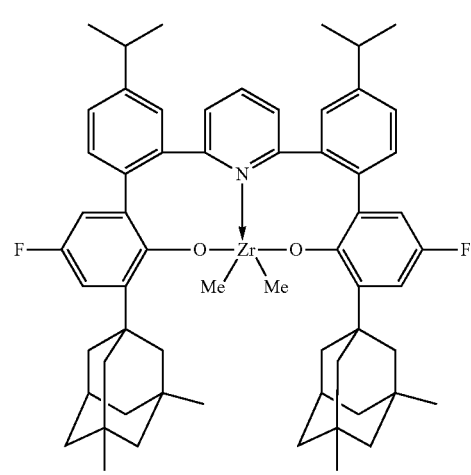
Complex 21
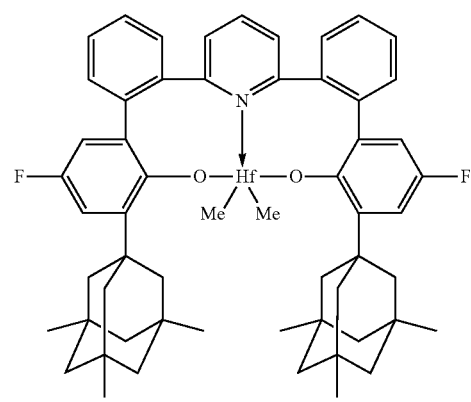

Complex 22
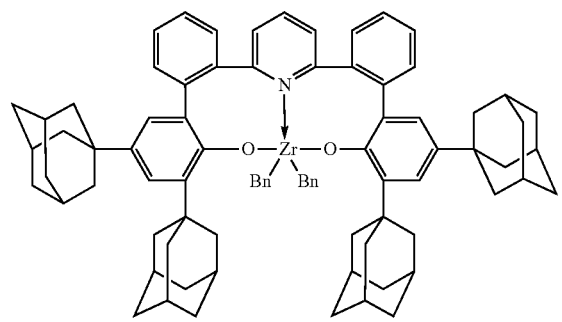
Complex 23
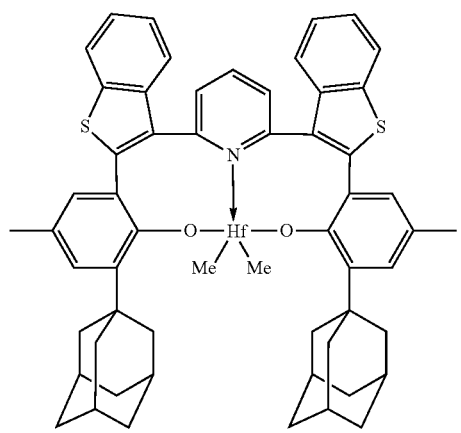
Complex 24
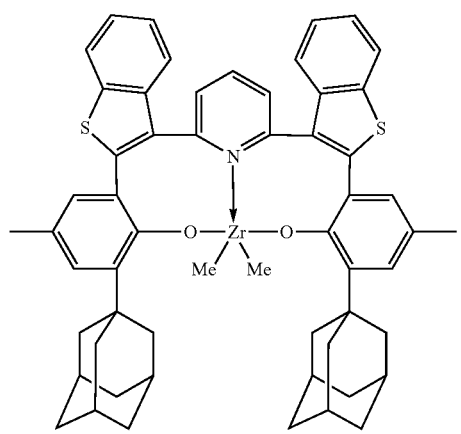
Complex 25
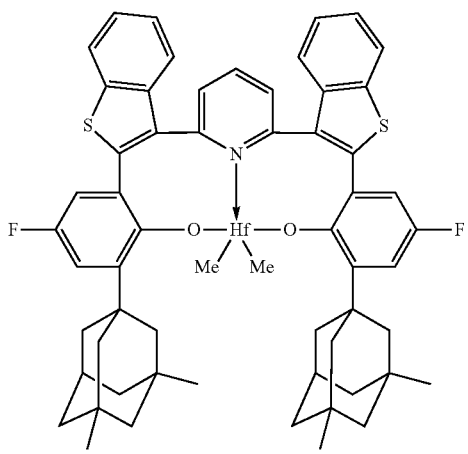
Complex 26
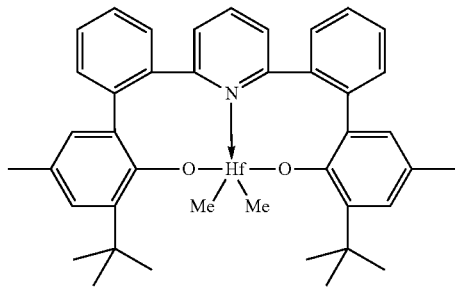
Complex 27
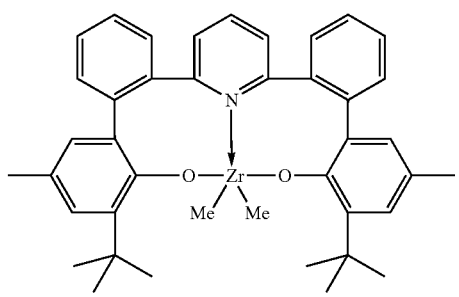
Complex 29
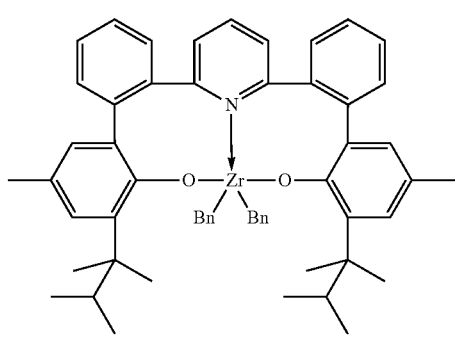

-continued

Complex 30

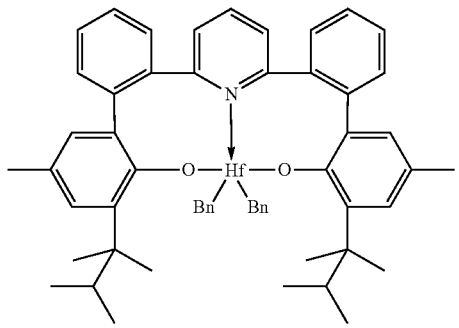

Complex 31

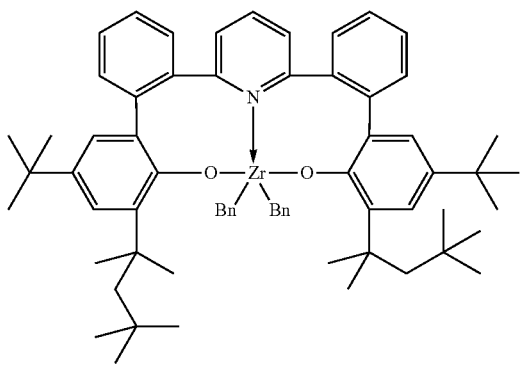

Complex 32

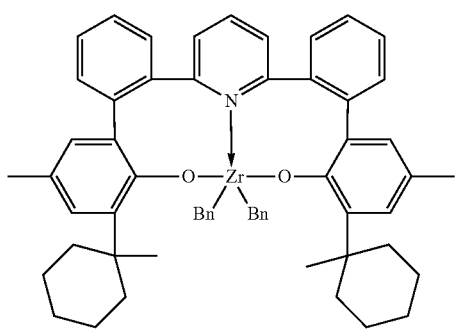

24. A catalyst system comprising support, activator and the composition of any of paragraphs 1 to 23.
25. The catalyst system of paragraph 24, wherein the activator comprises an alumoxane or a non-coordinating anion.
26. The catalyst system of paragraph 24, wherein the activator is soluble in non-aromatic-hydrocarbon solvent and or is free of aromatic solvent.
27. The catalyst system of paragraph 24, wherein the support comprises a solid oxide optionally treated with an electron-withdrawing anion, wherein the solid oxide is preferably selected from the group consisting of silica, alumina, silica-alumina, silica-zirconia, alumina-zirconia, aluminum phosphate, heteropolytungstates, titania, magnesia, boria, zinc oxide, mixed oxides thereof, and mixture(s) thereof, and the electron-withdrawing anion is selected from the group consisting of fluoride, chloride, bromide, phosphate, triflate, bisulfate, sulfate, and combination(s) thereof.
28. The catalyst system of paragraph 24, wherein the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

29. The catalyst system of paragraph 24, wherein the activator is represented by the formula:

$$[R^{1'}R^{2'}R^{3'}EH]_d^+[Mt^{k+}Q_n]^{d-} \quad (V)$$

wherein: E is nitrogen or phosphorous; d is 1, 2 or 3; k is 1, 2, or 3; n is 1, 2, 3, 4, 5, or 6; n−k=d; R$^{1'}$, R$^{2'}$, and R$^{3'}$ are independently a C$_1$ to C$_{50}$ hydrocarbyl group optionally substituted with one or more alkoxy groups, silyl groups, a halogen atoms, or halogen containing groups, wherein R$^{1'}$, R$^{2'}$, and R$^{3'}$ together comprise 15 or more carbon atoms; Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

30. The catalyst system of paragraph 24, wherein the activator is represented by the formula:

$$(Z)_d^+(A^{d-})$$

wherein A$^{d-}$ is a non-coordinating anion having the charge d−; and d is an integer from 1 to 3 and (Z)$_d^+$ is represented by one or more of:

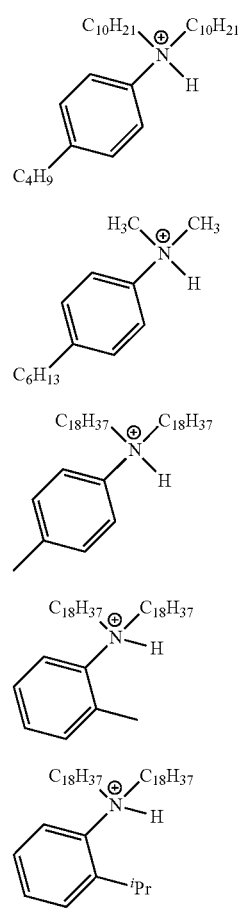

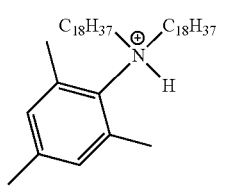
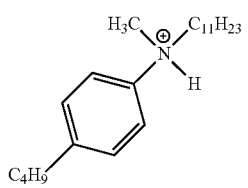
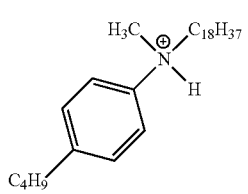
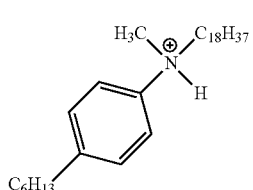
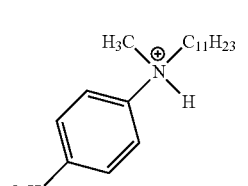
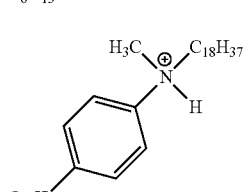
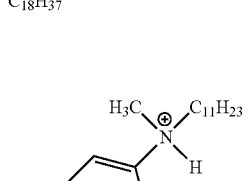
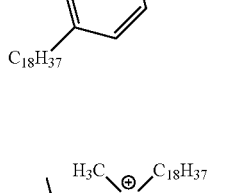
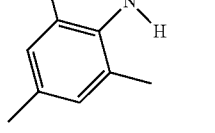
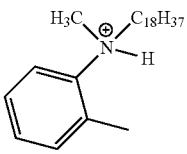
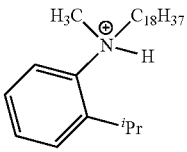
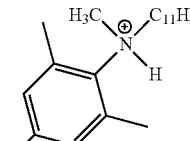
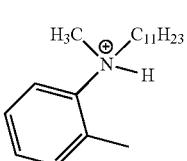
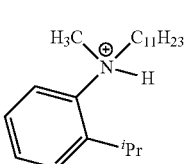
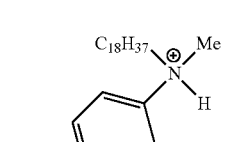
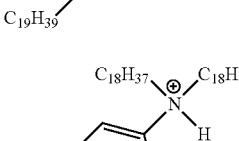
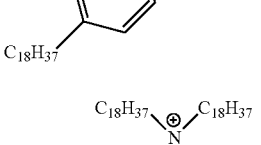
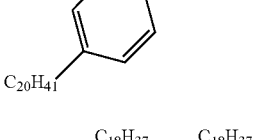
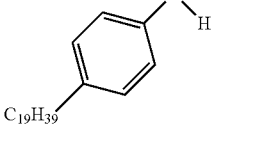

-continued

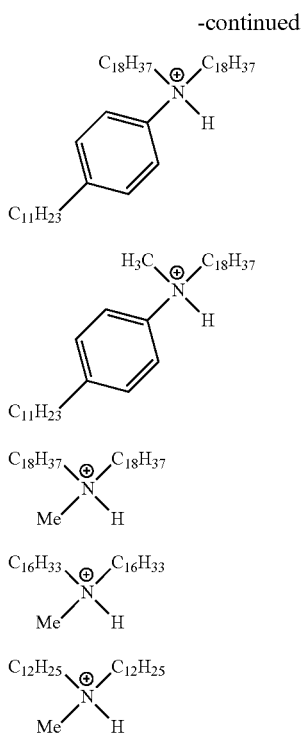

31. The catalyst system of paragraph 24, wherein the activator is one or more of:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphthalenyl)borate,
dioctadecylmethylammonium tetrakis(pentafluorophenyl)borate,
dioctadecylmethylammonium tetrakis(perfluoronaphthalenyl)borate,
N,N-dimethylanilinium tetrakis(pentafluorophenyl)borate,
triphenylcarbenium tetrakis(pentafluorophenyl)borate,
trimethylammonium tetrakis(perfluoronaphthalenyl)borate,
triethylammonium tetrakis(perfluoronaphthalenyl)borate,
tripropylammonium tetrakis(perfluoronaphthalenyl)borate,
tri(n-butyl)ammonium tetrakis(perfluoronaphthalenyl)borate,
tri(t-butyl)ammonium tetrakis(perfluoronaphthalenyl)borate,
N,N-dimethylanilinium tetrakis(perfluoronaphthalenyl)borate,
N,N-diethylanilinium tetrakis(perfluoronaphthalenyl)borate,
N,N-dimethyl-(2,4,6-trimethylanilinium) tetrakis(perfluoronaphthalenyl)borate,
tropillium tetrakis(perfluoronaphthalenyl)borate,
triphenylcarbenium tetrakis(perfluoronaphthalenyl)borate,
triphenylphosphonium tetrakis(perfluoronaphthalenyl)borate,
triethylsilylium tetrakis(perfluoronaphthalenyl)borate,
benzene(diazonium) tetrakis(perfluoronaphthalenyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate, tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

32. A process to polymerize olefins comprising contacting one or more olefins with the catalyst system of any of paragraphs 23 to 31, preferably in the gas or slurry phase.
33. The process of paragraph 32 wherein the process occurs at a temperature of from about 0° C. to about 300° C., at a pressure in the range of from about 0.35 MPa to about 10 MPa, and at a time up to 300 minutes.
34. The process of paragraph 32 further comprising obtaining polymer.
35. The process of paragraph 32 wherein the olefins comprise one or more substituted or unsubstituted $C_2$ to $C_{40}$ alpha olefins.
36. The process of paragraph 32 wherein the process occurs in the gas or slurry phase.

EXPERIMENTAL

SMAO-1 Preparation

Methylalumoxane (MAO, 30 wt % in toluene, 891 grams) and 1,800 grams of toluene were added together in a 4 L stirred reactor. This solution was stirred at 60 RPM for 5 minutes. ES70™ silica (741 grams, PQ Corporation, Malvern, Pa., calcined to 875° C. under a flow of $N_2$) was added. The slurry was heated at 100° C. and stirred at 120 RPM for 3 hours. The temperature was reduced to 25° C. and cooled to temperature over 2 hours. Once cooled, the vessel was stirred at 8 RPM and placed under vacuum for 60 hours. After emptying the vessel and sieving the supported MAO, supported MAO (SMAO) was collected.

Preparation of Scavenger A

ES70 silica (PQ Corp.) was dried for 3 hours at 100° C. in a tube furnace under a slight flow of dry $N_2$. To a 4 L conical reaction vessel was added 2.5 L of dry, deoxygenated n-hexane and 272 grams of triisobutylaluminum (Albemarle). The stirring rate was set to 120 rpm and 742 g of the silica was added. The slurry was stirred for 3 hours and then dried under vacuum at 25° C. over the course of 16 hours. The dry solid was washed with 2 liters of dry, deoxygenated pentane (Sigma Aldrich) and then returned to the reaction vessel and dried under vacuum for 2 hours at 25° C.

Supported Catalyst Preparation for Examples 1 and 2

1.0 g of the SMAO-1 was added to a 20 mL vial and 5.0 mL of toluene was added. The vial was placed on a shaker and a solution of the catalyst complex in toluene (40 µmol in 3.0 mL) was added dropwise. After shaking for 15 minutes the solid was isolated by filtration, washed with pentane (ca. 5 ml) and dried under vacuum.

Shown in Scheme A are drawings of catalyst complexes 5 and 6. 2-(Adamantan-1-yl)-4-(tert-butyl)phenol was prepared from 4-tert-butylphenol (Merck) and adamantanol-1 (Aldrich) as described in *Organic Letters* 2015, 17, 2242-2245.

Scheme A

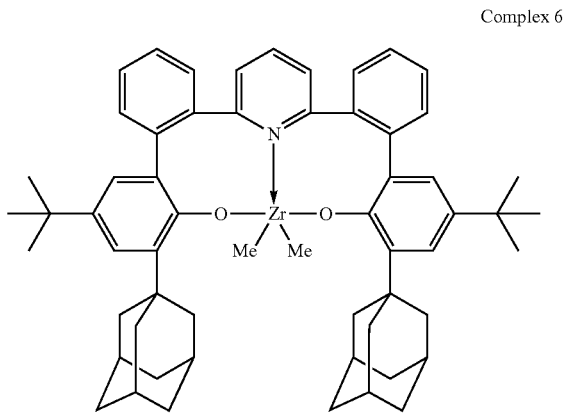

Complex 6

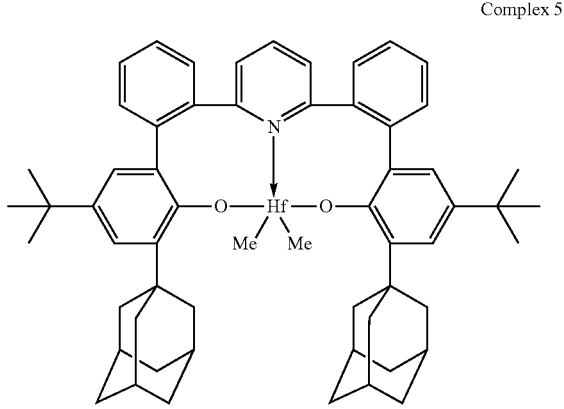

Complex 5

2-(Adamantan-1-yl)-6-bromo-4-(tert-butyl)phenol

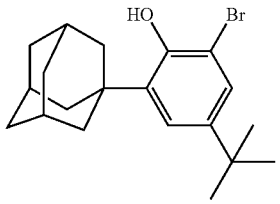 [SMILES: CC(C)(C)c1cc(Br)c(O)c(C23CC4CC(CC(C4)C2)C3)c1]

To a solution of 57.6 g (203 mmol) of 2-(adamantan-1-yl)-4-(tert-butyl)phenol in 400 ml of chloroform a solution of 10.4 ml (203 mmol) of bromine in 200 ml of chloroform was added dropwise for 30 minutes at room temperature. The resulting mixture was diluted with 400 ml of water. The obtained mixture was extracted with dichloromethane (3×100 ml), the combined organic extract was washed with 5% NaHCO$_3$, dried over Na$_2$SO$_4$, and then evaporated to dryness. Yield 71.6 g (97%) of a white solid. $^1$H NMR (CDCl$_3$, 400 MHz): δ 7.32 (d, J=2.3 Hz, 1H), 7.19 (d, J=2.3 Hz, 1H), 5.65 (s, 1H), 2.18-2.03 (m, 9H), 1.78 (m, 6H), 1.29 (s, 9H). $^{13}$C NMR (CDCl$_3$, 100 MHz): δ 148.07, 143.75, 137.00, 126.04, 123.62, 112.11, 40.24, 37.67, 37.01, 34.46, 31.47, 29.03.

(1-(3-Bromo-5-(tert-butyl)-2-(methoxymethoxy)phenyl)adamantane

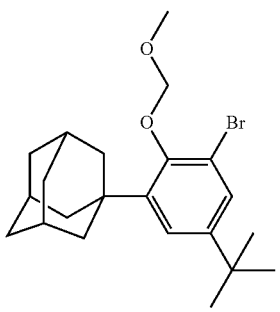 [SMILES: COCOc1c(Br)cc(C(C)(C)C)cc1C12CC3CC(CC(C3)C1)C2]

To a solution of 71.6 g (197 mmol) of 2-(adamantan-1-yl)-6-bromo-4-(tert-butyl)phenol in 1,000 ml of THF 8.28 g (207 mmol, 60% wt. in mineral oil) of sodium hydride was added portionwise at room temperature. To the resulting suspension 16.5 ml (217 mmol) of methoxymethyl chloride was added dropwise for 10 minutes at room temperature. The obtained mixture was stirred overnight, then poured into 1,000 ml of water. The obtained mixture was extracted with dichloromethane (3×300 ml), the combined organic extract was washed with 5% NaHCO$_3$, dried over Na$_2$SO$_4$ and then evaporated to dryness. Yield 80.3 g (~quant.) of a white solid. $^1$H NMR (CDCl$_3$, 400 MHz): δ 7.39 (d, J=2.4 Hz, 1H), 7.27 (d, J=2.4 Hz, 1H), 5.23 (s, 2H), 3.71 (s, 3H), 2.20-2.04 (m, 9H), 1.82-1.74 (m, 6H), 1.29 (s, 9H). $^{13}$C NMR (CDCl$_3$, 100 MHz): δ 150.88, 147.47, 144.42, 128.46, 123.72, 117.46, 99.53, 57.74, 41.31, 38.05, 36.85, 34.58, 31.30, 29.08.

2-(3-Adamantan-1-yl)-5-(tert-butyl)-2-(methoxymethoxy)phenyl)-4,4,5,5-tetramethyl-1,3,2-dioxaborolane

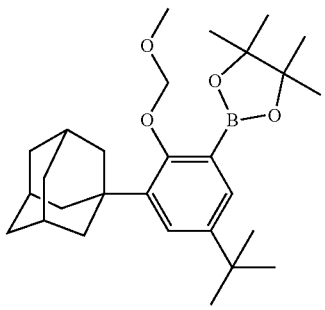 [SMILES: COCOc1c(B2OC(C)(C)C(C)(C)O2)cc(C(C)(C)C)cc1C12CC3CC(CC(C3)C1)C2]

To a solution of 22.5 g (55.0 mmol) of (1-(3-bromo-5-(tert-butyl)-2-(methoxymethoxy)phenyl)adamantine in 300 ml of dry THF 23.2 ml (57.9 mmol, 2.5 M) of "BuLi in hexanes was added dropwise for 20 minutes at –80° C. The reaction mixture was stirred at this temperature for 1 hour followed by addition of 14.5 ml (71.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over Na$_2$SO$_4$, and then evaporated to dryness. Yield 25.0 g (~quant.) of a colorless viscous oil. $^1$H NMR (CDCl$_3$, 400 MHz): δ 7.54 (d, J=2.5 Hz, 1H), 7.43 (d, J=2.6 Hz, 1H), 5.18 (s, 2H), 3.60 (s, 3H), 2.24-2.13 (m, 6H), 2.09 (br. s., 3H), 1.85-1.75 (m, 6H), 1.37 (s, 12H), 1.33 (s, 9H). $^{13}$C NMR (CDCl$_3$, 100 MHz): δ 159.64, 144.48, 140.55, 130.58, 127.47, 100.81, 83.48, 57.63, 41.24, 37.29, 37.05, 34.40, 31.50, 29.16, 24.79.

1-(2'-Bromo-5-(tert-butyl)-2-(methoxymethoxy)-[1,1'-biphenyl]-3-yl)adamantine

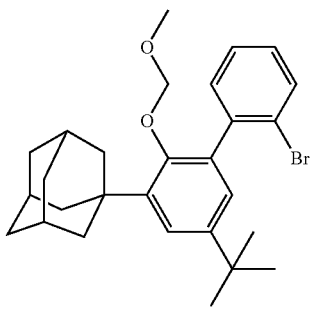 [SMILES: COCOc1c(-c2ccccc2Br)cc(C(C)(C)C)cc1C12CC3CC(CC(C3)C1)C2]

To a solution of 25.0 g (55.0 mmol) of 2-(3-adamantan-1-yl)-5-(tert-butyl)-2-(methoxymethoxy)phenyl)-4,4,5,5-tetramethyl-1,3,2-dioxaborolane in 200 ml of dioxane 15.6 g (55.0 mmol) of 2-bromoiodobenzene, 19.0 g (137 mmol) of potassium carbonate, and 100 ml of water were subsequently added. The mixture obtained was purged with argon for 10 minutes followed by addition of 3.20 g (2.75 mmol) of Pd(PPh$_3$)$_4$. Thus obtained mixture was stirred for 12 hours at 100° C., then cooled to room temperature and diluted with 100 ml of water. The obtained mixture was extracted with dichloromethane (3×100 ml), the combined organic extract was dried over Na$_2$SO$_4$ and then evaporated to dryness. The residue was purified by flash chromatography on silica gel 60 (40-63 um, eluent: hexane-dichloromethane=10:1, vol.). Yield 23.5 g (88%) of a white solid. $^1$H NMR (CDCl$_3$, 400 MHz): δ 7.68 (dd, J=1.0, 8.0 Hz, 1H), 7.42 (dd, J=1.7, 7.6 Hz, 1H), 7.37-7.32 (m, 2H), 7.20 (dt, J=1.8, 7.7 Hz, 1H), 7.08 (d, J=2.5 Hz, 1H), 4.53 (d, J=4.6 Hz, 1H), 4.40 (d, J=4.6 Hz, 1H), 3.20 (s, 3H), 2.23-2.14 (m, 6H), 2.10 (br. s., 3H), 1.86-1.70 (m, 6H), 1.33 (s, 9H). $^{13}$C NMR (CDCl$_3$, 100 MHz): δ 151.28, 145.09, 142.09, 141.47, 133.90, 132.93, 132.41, 128.55, 127.06, 126.81, 124.18, 123.87, 98.83, 57.07, 41.31, 37.55, 37.01, 34.60, 31.49, 29.17.

2-(3'-(Adamantan-1-yl)-5'-(tert-butyl)-2'-(methoxymethoxy)-[1,1'-biphenyl]-2-yl)-4,4,5,5-tetramethyl-1,3,2-dioxaborolane

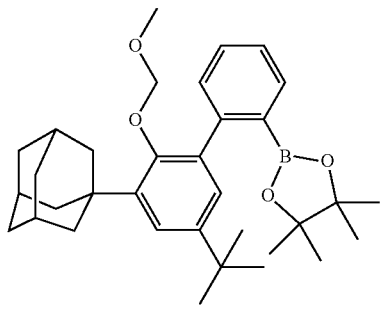 [SMILES: COCOc1c(-c2ccccc2B2OC(C)(C)C(C)(C)O2)cc(C(C)(C)C)cc1C12CC3CC(CC(C3)C1)C2]

To a solution of 30.0 g (62.1 mmol) of 1-(2'-bromo-5-(tert-butyl)-2-(methoxymethoxy)-[1,1'-biphenyl]-3-yl)adamantine in 500 ml of dry THF 25.6 ml (63.9 mmol, 2.5 M) of $^n$BuLi in hexanes was added dropwise for 20 minutes at −80° C. The reaction mixture was stirred at this temperature for 1 hour followed by addition of 16.5 ml (80.7 mmol) of 2-isopropoxy-4,4,5,5-tetramethyl-1,3,2-dioxaborolane. The obtained suspension was stirred at room temperature for 1 hour, then poured into 300 ml of water. The obtained mixture was extracted with dichloromethane (3×300 ml), the combined organic extract was dried over Na$_2$SO$_4$ and then evaporated to dryness. Yield 32.9 g (~quant.) of a colorless glassy solid. $^1$H NMR (CDCl$_3$, 400 MHz): δ 7.75 (d, J=7.3 Hz, 1H), 7.44-7.36 (m, 1H), 7.36-7.30 (m, 2H), 7.30-7.26 (m, 1H), 6.96 (d, J=2.4 Hz, 1H), 4.53 (d, J=4.7 Hz, 1H), 4.37 (d, J=4.7 Hz, 1H), 3.22 (s, 3H), 2.26-2.14 (m, 6H), 2.09 (br. s., 3H), 1.85-1.71 (m, 6H), 1.30 (s, 9H), 1.15 (s, 6H), 1.10 (s, 6H). $^{13}$C NMR (CDCl$_3$, 100 MHz): δ 151.35, 146.48, 144.32, 141.26, 136.15, 134.38, 130.44, 129.78, 126.75, 126.04, 123.13, 98.60, 83.32, 57.08, 41.50, 37.51, 37.09, 34.49, 31.57, 29.26, 24.92, 24.21.

2',2'''-(Pyridine-2,6-diyl)bis(3-adamantan-1-yl)-5-(tert-butyl)-[1,1'-biphenyl]-2-ol)

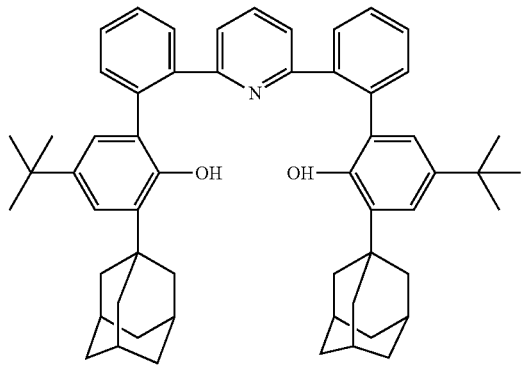 [SMILES: CC(C)(C)c1cc(-c2ccccc2-c2cccc(-c3ccccc3-c3cc(C(C)(C)C)cc(C45CC6CC(CC(C6)C4)C5)c3O)n2)c(O)c(C23CC4CC(CC(C4)C2)C3)c1]

To a solution of 32.9 g (62.0 mmol) of 2-(3'-(adamantan-1-yl)-5'-(tert-butyl)-2'-(methoxymethoxy)-[1,1'-biphenyl]-2-yl)-4,4,5,5-tetramethyl-1,3,2-dioxaborolane in 140 ml of dioxane 7.35 g (31.0 mmol) of 2,6-dibromopyridine, 50.5 g (155 mmol) of cesium carbonate and 70 ml of water were subsequently added. The mixture obtained was purged with argon for 10 minutes followed by addition of 3.50 g (3.10 mmol) of Pd(PPh$_3$)$_4$. This mixture was stirred for 12 hours at 100° C., then cooled to room temperature and diluted with 50 ml of water. The obtained mixture was extracted with dichloromethane (3×50 ml), the combined organic extract was dried over Na$_2$SO$_4$ and then evaporated to dryness. To the resulting oil 300 ml of THF, 300 ml of methanol, and 21 ml of 12 N HCl were subsequently added. The reaction mixture was stirred overnight at 60° C. and then poured into 500 ml of water. The obtained mixture was extracted with dichloromethane (3×350 ml), the combined organic extract was washed with 5% NaHCO$_3$, dried over Na$_2$SO$_4$, and then evaporated to dryness. The residue was purified by flash chromatography on silica gel 60 (40-63 um, eluent: hexane-ethyl acetate=10:1, vol.). The obtained glassy solid was triturated with 70 ml of n-pentane, the precipitate obtained was filtered off, washed with 2×20 ml of n-pentane, and dried in vacuo. Yield 21.5 g (87%) of a mixture of two isomers as a white powder. $^1$H NMR (CDCl$_3$, 400 MHz): δ 8.10+6.59 (2s, 2H), 7.53-7.38 (m, 10H), 7.09+7.08 (2d, J=2.4 Hz, 2H), 7.04+6.97 (2d, J=7.8 Hz, 2H), 6.95+6.54 (2d, J=2.4 Hz), 2.03-1.79 (m, 18H), 1.74-1.59 (m, 12H), 1.16+1.01 (2s, 18H). $^{13}$C NMR (CDCl$_3$, 100 MHz, minor isomer shifts labeled with *): δ 157.86, 157.72*, 150.01, 149.23*, 141.82*, 141.77, 139.65*, 139.42, 137.92, 137.43, 137.32*, 136.80, 136.67*, 136.29*, 131.98*, 131.72, 130.81, 130.37*, 129.80, 129.09*, 128.91, 128.81*, 127.82*, 127.67, 126.40, 125.65*, 122.99*, 122.78, 122.47, 122.07*, 40.48, 40.37*, 37.04, 36.89*, 34.19*, 34.01, 31.47, 29.12, 29.07*.

Dimethylhafnium[2',2'''-(pyridine-2,6-diyl)bis(3-adamantan-1-yl)-5-(tert-butyl)-[1,1'-biphenyl]-2-olate)] (Complex 5)

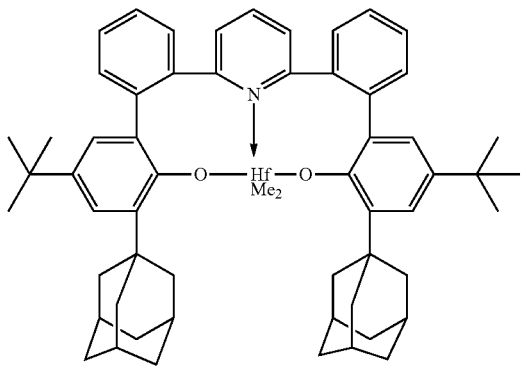

To a suspension of 3.22 g (10.05 mmol) of hafnium tetrachloride (<0.05% Zr) in 250 ml of dry toluene 14.6 ml (42.2 mmol, 2.9 M) of MeMgBr in diethyl ether was added in one portion via syringe at 0° C. The resulting suspension was stirred for 1 minute, and 8.00 g (10.05 mmol) of 2',2'''-(pyridine-2,6-diyl)bis(3-adamantan-1-yl)-5-(tert-butyl)-[1,1'-biphenyl]-2-ol) was added portionwise for 1 minute. The reaction mixture was stirred for 36 h at room temperature and then evaporated to near dryness. The solid obtained was extracted with 2×100 ml of hot toluene, and the combined organic extract was filtered through a thin pad of Celite 503. Next, the filtrate was evaporated to dryness. The residue was triturated with 50 ml of n-hexane, the obtained precipitate was filtered off (G3), washed with 20 ml of n-hexane (2×20 ml), and then dried in vacuo. Yield 6.66 g (61%, ~1:1 solvate with n-hexane) of a light-beige solid. Anal. Calc. for $C_{59}H_{69}HfNO_2 \times 1.0(C_6H_{14})$: C, 71.70; H, 7.68; N, 1.29. Found: C, 71.95; H, 7.83; N, 1.18. $^1$H NMR ($C_6D_6$, 400 MHz): δ 7.58 (d, J=2.6 Hz, 2H), 7.22-7.17 (m, 2H), 7.14-7.08 (m, 4H), 7.07 (d, J=2.5 Hz, 2H), 7.00-6.96 (m, 2H), 6.48-6.33 (m, 3H), 2.62-2.51 (m, 6H), 2.47-2.35 (m, 6H), 2.19 (br.s, 6H), 2.06-1.95 (m, 6H), 1.92-1.78 (m, 6H), 1.34 (s, 18H), −0.12 (s, 6H). $^{13}$C NMR ($C_6D_6$, 100 MHz): δ 159.74, 157.86, 143.93, 140.49, 139.57, 138.58, 133.87, 133.00, 132.61, 131.60, 131.44, 127.98, 125.71, 124.99, 124.73, 51.09, 41.95, 38.49, 37.86, 34.79, 32.35, 30.03.

Dimethylzirconium[2',2'''-(pyridine-2,6-diyl)bis(3-adamantan-1-yl)-5-(tert-butyl)-[1,1'-biphenyl]-2-olate)] (Complex 6)

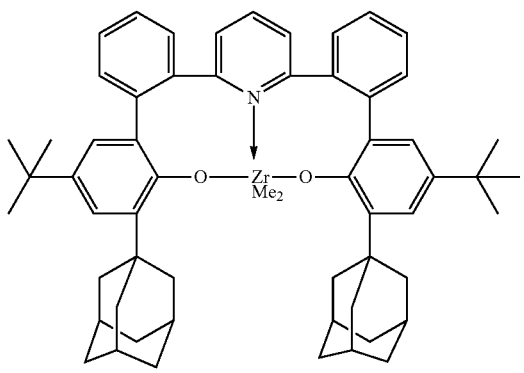

To a suspension of 2.92 g (12.56 mmol) of zirconium tetrachloride in 300 ml of dry toluene 18.2 ml (52.7 mmol, 2.9 M) of MeMgBr in diethyl ether was added in one portion via syringe at 0° C. To the resulting suspension 10.00 g (12.56 mmol) of 2',2'''-(pyridine-2,6-diyl)bis(3-adamantan-1-yl)-5-(tert-butyl)-[1,1'-biphenyl]-2-ol) was immediately added in one portion. The reaction mixture was stirred for 2 hours at room temperature and then evaporated to near dryness. The solid obtained was extracted with 2×100 ml of hot toluene, and the combined organic extract was filtered through a thin pad of Celite 503. Next, the filtrate was evaporated to dryness. The residue was triturated with 50 ml of n-hexane, the obtained precipitate was filtered off (G3), washed with n-hexane (2×20 ml), and then dried in vacuo. Yield 8.95 g (74%, ~1:0.5 solvate with n-hexane) of a beige solid. Anal. Calc. for $C_{59}H_{69}ZrNO_2 \times 0.5(C_6H_{14})$: C, 77.69; H, 7.99; N, 1.46. Found: C, 77.90; H, 8.15; N, 1.36. $^1$H NMR ($C_6D_6$, 400 MHz): δ 7.56 (d, J=2.6 Hz, 2H), 7.20-7.17 (m, 2H), 7.14-7.07 (m, 4H), 7.07 (d, J=2.5 Hz, 2H), 6.98-6.94 (m, 2H), 6.52-6.34 (m, 3H), 2.65-2.51 (m, 6H), 2.49-2.36 (m, 6H), 2.19 (br.s., 6H), 2.07-1.93 (m, 6H), 1.92-1.78 (m, 6H), 1.34 (s, 18H), 0.09 (s, 6H). $^{13}$C NMR ($C_6D_6$, 100 MHz): δ 159.20, 158.22, 143.79, 140.60, 139.55, 138.05, 133.77, 133.38, 133.04, 131.49, 131.32, 127.94, 125.78, 124.65, 124.52, 42.87, 41.99, 38.58, 37.86, 34.82, 32.34, 30.04.

Ethylene-Hexene Copolymerization

A 2 L autoclave was heated at 110° C. for 1 hour and then charged, under nitrogen, with solid NaCl (350 g), 6 grams of scavenger A and heated for 30 minutes at 120° C. The reactor was then cooled to approximately 81° C. 1-Hexene (2.5 mL) and 10% hydrogen in nitrogen (120 SCCM) were added, and stirring was then commenced (450 RPM). Supported catalysts were injected into the reactor with ethylene flow (200 psi). After the injection, the reactor temperature was controlled at 85° C. and ethylene was allowed to flow into the reactor to maintain pressure. Both 10% hydrogen in nitrogen (0.5 mg/g) and 1-hexene (0.1 g/g) were fed in ratio to the ethylene flow. The polymerization was halted after 60 minutes by venting the reactor. The polymer was washed twice with water to remove salt and then dried in air for at least two days. Details are presented in Table A below. The data are reported in Table A.

TABLE A

| Ex. | Supported Catalyst | Catalyst (mg) | Yield (grams PE) | Productivity (g/g cat/hour) |
| --- | --- | --- | --- | --- |
| 1 | Complex 6/SMAO-1 | 10.4 | 30.5 | 2933 |
| 2 | Complex 5/SMAO-1 | 13.4 | 9.4 | 702 |

High Throughput Polymerization Conditions:

Unless stated otherwise, propylene homopolymerizations and ethylene-propylene copolymerizations were carried out in a parallel, pressure reactor, as generally described in U.S. Pat. Nos. 6,306,658; 6,455,316; 6,489,168; WO 00/09255; and Murphy et al. (2003) *J. Am. Chem. Soc.*, v.125, pp. 4306-4317, each of which is fully incorporated herein by reference for US purposes. Although the specific quantities, temperatures, solvents, reactants, reactant ratios, pressures, and other variables may have changed from one polymerization run to the next, the following describes a typical polymerization performed in a parallel, pressure reactor.

Preparation of Support Materials

SMAO-2—Silica Supported MAO for Propylene Polymerization:

In a celstir bottle, 20.0 g of silica (DM L403, AGC Chemicals, 200° C. calcination) and 91.2 g of toluene were mixed. The silica slurry was then allowed to cool in the freezer for 30 minutes. In a square bottle, 31.8 g MAO (30% toluene solution, GRACE chemicals), based on 7.5 mmol Al/g silica) was charged in and also cooled down in the freezer for 30 minutes. After 30 minutes, the cold MAO solution was added slowly into the silica slurry bottle by pipette. The solution was allowed to stir at room temperature for 1 hour. After 1 hour, the oil bath was heated up to 100° C. and the solution stirred at 100° C. for 3 hours. After 2.5 hours of stirring, the celstir bottle was taken off the heat and continued to stir for another 30 minutes. The mixture was then filtered, washed 2×20 g toluene (to remove toluene soluble MAO) and 2×20 g isohexane (to remove toluene for easier drying). The product was dried under vacuum overnight.

SMAOF—Fluorided Alumina Silica.

A mixture of 6 wt % $(NH_4)_2SiF_6$ and 94 wt % of 5% Al on ES70™ silica (PQ Corporation, Malvern, Pa.) was fluidized with a stream of dry air and heated at 30-50° C./h up to 650° C., held for 3 hours, then cooled to ambient temperature then the air was removed with a $N_2$ purge. The resulting material was treated with MAO (based on 7.5 mmol Al/g silica) in a similar fashion as with SMAO-2. The material was then filtered, washed with toluene and pentane and dried in vacuo.

MMT—Acid Treated Montmorillonite 56.6 mL water and 16.65 g of $H_2SO_4$ mixed into celstir bottle and placed into 90° C. heated oil bath. To this mixture was added clay mineral (10 g, K-10 MMT™, Aldrich). The mixture was allowed to stir for 8 hours at 90° C. Upon cooling to room temperature, the mixture was filtered and washed with 4×100 mL of deionized water. The material was then dried in oven at 200° C. under vacuum for 2 hours.

General Procedure for Preparation of Supported Catalysts 1 g of support material (SMAO-2, SMAOF or MMT) was suspended in 5 mL of toluene and placed on a shaker. Optionally, TIBAL (7 wt % relative to support) was added, and the resulting mixture was allowed to shake for 15 minutes. After 15 minutes, either catalyst 5 or 6 were added as toluene solutions (based on either 40 or 20 µmol/g) to the support material mixture. The mixture was allowed to react for 3 hours. After 3 hours, the mixture was filtered and the solid was washed with toluene (5 mL) and pentane (2×5 mL) and dried in vacuo to give a supported catalysts as white or off-white solids. Optionally, the supported catalysts were slurried in mineral oil (degassed at 100° C. for 2 hours).

Propylene Polymerization (High-Throughput Conditions):

A pre-weighed glass vial insert and disposable stirring paddle were fitted to each reaction vessel of the reactor, which contains 48 individual reaction vessels. The reactor was then closed and propylene (typically 4 mL for homopolymers and 2 mL for copolymers with ethylene) was introduced to each vessel as a condensed gas liquid (typically 4 or 2 mL) (as shown in examples in Tables B and C). Then solvent (typically isohexane) and scavenger (typically triisobutyl aluminum, TIBAL) was added to bring the total reaction volume, including the subsequent additions, to 5 mL and the reactor vessels were heated to their set temperature (usually from about 50° C. to about 110° C.). The reactors were then additionally pressurized with ethylene (between 20-150 psig, applicable to EP copolymers). The contents of the vessel were stirred at 800 rpm. A supported catalyst slurry (typically corresponding to 0.45 mg of solid catalyst) was then injected into the reaction vessel along with 500 microliters of toluene. Equivalence is determined based on the mol equivalents relative to the moles of the transition metal in the catalyst complex. The reaction was then allowed to proceed until a pre-determined amount of pressure had been taken up by the reaction (typically 30 psig). Alternatively, the reaction may be allowed to proceed for a set amount of time. At this point, the reaction was quenched by pressurizing the vessel with compressed air. After the polymerization reaction, the glass vial insert containing the polymer product and solvent was removed from the pressure cell and the inert atmosphere glove box, and the volatile components were removed using a Genevac HT-12 centrifuge and Genevac VC3000D vacuum evaporator operating at elevated temperature and reduced pressure. The vial was then weighed to determine the yield of the polymer product. The resultant polymer was analyzed by Rapid GPC (see below) to determine the molecular weight and by DSC (see below) to determine melting point.

Propylene Polymerization (1 L Autoclave Conditions)

Supported catalyst (ca. 0.5-0.6 g) was slurried into dry and degassed mineral oil to yield a slurry that contains 5% by weight of supported catalyst. The supported catalysts were added to the reactor as a slurry in oil (corresponding to 25 mg of solid catalyst). The catalyst slurry containing certain amounts of catalysts was injected using 250 mL propylene into a 1 L autoclave reactor containing propylene (300 mL) (total propylene 550 mL), optionally $H_2$ (provided from a 25 mL container under the pressure) and triisobutylaluminum (TIBAL, 1.0 ml of a 5% toluene solution) were added at ambient temperature. The reaction was allowed to pre-polymerize for 5 minutes at room temperature. Subsequently, the reactor temperature was raised to about 70° C. and the polymerization was run for an allotted period of time typically about 1 hour. After the allotted time the reactor was cooled to room temperature and vented, and polymer sample was collected and dried in vacuo overnight at 60° C.

RAPID GPC (Used to Characterize Samples in TABLES B and C Prepared with High Throughput Polymerization)

To determine various molecular weight related values by GPC, high temperature size 5 exclusion chromatography was performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388, each of which is fully incorporated herein by reference for US purposes. This apparatus has a series of three 30 cm×7.5 mm linear columns, each containing PLgel 10 m, Mix B. The GPC system was calibrated using polystyrene standards ranging from 580-3,390,000 g/mol. The system was operated at an eluent flow rate of 2.0 mL/minutes and an oven temperature of 165° C. 1,2,4-trichlorobenzene was used as the eluent. The polymer samples were dissolved in 1,2,4-trichlorobenzene at a concentration of 0.1-0.9 mg/mL. 250 uL of a polymer solution was injected into the system. The concentration of the polymer in the eluent was monitored using an evaporative light scattering detector (as shown by the examples in Table 3) or Polymer Char IR4 detector. The molecular weights presented are relative to linear polystyrene standards and are uncorrected.

GPC-DRI Procedure (Used to Characterize Samples in TABLE D, Prepared in 1 L Autoclave)

$M_w$, $M_n$ and $M_w/M_n$ are determined by using a High Temperature Gel PermeationChromatography (Polymer Laboratories), equipped with a differential refractive index detector (DRI). Three Polymer Laboratories PLgel 10 μm Mixed-B columns are used. The nominal flow rate is 1.0 mL/min, and the nominal injection volume is 300 μL. The various transfer lines, columns, and differential refractometer (the DRI detector) are contained in an oven maintained at 160° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.1 pm Teflon filter. The TCB is then degassed with an online degasser before entering the GPC instrument. Polymer solutions are prepared by placing dry polymer in glass vials, adding the desired amount of TCB, then heating the mixture at 160° C. with continuous shaking for about 2 hours. AU quantities are measured gravimetrically. The injection concentration is from 0.5 to 2.0 mg/ml, with lower concentrations being used for higher molecular weight samples. Prior to running each sample the DRI detector is purged. Flow rate in the apparatus is then increased to 1.0 ml/minute, and the DRI is allowed to stabilize for 8 hours before injecting the first sample. The molecular weight is determined by combining universal calibration relationship with the column calibration which is performed with a series of monodispersed polystyrene (PS) standards. The MW is calculated at each elution volume with following equation.

$$\log M_X = \frac{\log(K_X/K_{PS})}{a_X+1} + \frac{a_{PS}+1}{a_X+1}\log M_{PS}$$

where the variables with subscript "X" stand for the test sample while those with subscript "PS" stand for PS. In this method, αps=0.67 and Kps=0.000175 while αx and Kx are obtained from published literature, except that α/K 0.695/0.000579 for ethylene polymers and 0.705/0.0002288 for propylene polymers. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive 15 index increment for the system. Specifically, dn/dc=0.109 for both PE and PP. The mass recovery is calculated from the ratio of the integrated area of the concentration chromatography over elution volume and the injection mass which is equal to the predetermined concentration multiplied by injection loop volume. AU molecular weights are reported in g/mol unless otherwise noted. In event of 20 conflict between the GPC-DRI procedure and the "Rapid GPC," the GPC-DRI procedure above shall be used.

Melt Flow Rate (MFR)—

Melt flow rate (MFR) was determined according to ASTM D1238 (230° C., 2.16 kg).

Differential Scanning Calorimetry (DSC-1, Used for Characterizing High Throughput Polymerization Samples)

For the high throughput samples (described in Table B and C), the melting temperature ($T_m$) was measured using Differential Scanning Calorimetry (DSC) using commercially available equipment such as a TA Instruments TA-Q200 DSC. Typically, 5 to 10 mg of molded polymer or plasticized polymer is sealed in an aluminum pan and loaded into the instrument at about room temperature. Samples were pre-annealed at about 220° C. for about 15 minutes and then allowed to cool to about room temperature overnight. The samples were then heated to about 220° C. at a heating rate of about 100° C./min, held at this temperature for at least about 5 minutes, and then cooled at a rate of about 50° C./min to a temperature typically at least about 50° C. below the crystallization temperature. Melting points were collected during the heating period.

Differential Scanning Calorimetry (DSC-2, Used for Characterizing Samples Prepared in 1 L Autoclave)

Peak melting point, $T_m$, described for reactor batches (also referred to as melting point) and peak crystallization temperature, $T_c$, (also referred to as crystallization temperature) are determined using the following DSC procedure according to ASTM D3418-03. Differential scanning calorimetric (DSC-2) data can be obtained using a TA Instruments model DSC2500 machine. Samples weighing approximately 5 to 10 mg are sealed in an aluminum hermetic sample pan and loaded into the instrument at about room temperature. The DSC data are recorded by first gradually heating the sample to about 200° C. at a rate of about 10° C./minute. The sample is kept at about 200° C. for 5 minutes, then cooled to about −20° C. at a rate of about 10° C./minute, followed by an isothermal for about 5 minutes and heating to about 200° C. at about 10° C./minute, holding at about 200° C. for about 5 minutes and then cooling down to about 25° C. at a rate of about 10° C./minute. Both the first and second cycle thermal events were recorded. The melting and crystallization temperatures reported here were obtained during the second heating/cooling cycle unless otherwise noted. In the event of conflict between the DSC Procedure-1 and DSC procedure-2, DSC procedure-2 is used.

NMR Analysis of Polymer Samples

The propylene homopolymer or propylene copolymer produced herein may have some level of isotacticity, and can be isotactic or highly isotactic. As used herein, "isotactic" is defined as having at least 10% isotactic pentads according to analysis by $^{13}$C NMR as described in US 2008/0045638 at paragraph [0613] et seq. As used herein, "highly isotactic" is defined as having at least 60% isotactic pentads according to analysis by $^{13}$C NMR. In at least one embodiment, a propylene homopolymer having at least about 85% isotacticity, such as at least about 90% isotacticity can be produced herein. In another embodiment, the propylene polymer produced can be atactic. Atactic polypropylene is defined to be less than 10% isotactic or syndiotactic pentads according to analysis by $^{13}$C NMR. Polymer microstructure can be determined by $^{13}$C NMR spectroscopy, including the concentration of isotactic and syndiotactic diads ([m] and [r]), triads ([mm] and [rr]), and pentads ([mmmm] and [rrrr]). Samples were dissolved in deuterated tetrachloroethane (tce-d2) at a concentration of 67 mg/mL at 140° C. Spectra were recorded at 120° C. using a Bruker NMR spectrometer of 600 MHz with a 10 mm cryoprobe. A 90° pulse, 10 second delay, 512 transients, and gated decoupling were used for measuring the $^{13}$C NMR. Polymer resonance peaks are referenced to mmmm=21.98 ppm. Calculations involved in the characterization of polymers by NMR follow the work of Bovey, F. A. (19690 in "*Polymer Conformation and Configuration*" Academic Press, New York and Randall, J. (1977) in "*Polymer Sequence Determination, 13C-NMR Method*", Academic Press, New York.

TABLE B

Propylene polymerization (High-throughput conditions)

| Ex | Catalyst loading (μmol) | Supported catalyst | Productivity (g/g · h) | $M_w$ (kg/mol) | $T_m$ (° C.) DSC-1 |
|---|---|---|---|---|---|
| 3 | 40 | 6/SMAO | 12208.7 | 776.3 | 143.9 |
| 4 | 40 | 6/SMAOF | 2321.2 | 978.0 | 140.1 |

TABLE B-continued

Propylene polymerization (High-throughput conditions)

| Ex | Catalyst loading (μmol) | Supported catalyst | Productivity (g/g · h) | $M_w$ (kg/mol) | $T_m$ (° C.) DSC-1 |
|---|---|---|---|---|---|
| 5 | 40 | 6/MMT | 2279.8 | 1001.7 | 142.2 |
| 6 | 20 | 6/MMT | 1470.0 | — | — |
| 7 | 40 | 5/SMAO | 62.0 | 639.0 | 150.7 |
| 8 | 40 | 5/SMAOF | 727.0 | 980.0 | 144.4 |
| 9 | 20 | 5/MMT | 29.8 | 760.0 | 149.8 |

Conditions: 0.45 mg of catalyst (injected as toluene slurry), 4 mL liquid propylene, isohexane (1 mL) at 70° C.

TABLE C ethylene-propylene copolymerization (High-throughput reactor conditions)

| Ex | Support | C2 (psig) | C3 (psig) | Productivity (g/g · h) | $M_w$ (kg/mol) | $T_m$ (° C.) DSC-1 | C2 (wt % in EP) |
|---|---|---|---|---|---|---|---|
| 12 | 5/SMAO-2 | 20 | 180 | 55 | 555.0 | 105.4 | 0.5 |
| 13 | 5/SMAOF | 20 | 180 | 72 | 581.0 | 100.8 | 3.6 |
| 14 | 5/MMT | 20 | 180 | 77 | 816.0 | 106.7 | 3.6 |
| 15 | 5/SMAO-2 | 80 | 180 | 50 | 523.0 | Am.* | 17.6 |
| 16 | 5/SMAOF | 80 | 180 | 64 | 666.0 | Am.* | 21.2 |
| 17 | 5/MMT | 80 | 180 | 87 | 655.0 | Am.* | 18.5 |
| 18 | 5/MMT | 80 | 180 | 90 | 708.0 | Am.* | — |
| 19 | 5/SMAO-2 | 150 | 180 | 295 | 481.0 | Am.* | 50.8 |
| 20 | 5/SMAOF | 150 | 180 | 42 | 577.0 | Am.* | 38.6 |
| 21 | 5/MMT | 150 | 180 | 46 | 760.0 | Am.* | 33.3 |
| 22 | 6/SMAO-2 | 20 | 180 | 13822 | 389.0 | 105.4 | 4.6 |
| 23 | 6/SMAOF | 20 | 180 | — | — | — | — |
| 24 | 6/MMT | 20 | 180 | 2720 | 837.0 | 99.1 | 3.6 |
| 25 | 6/SMAO-2 | 80 | 180 | 11210 | 319.0 | Am.* | 14.9 |
| 26 | 6/SMAOF | 80 | 180 | 188 | 425.0 | Am.* | 20.7 |
| 27 | 6/MMT | 80 | 180 | 6437 | 545.0 | Am.* | 16 |
| 28 | 6/SMAO-2 | 150 | 180 | 18015 | 312.0 | Am.* | 28.4 |
| 29 | 6/SMAOF | 150 | 180 | 7661 | 365.0 | Am.* | 37.9 |
| 30 | 6/MMT | 150 | 180 | — | — | — | — |

* Am means no melting peak observed. Conditions: 0.45 mg of catalyst (injected as toluene slurry), 2 mL liquid propylene balanced with desired ethylene pressure (indicated in the table), isohexane (2 mL) at 70° C.

TABLE D

Propylene polymerization (1 L Autoclave)

| Ex | Supported catalyst | $H_2$ (mmol) | Yield (g) | MFR (g/10 min) | Productivity (g/g · h) | $M_w$ (kg/mol) | Mw/Mn | $T_m$ (° C.) DSC-2 | $T_c$ (° C.) DSC-2 |
|---|---|---|---|---|---|---|---|---|---|
| 31 | 6/SMAO-2 | 0 | 53.7 | 0.29 | 2148 | 727.9 | 1.77 | 136.6 | 95.8 |
| 32 | 6/SMAO-2 | 12.5 | 72.3 | 0.36 | 2893 | 687.0 | 1.78 | 136.8 | 94.8 |
| 33 | 5/SMAO-2 | 0 | 1.0 | — | 40 | — | — | — | — |

Conditions: 25.0 mg of supported catalyst (injected as mineral oil slurry) 550 mL liquid propylene, 70° C.

TABLE E $^{13}$C NMR analysis

| Ex | Supported catalyst | mmmm | Stereodefects/ 10,000 units | 2,1-erythro regio defects/ 10,000 units | 2,1-threo regio defects/ 10,000 units |
|---|---|---|---|---|---|
| 31 | 6/SMAO-2 | 0.958 | 89 | 139 | 20 |
| 32 | 6/SMAO-2 | 0.958 | 79 | 131 | 20 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group consisting of," or "is" preceding the recitation of the composition, element, or elements and vice versa.

What is claimed is:

1. A supported catalyst composition comprising a support and a catalyst compound represented by the Formula (I):

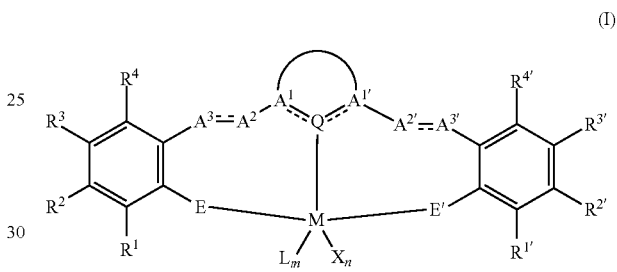

(I)

wherein:

M is a group 3, 4, 5, or 6 transition metal or a Lanthanide;

E and E' are each independently O, S, or $NR^9$ where $R^9$ is independently hydrogen, a $C_1$-$C_{40}$ hydrocarbyl, a $C_1$-$C_{40}$ substituted hydrocarbyl or a heteroatom-containing group;

Q is group 14, 15, or 16 atom that forms a dative bond to metal M;

$A^1QA^{1'}$ are part of a heterocyclic Lewis base containing 4 to 40 non-hydrogen atoms that links $A^2$ to $A^{2'}$ via a 3-atom bridge with Q being the central atom of the 3-atom bridge, $A^1$ and $A^{1'}$ are independently C, N, or $C(R^{22})$, where $R^{22}$ is selected from hydrogen, $C_1$-$C_{20}$ hydrocarbyl, $C_1$-$C_{20}$ substituted hydrocarbyl;

$A^3$---$A^2$ is a divalent group containing 2 to 40 non-hydrogen atoms that links $A^1$ to the E-bonded aryl group via a 2-atom bridge;

$A^{2'}$---$A^{3'}$ is a divalent group containing 2 to 40 non-hydrogen atoms that links $A^{1'}$ to the E'-bonded aryl group via a 2-atom bridge;

L is a Lewis base;

X is an anionic ligand;

n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, a $C_1$-$C_{40}$ hydrocarbyl, a $C_1$-$C_{40}$ substituted hydrocarbyl, a heteroatom or a heteroatom-containing group,
and one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings;
any two L groups may be joined together to form a bidentate Lewis base;
an X group may be joined to an L group to form a monoanionic bidentate group;
any two X groups may be joined together to form a dianionic ligand group.

2. The composition of claim 1, where the catalyst compound is represented by the Formula (II):

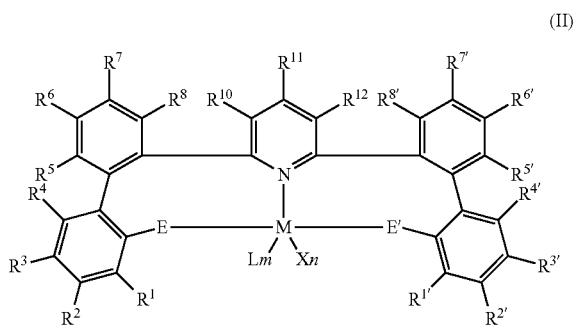

(II)

wherein:
M is a group 3, 4, 5, or 6 transition metal or a Lanthanide;
E and E' are each independently O, S, or $NR^9$, where $R^9$ is independently hydrogen, a $C_1$-$C_{40}$ hydrocarbyl, a $C_1$-$C_{40}$ substituted hydrocarbyl, or a heteroatom-containing group;
each L is independently a Lewis base;
each X is independently an anionic ligand;
n is 1, 2 or 3;
m is 0, 1, or 2;
n+m is not greater than 4;
each of $R^1$, $R^2$, $R^3$, $R^4$, $R^{1'}$, $R^{2'}$, $R^{3'}$, and $R^{4'}$ is independently hydrogen, $C_1$-$C_{40}$ hydrocarbyl, $C_1$-$C_{40}$ substituted hydrocarbyl, a heteroatom or a heteroatom-containing group, or one or more of $R^1$ and $R^2$, $R^2$ and $R^3$, $R^3$ and $R^4$, $R^{1'}$ and $R^{2'}$, $R^{2'}$ and $R^{3'}$, $R^{3'}$ and $R^{4'}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings; any two L groups may be joined together to form a bidentate Lewis base;
an X group may be joined to an L group to form a monoanionic bidentate group;
any two X groups may be joined together to form a dianionic ligand group;
each of $R^5$, $R^6$, $R^7$, $R^8$, $R^{5'}$, $R^{6'}$, $R^{7'}$, $R^{8'}$, $R^{10}$, $R^{11}$, and $R^{12}$ is independently hydrogen, a $C_1$-$C_{40}$ hydrocarbyl, a $C_1$-$C_{40}$ substituted hydrocarbyl, a heteroatom or a heteroatom-containing group, or one or more of $R^5$ and $R^6$, $R^6$ and $R^7$, $R^7$ and $R^8$, $R^{5'}$ and $R^{6'}$, $R^{6'}$ and $R^{7'}$, $R^{7'}$ and $R^{8'}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms, and where substitutions on the ring can join to form additional rings.

3. The composition of claim 1, wherein the M is Hf, Zr or Ti.

4. The composition of claim 1, wherein E and E' are each O.

5. The composition of claim 1, wherein $R^1$ and $R^{1'}$ is independently a $C_4$-$C_{40}$ tertiary hydrocarbyl group.

6. The composition of claim 1, wherein $R^1$ and $R^{1'}$ is independently a $C_4$-$C_{40}$ cyclic tertiary hydrocarbyl group.

7. The composition of claim 2, wherein $R^1$ and $R^{1'}$ is independently a $C_4$-$C_{40}$ polycyclic tertiary hydrocarbyl group.

8. The composition claim 1, wherein each X is, independently, selected from the group consisting of substituted or unsubstituted hydrocarbyl radicals having from 1 to 20 carbon atoms, hydrides, amides, alkoxides, sulfides, phosphides, halides, and a combination thereof, (two X's may form a part of a fused ring or a ring system).

9. The composition claim 1, wherein each L is, independently, selected from the group consisting of: ethers, thioethers, amines, phosphines, ethyl ether, tetrahydrofuran, dimethylsulfide, triethylamine, pyridine, alkenes, alkynes, alenes, and carbenes and a combinations thereof, optionally two or more L's may form a part of a fused ring or a ring system).

10. The composition of claim 1, wherein the support is silica, M is Zr or Hf, Q is nitrogen, both $A^1$ and $A^{1'}$ are carbon, both E and E' are oxygen, and both $R^1$ and $R^{1'}$ are $C_4$-$C_{20}$ cyclic tertiary alkyls.

11. The composition of claim 1, wherein M is Zr or Hf, Q is nitrogen, both $A^1$ and $A^{1'}$ are carbon, both E and E' are oxygen, and both $R^1$ and $R^{1'''}$ are adamantan-1-yl or substituted adamantan-1-yl.

12. The composition of claim 1, wherein M is Zr or Hf, Q is nitrogen, both $A^1$ and $A^{1'}$ are carbon, both E and E' are oxygen, and both $R^1$ and $R^{1'}$ are $C_6$-$C_{20}$ aryls.

13. The composition of claim 1, wherein Q is nitrogen, $A^1$ and $A^{1'}$ are both carbon, both $R^1$ and $R^{1'}$ are hydrogen, both E and E' are $NR^9$, where $R^9$ is selected from a $C_1$-$C_{40}$ hydrocarbyl, a $C_1$-$C_{40}$ substituted hydrocarbyl, or a heteroatom-containing group.

14. The composition of claim 1, wherein Q is carbon, $A^1$ and $A^{1'}$ are both nitrogen, and both E and E' are oxygen.

15. The composition of claim 1, wherein Q is carbon, $A^1$ is nitrogen, $A^{1'}$ is $C(R^{22})$, and both E and E' are oxygen, where $R^{22}$ is selected from hydrogen, $C_1$-$C_{20}$ hydrocarbyl, $C_1$-$C_{20}$ substituted hydrocarbyl.

16. The composition of claim 1, wherein the heterocyclic Lewis base is selected from the groups represented by the following formulas:

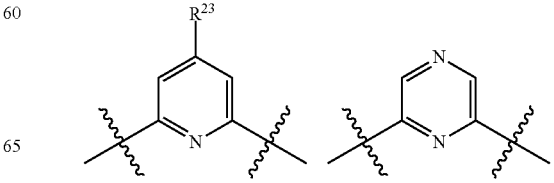

-continued

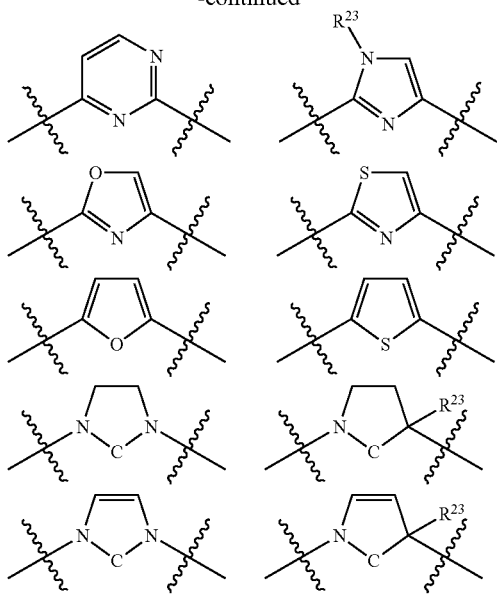

where each $R^{23}$ is independently selected from hydrogen, $C_1$-$C_{20}$ alkyls, and $C_1$-$C_{20}$ substituted alkyls.

17. The composition of claim 2, wherein M is Zr or Hf, both E and E' are oxygen, and both $R^1$ and $R^{1'}$ are $C_4$-$C_{20}$ cyclic tertiary alkyls.

18. The composition of claim 2, wherein M is Zr or Hf, both E and E' are oxygen, and both $R^1$ and $R^{1'}$ are adamantan-1-yl or substituted adamantan-1-yl.

19. The composition of claim 2, wherein M is Zr or Hf, both E and E' are oxygen, and each of $R^1$, $R^{1'}$, $R^3$ and $R^{3'}$ are adamantan-1-yl or substituted adamantan-1-yl.

20. The composition of claim 2, wherein M is Zr or Hf, both E and E' are oxygen, both $R^1$ and $R^{1'}$ are $C_4$-$C_{20}$ cyclic tertiary alkyls, and both $R^7$ and $R^{7'}$ are $C_1$-$C_{20}$ alkyls.

21. The composition of claim 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_{20}$ alkyls.

22. The composition of claim 2, wherein M is Zr or Hf, both E and E' are O, both $R^1$ and $R^{1'}$ are $C_4$-$C_{20}$ cyclic tertiary alkyls, and both $R^7$ and $R^{7'}$ are $C_1$-$C_3$ alkyls.

23. The composition of claim 1 wherein the catalyst compound is represented by one or more of the following formulas:

Complex 1

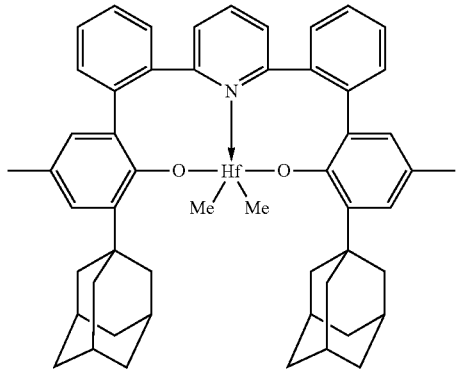

Complex 2

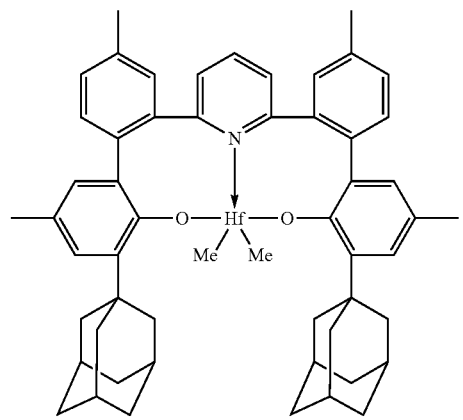

Complex 3

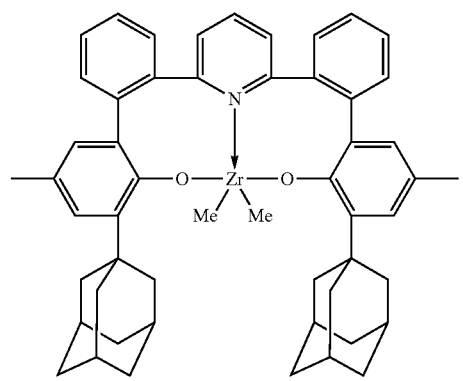

Complex 4

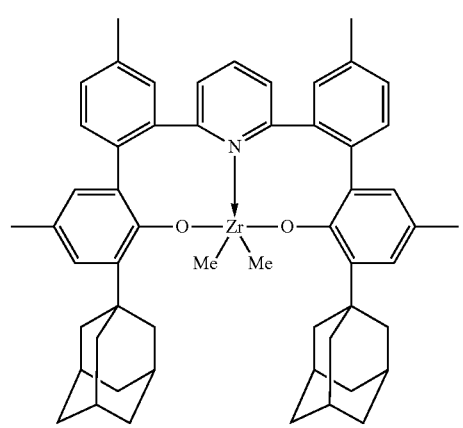

Complex 5
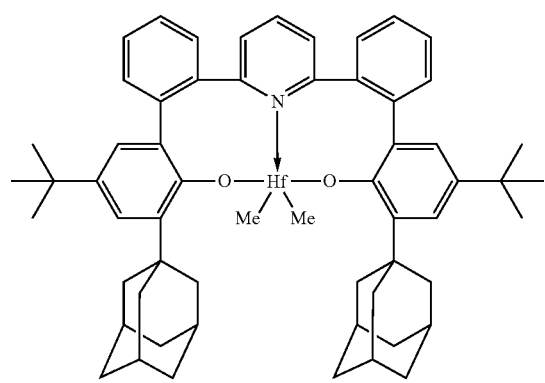
Complex 8
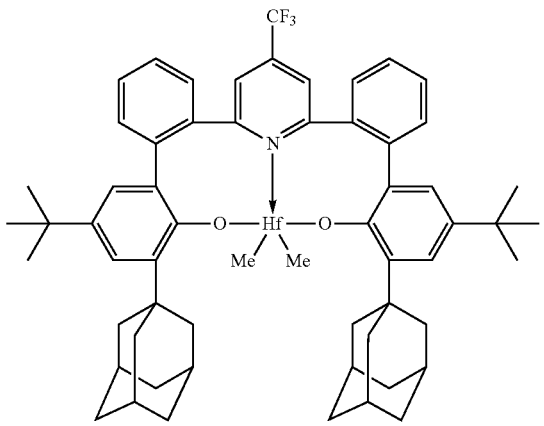
Complex 6
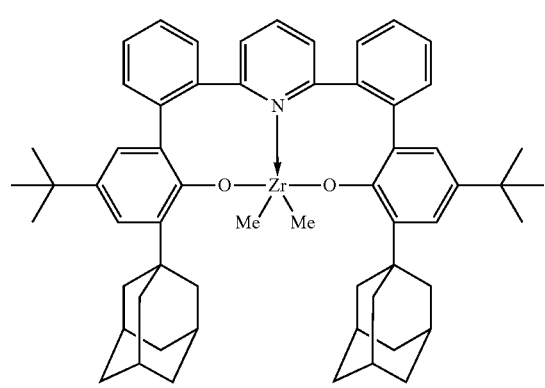
Complex 9
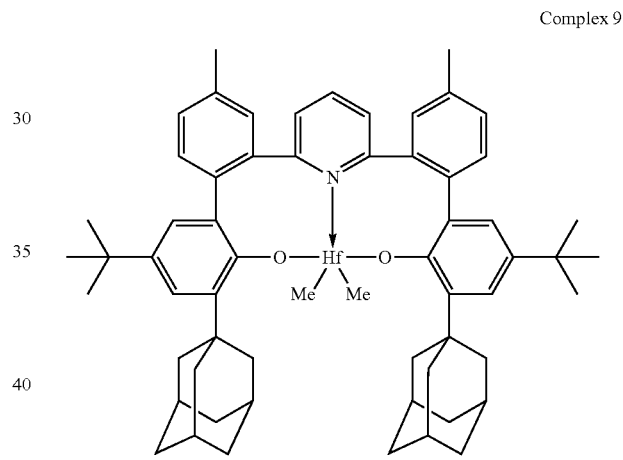
Complex 7
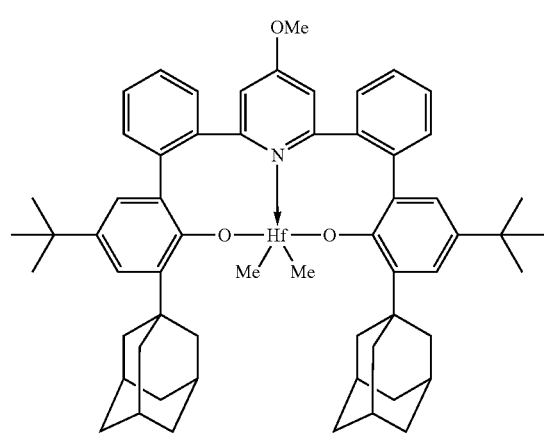
Complex 10
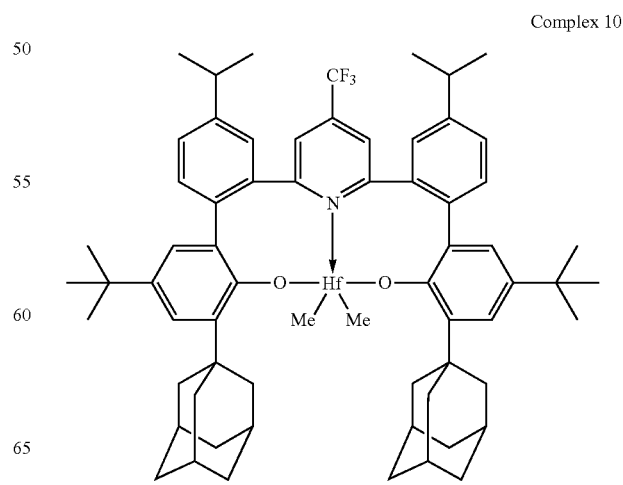

Complex 11
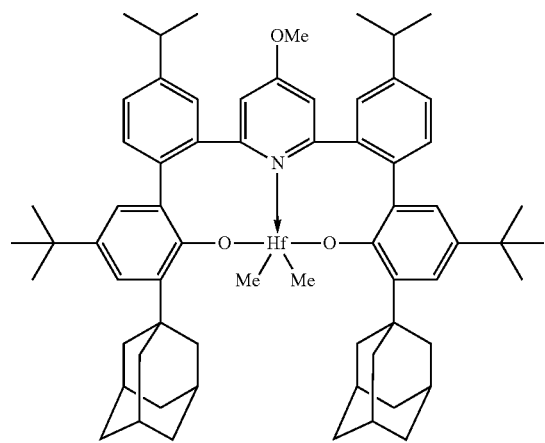
Complex 12
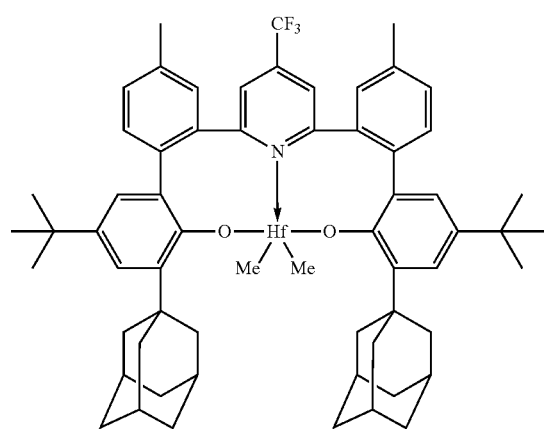
Complex 13
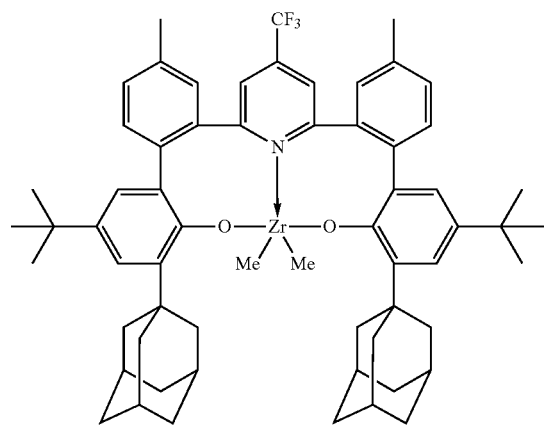
Complex 14
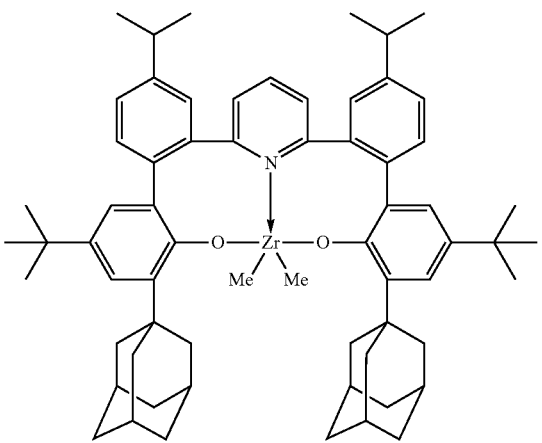
Complex 15
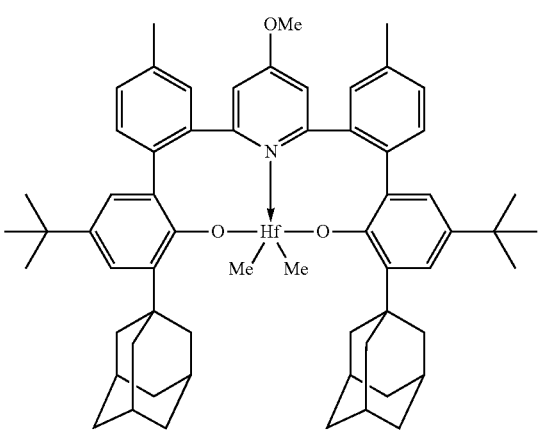
Complex 16
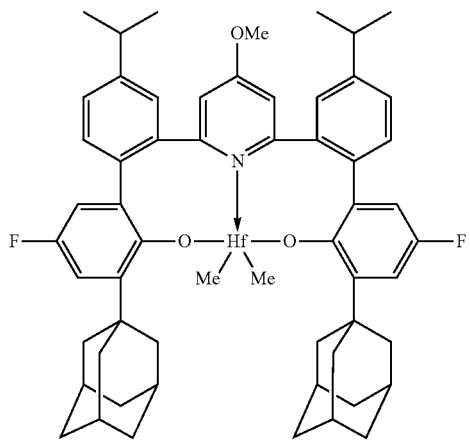

Complex 17
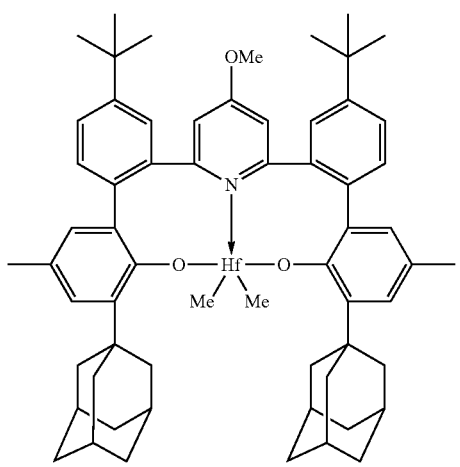
Complex 18
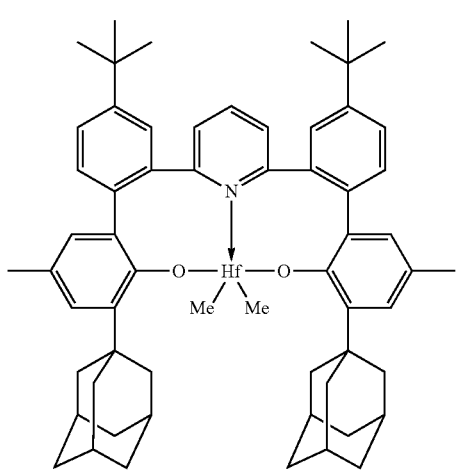
Complex 19
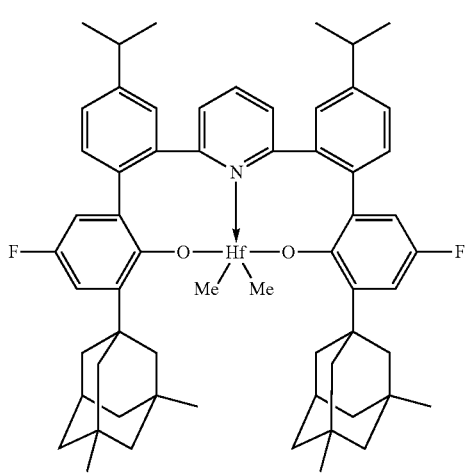
Complex 20
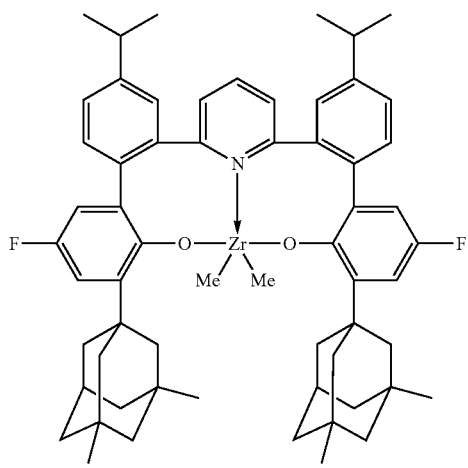
Complex 21
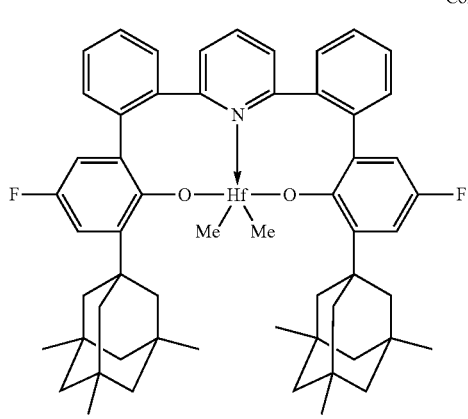
Complex 22
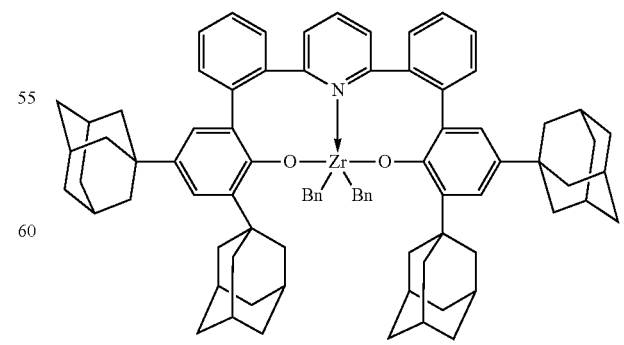

Complex 23
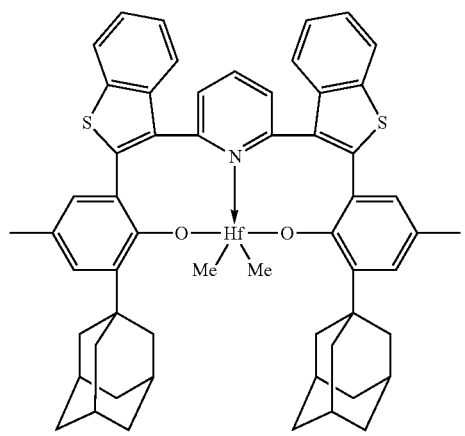
Complex 24
Complex 25
Complex 26
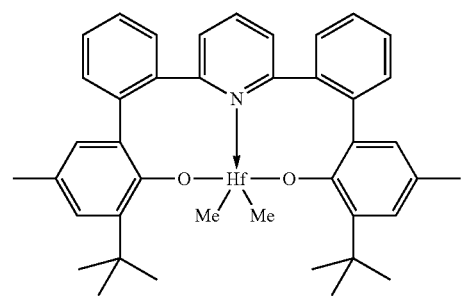
Complex 27
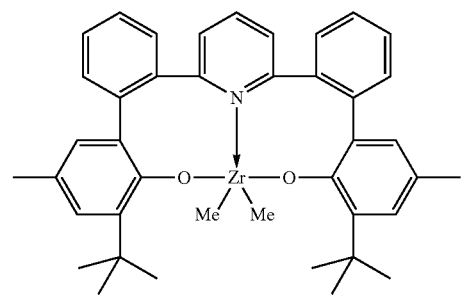
Complex 29
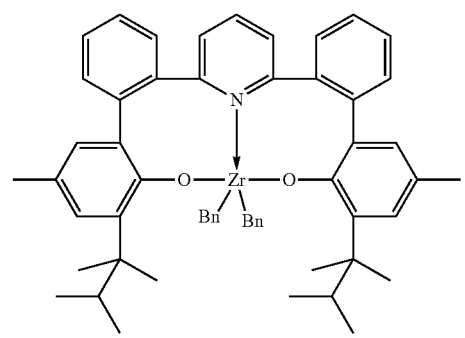
Complex 30
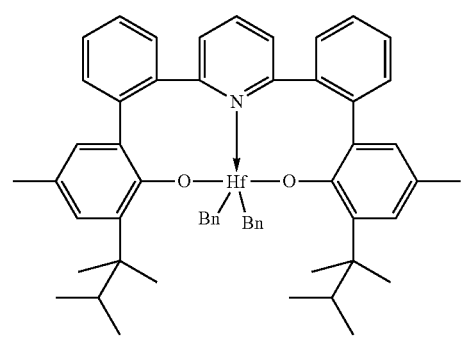

-continued

Complex 31

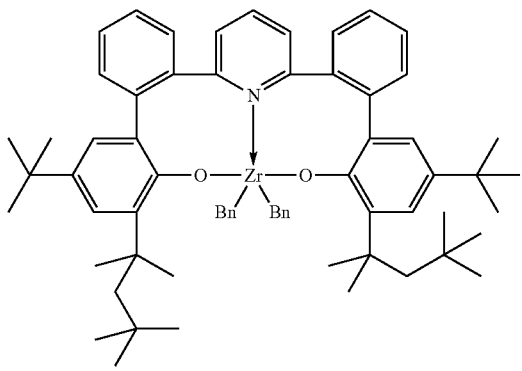

Complex 32

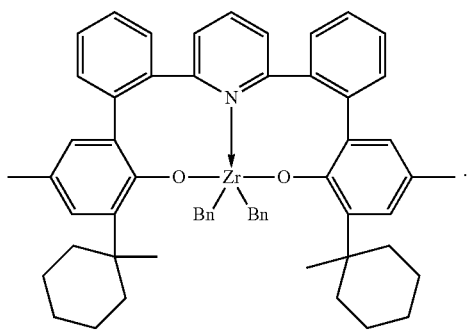

24. A supported catalyst system comprising activator and the composition of claim 1.

25. The catalyst system of claim 24, wherein the activator comprises an alumoxane or a non-coordinating anion.

26. The catalyst system of claim 24, wherein the activator is soluble in non-aromatic-hydrocarbon solvent and/or the catalyst system is free of aromatic solvent.

27. The catalyst system of claim 24, wherein the support comprises a solid oxide optionally treated with an electron-withdrawing anion; and the electron-withdrawing anion is selected from the group consisting of fluoride, chloride, bromide, phosphate, triflate, bisulfate, sulfate, and combination(s) thereof.

28. The catalyst system of claim 24, wherein the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; $A^{d-}$ is a non-coordinating anion having the charge d−; and d is an integer from 1 to 3.

29. The catalyst system of claim 24, wherein the activator is represented by the formula:

$$[R^{1'}R^{2'}R^{3'}EH]_{d+}[Mt^{k+}Q_n]^{d-} \quad (V)$$

wherein:
E is nitrogen or phosphorous;
d is 1, 2 or 3; k is 1, 2, or 3; n is 1, 2, 3, 4, 5, or 6; n−k=d;
$R^{1'}$, $R^{2'}$, and $R^{3'}$ are independently a $C_1$ to $C_{50}$ hydrocarbyl group optionally substituted with one or more alkoxy groups, silyl groups, a halogen atoms, or halogen containing groups,
wherein $R^{1'}$, $R^{2'}$, and $R^{3'}$ together comprise 15 or more carbon atoms;
Mt is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halo substituted-hydrocarbyl radical.

30. The catalyst system of claim 24, wherein the activator is represented by the formula:

$$(Z)_d^+(A^{d-})$$

wherein $A^{d-}$ is a non-coordinating anion having the charge d−; and d is an integer from 1 to 3 and $(Z)_d^+$ is represented by one or more of:

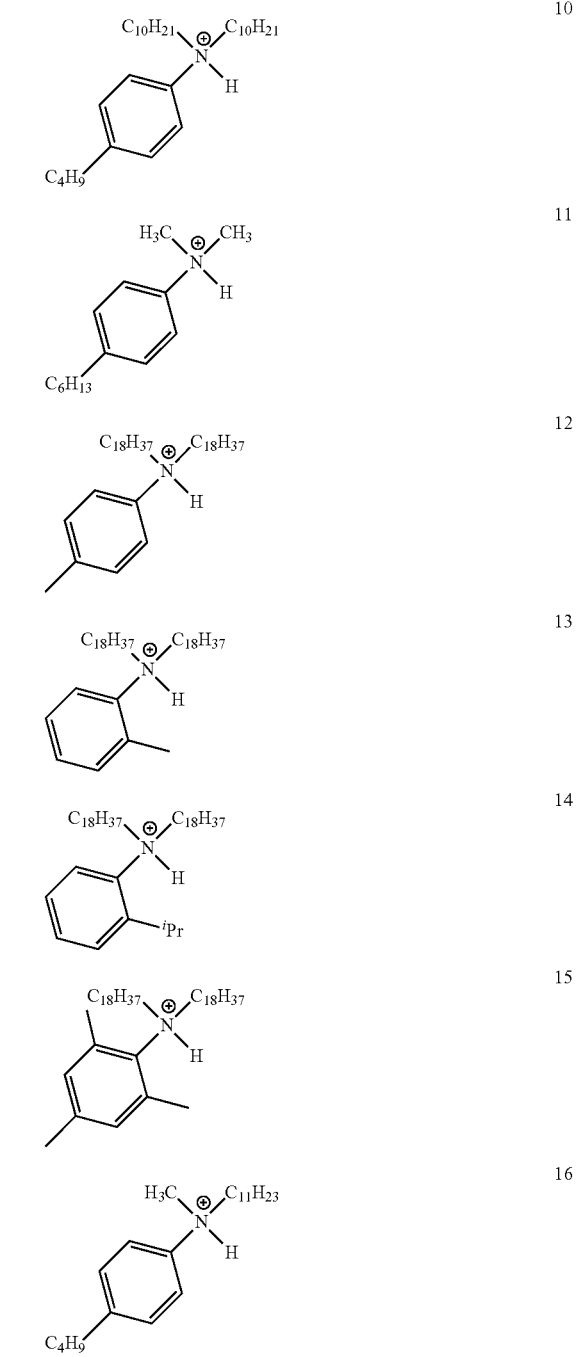

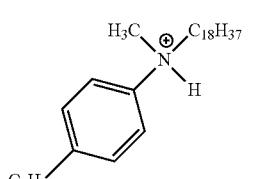
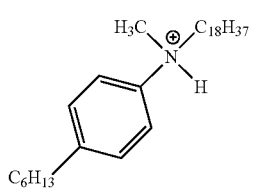
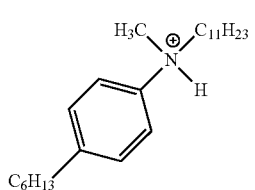
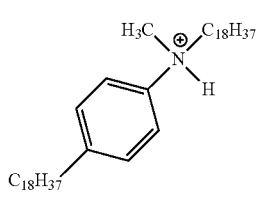
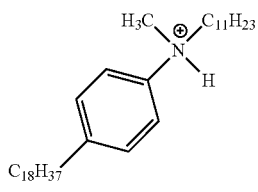
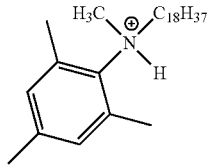
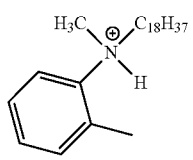
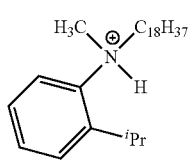
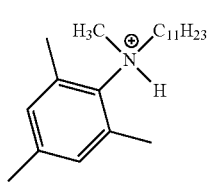
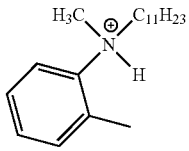
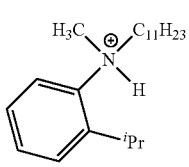
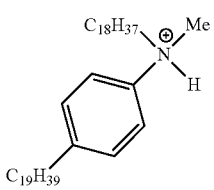
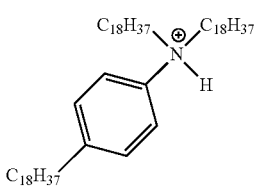
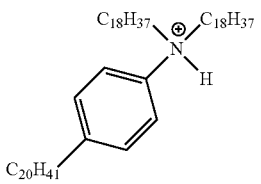
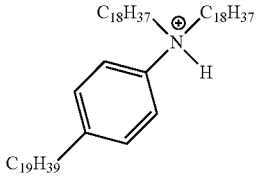
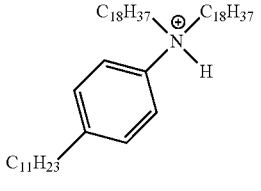
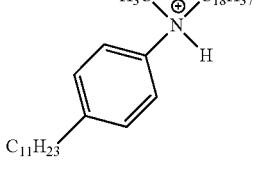
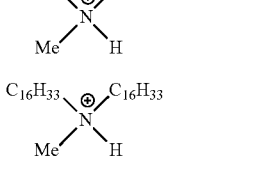

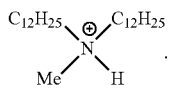

31. The catalyst system of claim 24, wherein the activator is one or more of:
N-methyl-4-nonadecyl-N-octadecylbenzenaminium tetrakis(pentafluorophenyl)borate,
N-methyl-4-nonadecyl-N-octadecylbenzenaminium tetrakis(perfluoronaphtalenyl)borate,
dioctadecylmethylammonium tetrakis(pentafluorophenyl)borate,
dioctadecylmethylammonium tetrakis(perfluoronaphtalenyl)borate,
N,N-dimethylanilinium tetrakis(pentafluorophenyl)borate,
triphenylcarbenium tetrakis(pentafluorophenyl)borate,
trimethylammonium tetrakis(perfluoronaphthalenyl)borate,
triethylammonium tetrakis(perfluoronaphthalenyl)borate,
tripropylammonium tetrakis(perfluoronaphthalenyl)borate,
tri(n-butyl)ammonium tetrakis(perfluoronaphthalenyl)borate,
tri(t-butyl)ammonium tetrakis(perfluoronaphthalenyl)borate,
N,N-dimethylanilinium tetrakis(perfluoronaphthalenyl)borate,
N,N-diethylanilinium tetrakis(perfluoronaphthalenyl)borate,
N,N-dimethyl-(2,4,6-trimethylanilinium) tetrakis(perfluoronaphthalenyl)borate,
tropillium tetrakis(perfluoronaphthalenyl)borate,
triphenylcarbenium tetrakis(perfluoronaphthalenyl)borate,
triphenylphosphonium tetrakis(perfluoronaphthalenyl)borate,
triethylsilylium tetrakis(perfluoronaphthalenyl)borate,
benzene(diazonium) tetrakis(perfluoronaphthalenyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
[4-t-butyl-PhNMe$_2$H][(C$_6$F$_3$(C$_6$F$_5$)$_2$)$_4$B],
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate,
N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate, triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

32. A process to polymerize olefins comprising contacting one or more olefins with the catalyst system of claim 23.

33. The process of claim 32 wherein the process occurs at a temperature of from about 0° C. to about 300° C., at a pressure in the range of from about 0.35 MPa to about 10 MPa, and at a time up to 300 minutes.

34. The process of claim 32 further comprising obtaining polymer.

35. The process of claim 32 wherein the olefins comprise one or more substituted or unsubstituted $C_2$ to $C_{40}$ alpha olefins.

36. The process of claim 32 wherein the process occurs in the gas or slurry phase.

* * * * *